(12) United States Patent  
Ralls et al.

(10) Patent No.: US 8,332,544 B1  
(45) Date of Patent: Dec. 11, 2012

(54) SYSTEMS, METHODS, AND DEVICES FOR ASSISTING PLAY

(75) Inventors: Chaun J. Ralls, El Segundo, CA (US); Andrew Cheeseman, El Segundo, CA (US); Michael Young, El Segundo, CA (US); Paul King, Newbury Park, CA (US); Peter Marx, La Dolla, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 13/050,842

(22) Filed: Mar. 17, 2011

Related U.S. Application Data

(60) Provisional application No. 61/314,964, filed on Mar. 17, 2010, provisional application No. 61/315,008, filed on Mar. 17, 2010, provisional application No. 61/315,390, filed on Mar. 18, 2010, provisional application No. 61/322,728, filed on Apr. 9, 2010, provisional application No. 61/325,737, filed on Apr. 19, 2010.

(51) Int. Cl.  
*G06F 3/00* (2006.01)  
*G08B 23/00* (2006.01)

(52) U.S. Cl. .................................... 710/8; 340/573.1

(58) Field of Classification Search .................. None  
See application file for complete search history.

(56) References Cited

U.S. PATENT DOCUMENTS

| | | | |
|---|---|---|---|
| 4,489,938 A | 12/1984 | Darzinskis | |
| 4,512,567 A | 4/1985 | Phillips | |
| 5,001,632 A | 3/1991 | Hall-Tipping | |
| 5,065,414 A | 11/1991 | Endou et al. | |
| RE34,728 E | 9/1994 | Hall-Tipping | |
| 5,362,069 A | 11/1994 | Hall-Tipping | |
| 5,524,637 A | 6/1996 | Erickson | |
| 5,568,928 A | 10/1996 | Munson et al. | |
| 5,645,513 A | 7/1997 | Haydocy et al. | |
| 5,667,459 A | 9/1997 | Su | |
| 5,779,576 A | 7/1998 | Smith et al. | |
| 5,888,172 A | 3/1999 | Andrus et al. | |
| 5,947,868 A | 9/1999 | Dugan | |
| 6,013,007 A | 1/2000 | Root et al. | |
| 6,183,365 B1 | 2/2001 | Tonomura et al. | |
| 6,213,872 B1 | 4/2001 | Harada et al. | |
| 6,302,789 B2 | 10/2001 | Harada et al. | |

(Continued)

FOREIGN PATENT DOCUMENTS

CA    2071993    6/1991

(Continued)

*Primary Examiner* — Henry W. H. Tsai  
*Assistant Examiner* — Titus Wong  
(74) *Attorney, Agent, or Firm* — Kolisch Hartwell, PC

(57) ABSTRACT

Systems, methods, and computer program products for assisting play are disclosed. In some examples, the system may include a portable computer including a user interface configured to receive input from a user, and a computer communication mechanism configured to transmit computer data based, at least in part, on the received user input; and a plurality of portable devices each including an enclosure, a device communication mechanism within the enclosure and configured to receive the computer data, a proximity sensor mechanism configured to detect proximity of one or more other portable devices of the plurality of portable devices, and an audiovisual output mechanism configured to generate at least one of an audio output and a visual output based on at least one of (1) the received computer data and (2) the detected proximity of the one or more other portable devices.

18 Claims, 61 Drawing Sheets

U.S. PATENT DOCUMENTS

| | | |
|---|---|---|
| 6,312,363 B1 | 11/2001 | Watterson et al. |
| 6,375,572 B1 | 4/2002 | Masuyama et al. |
| 6,482,092 B1 | 11/2002 | Tajiri et al. |
| 6,499,000 B2 | 12/2002 | Flentov et al. |
| 6,540,606 B1 | 4/2003 | Matsukata |
| 6,595,858 B1 | 7/2003 | Tajiri et al. |
| 6,641,482 B2 | 11/2003 | Masuyama et al. |
| 6,699,188 B2 | 3/2004 | Wessel |
| 7,062,225 B2 | 6/2006 | White |
| 7,063,644 B2 | 6/2006 | Albert |
| 7,077,751 B2 | 7/2006 | Nishiyama et al. |
| 7,246,033 B2 | 7/2007 | Kudo |
| 7,251,454 B2 | 7/2007 | White |
| 7,335,134 B1 | 2/2008 | LaVelle |
| 7,347,779 B2 | 3/2008 | James-Herbert |
| 7,390,255 B2 | 6/2008 | Walker et al. |
| 7,519,327 B2 | 4/2009 | White |
| 7,564,469 B2 | 7/2009 | Cohen |
| 7,579,946 B2 | 8/2009 | Case, Jr. |
| 7,607,243 B2 | 10/2009 | Berner, Jr. et al. |
| 7,623,077 B2 | 11/2009 | Wang et al. |
| 7,637,172 B2 | 12/2009 | Yu et al. |
| 7,647,195 B1 | 1/2010 | Kahn et al. |
| 2002/0077219 A1 | 6/2002 | Cohen et al. |
| 2002/0109596 A1* | 8/2002 | Phillips et al. ............. 340/573.1 |
| 2002/0109600 A1 | 8/2002 | Mault et al. |
| 2002/0160883 A1 | 10/2002 | Dugan |
| 2004/0160336 A1 | 8/2004 | Hoch et al. |
| 2004/0180708 A1 | 9/2004 | Southard et al. |
| 2005/0227811 A1 | 10/2005 | Shum et al. |
| 2005/0287502 A1 | 12/2005 | Southard et al. |
| 2006/0025282 A1 | 2/2006 | Redmann |
| 2006/0105838 A1 | 5/2006 | Mullen |
| 2006/0183603 A1 | 8/2006 | Astilean |
| 2006/0258420 A1 | 11/2006 | Mullen |
| 2007/0006489 A1 | 1/2007 | Case et al. |
| 2007/0011919 A1 | 1/2007 | Case |
| 2007/0100666 A1 | 5/2007 | Stivoric et al. |
| 2007/0111858 A1 | 5/2007 | Dugan |
| 2007/0197274 A1 | 8/2007 | Dugan |
| 2007/0213110 A1 | 9/2007 | Rosenberg |
| 2007/0218988 A1 | 9/2007 | Lucich |
| 2007/0247306 A1 | 10/2007 | Case |
| 2007/0260421 A1 | 11/2007 | Berner et al. |
| 2008/0027673 A1 | 1/2008 | Trumm |
| 2008/0096726 A1 | 4/2008 | Riley et al. |
| 2008/0102424 A1 | 5/2008 | Holljes |
| 2008/0125288 A1 | 5/2008 | Case |
| 2008/0146334 A1 | 6/2008 | Kil |
| 2008/0182724 A1 | 7/2008 | Guthrie |
| 2009/0023553 A1 | 1/2009 | Shim |
| 2009/0023554 A1 | 1/2009 | Shim |
| 2009/0047645 A1 | 2/2009 | Dibenedetto et al. |
| 2009/0048070 A1 | 2/2009 | Vincent |
| 2009/0048493 A1 | 2/2009 | James et al. |
| 2009/0051544 A1 | 2/2009 | Niknejad |
| 2009/0149257 A1 | 6/2009 | Ferguson et al. |
| 2009/0233769 A1 | 9/2009 | Pryor |
| 2009/0233770 A1 | 9/2009 | Vincent et al. |
| 2009/0233771 A1 | 9/2009 | Quatrochi et al. |
| 2009/0258710 A1 | 10/2009 | Quatrochi et al. |
| 2009/0264172 A1 | 10/2009 | Morimura et al. |
| 2009/0284368 A1 | 11/2009 | Case, Jr. |
| 2009/0298650 A1 | 12/2009 | Kutliroff |
| 2009/0309891 A1 | 12/2009 | Karkanias et al. |
| 2009/0323888 A1 | 12/2009 | Fukutome et al. |
| 2009/0325701 A1 | 12/2009 | Andres Del Valle |
| 2010/0035688 A1 | 2/2010 | Picunko |
| 2010/0037489 A1 | 2/2010 | Berner, Jr. et al. |
| 2010/0048272 A1 | 2/2010 | Koh |
| 2010/0048358 A1 | 2/2010 | Tchao et al. |
| 2010/0063778 A1 | 3/2010 | Schrock et al. |
| 2010/0063779 A1 | 3/2010 | Schrock et al. |
| 2010/0069148 A1 | 3/2010 | Cargill |
| 2011/0066009 A1* | 3/2011 | Moon et al. .................... 600/301 |

FOREIGN PATENT DOCUMENTS

| | | |
|---|---|---|
| CA | 2516151 | 9/2004 |
| CA | 2668946 | 5/2008 |
| EP | 908701 | 4/1999 |
| JP | 07181056 | 7/1995 |
| JP | 08103568 | 4/1996 |
| JP | 11073093 | 3/1999 |
| JP | 11110514 | 4/1999 |
| JP | 11342270 | 12/1999 |
| JP | 2000051528 | 2/2000 |
| JP | 2002113142 | 4/2002 |
| JP | 2002306660 | 10/2002 |
| JP | 2004264244 | 9/2004 |
| JP | 2009254539 | 11/2009 |
| WO | 9109374 | 6/1991 |
| WO | 2007130287 | 11/2007 |
| WO | 2007123969 | 12/2007 |
| WO | 2007123970 | 1/2008 |
| WO | 2008055009 | 6/2008 |
| WO | 2008061023 | 7/2008 |
| WO | 2008092035 | 7/2008 |
| WO | 2009026289 | 2/2009 |
| WO | 2009050715 | 4/2009 |
| WO | 2009071128 | 6/2009 |
| WO | 2009152456 | 12/2009 |

* cited by examiner

STATEGY - OVERALL
SHORT TERM: SIMPLE DEVICE / TOY
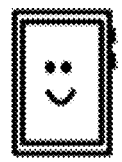
- < $40 RETAIL
- CONNECTIVITY (WIFI OR BLUETOOTH OR IR)
- GAME (IN FLASH MEMORY) CAN BE UPGRADED
- FEATURES CAN BE UNLOCKED (WITH RETAIL PRODUCTS PURCHASED SEPARATELY)
LONG TERM: THIS DEVICE BECOMES ONE PERIPHERAL OF THE GAME PLATFORM
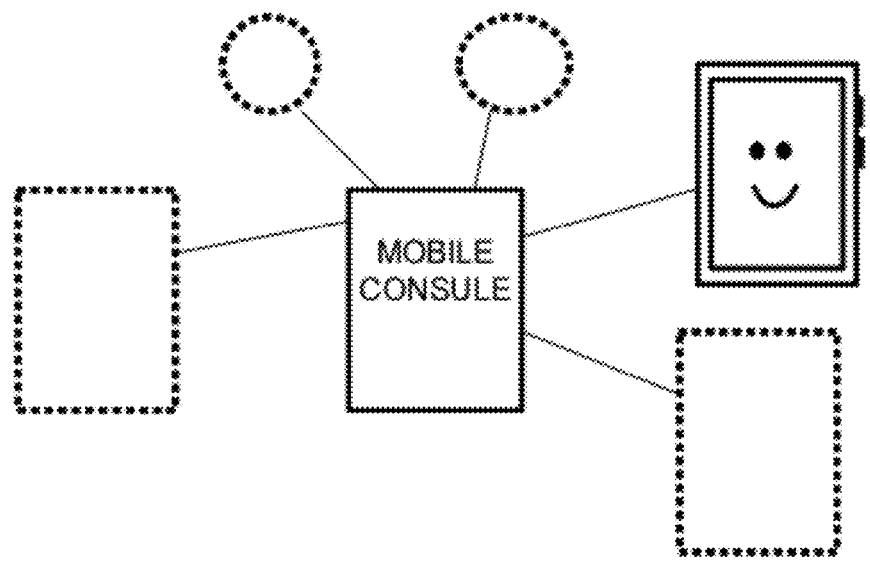
Fig. 2

MOBILE CONSOLE
ACTIVE PLAY HARDWARE / DEVICE FEATURES
THURSDAY, MARCH 11, 2010

- *User experience / UI*
- 2 multifunction buttons
- Screen:
    - Color (half of iphone size)
    - Touch (not multi-touch)
- Sensors
    - Accelerometer (3-axis, 10-bit)
    - Gyroscope / direction
    - GPS
    - Camera (B-girl quality)
    - ? Temperature
- Generators
    - Sound / voice / speaker (8k)
    - Vibration

*Connectivity*
- Cell Network (pager, mobile, 4G)

- WiFi
- IR port
- USB infrared dongle

*Misc Components*
- Light sensor
- Microcontroller (ARM7)
- Memory – RAM (16MB)
- Memory – Flash (3Gb/250MB)
- Battery, charging circuit, wall wart
- Housing, packaging
- Content

Online Features
- Website with user registration
- Talks to Mattel's AT&T account on the back end
- Scalable (e.g., "supports 50k simultaneous users with <1 sec delay")
- Avatar

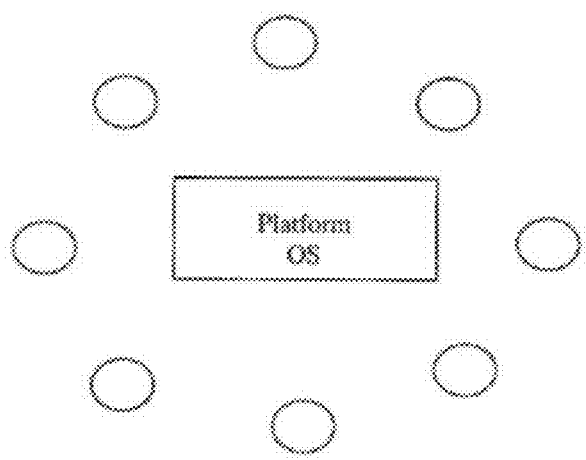

Fig. 7

Active Play / Play!

Fantasy Meets the Sun:
engage with something bigger than a computer

| | |
|---|---|
| Run | Imagine |
| Jump | Walk |
| Crawl | Dance |
| Roll | Swim |
| Summersault | Swing |
| Compete | Spin |
| Share | |
| Explore | |
| Seek | |
| Hide | |
| Climb | |
| Pretend | |

- Engage with outdoor play
  * Activity primes the body/spirit for more activity
  * Play and connect with friends in new and exciting ways – outdoors
- Engaged by rewards
  * Outside play means points and other rewards!
  * Points open the door to more outdoor fun
- Engage in the cycle
  * Virtual "ranks" rise with growing fitness
  * Outdoor time gains status vis-a-vis indoor time

Fig. 10

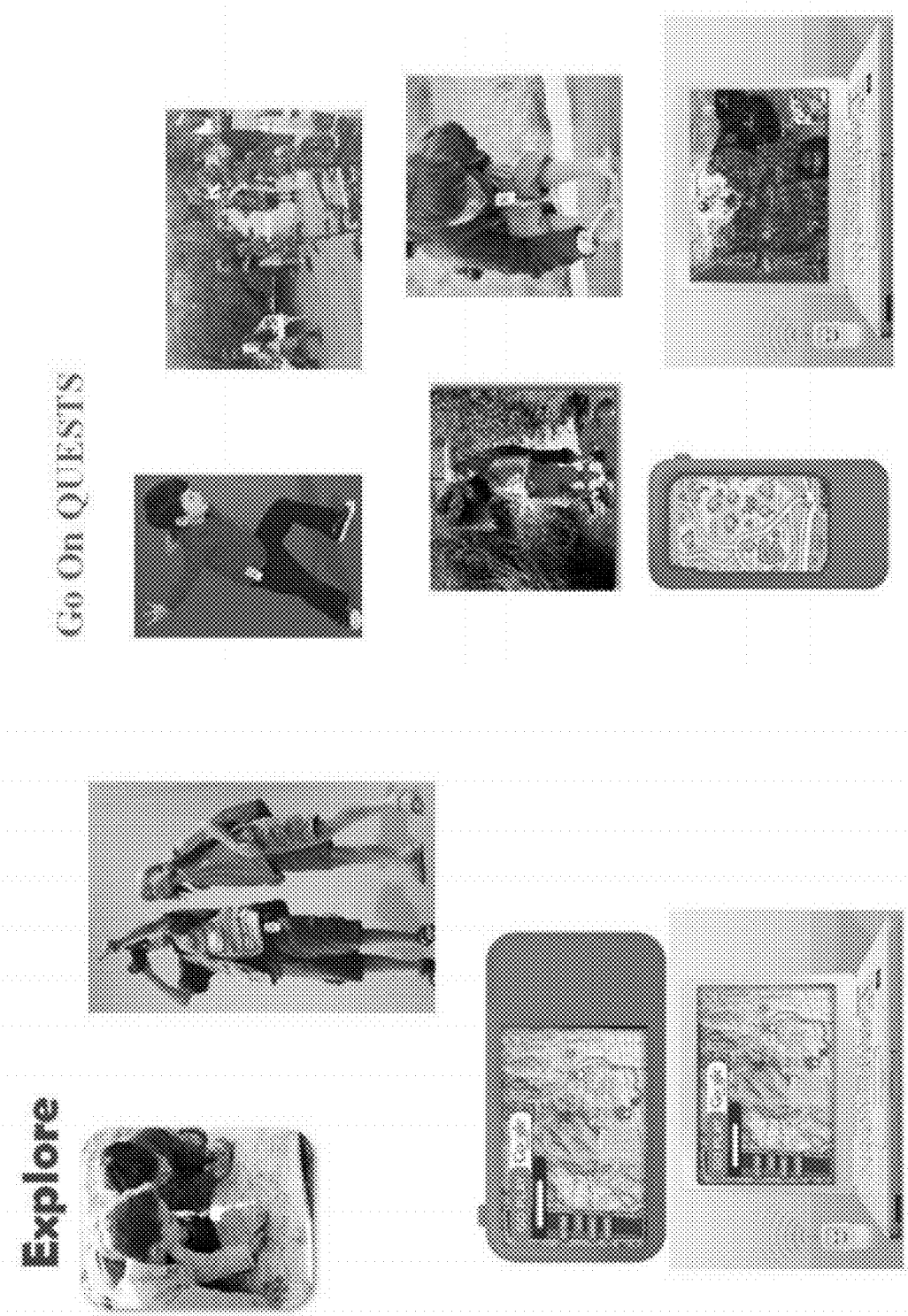

OBJECTIVE

Create a new product that promotes kids' current active and physical behaviors (activities they're already doing), track and capture that activity, and reward them for doing it.

Offer a new, fun & fresh play experience.

Fig. 19

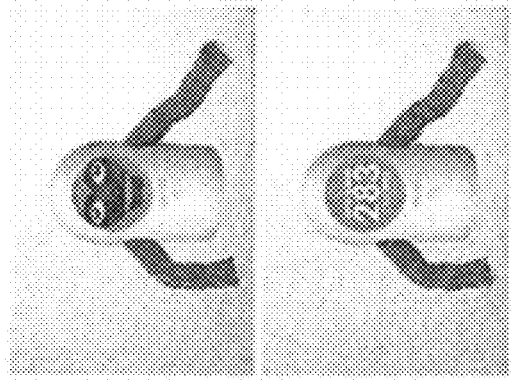
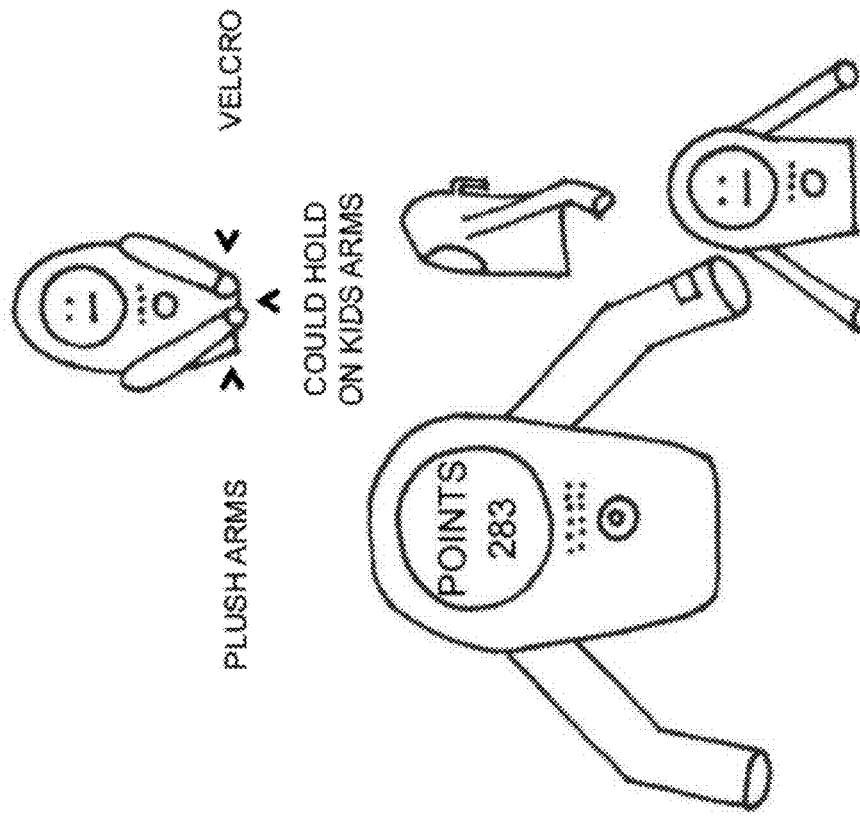
Fig. 25

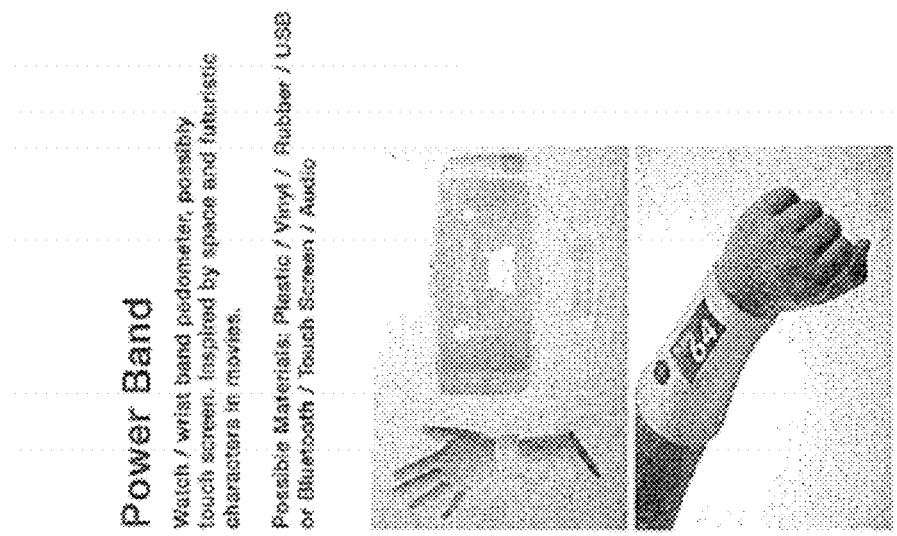
Fig. 30

Wakey
This toy works as a container for the pedometer. The alien shaped body is the container and the pedometer is the head with digital screen and USB connection.
Possible Materials: Plastic / USB / LCD Screen
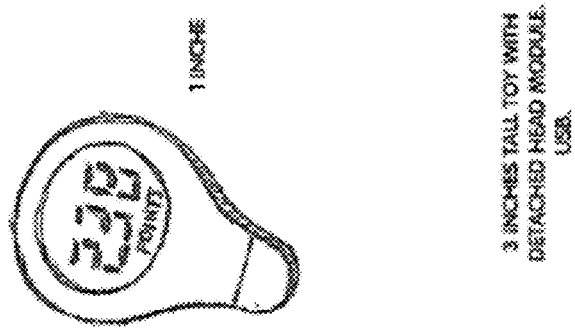
1 INCHES
3 INCHES TALL TOY WITH DETACHED HEAD MODULE. USB
Fig. 36
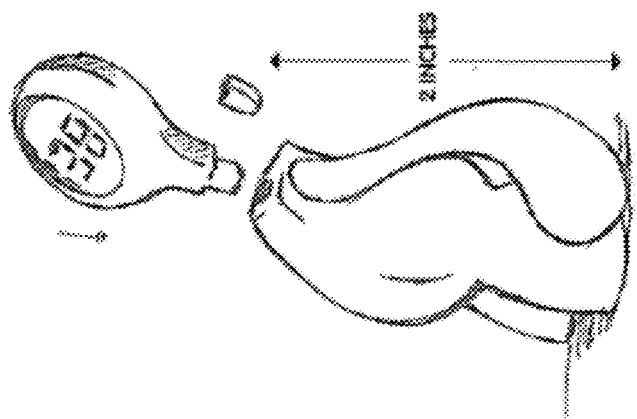
3 INCHES

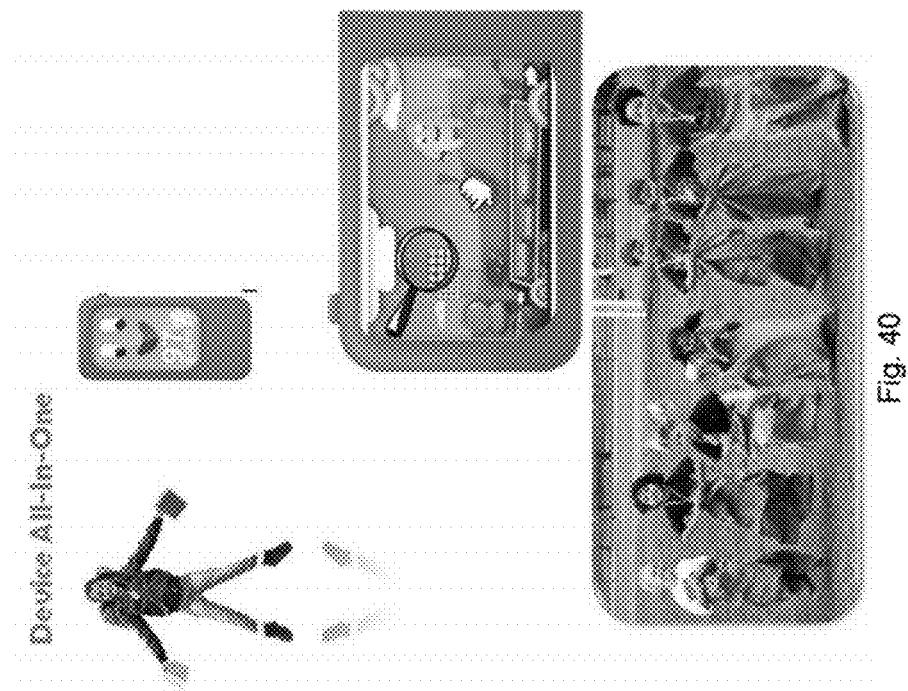
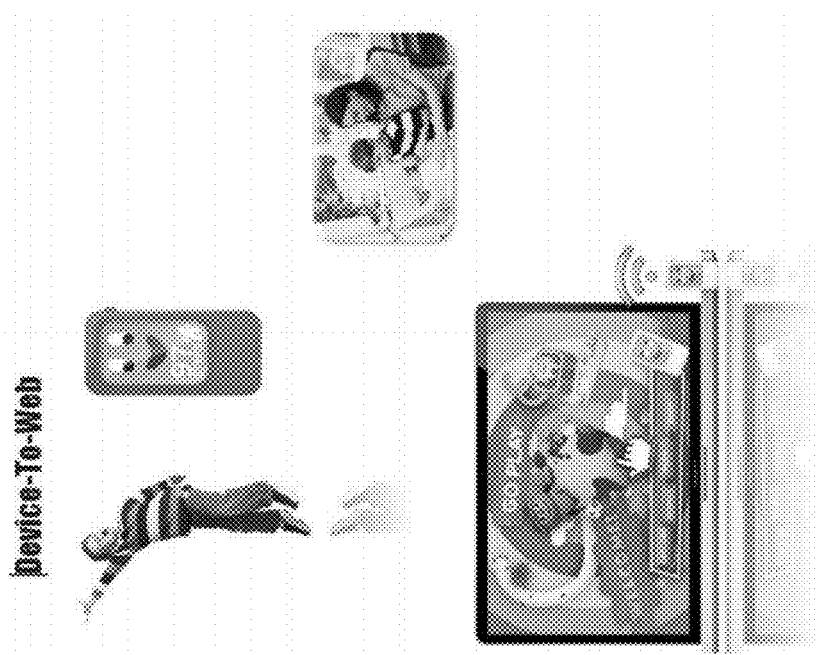

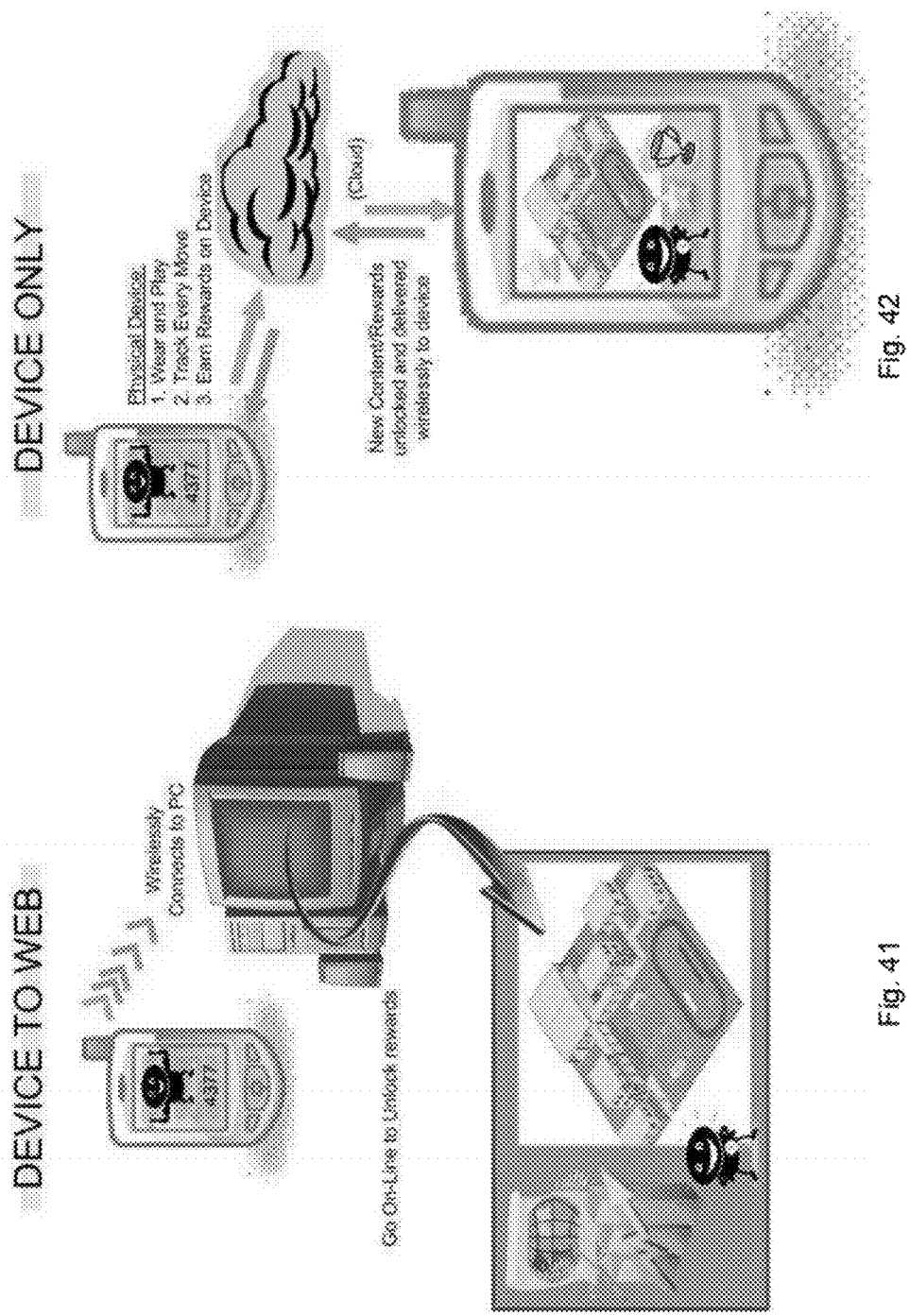

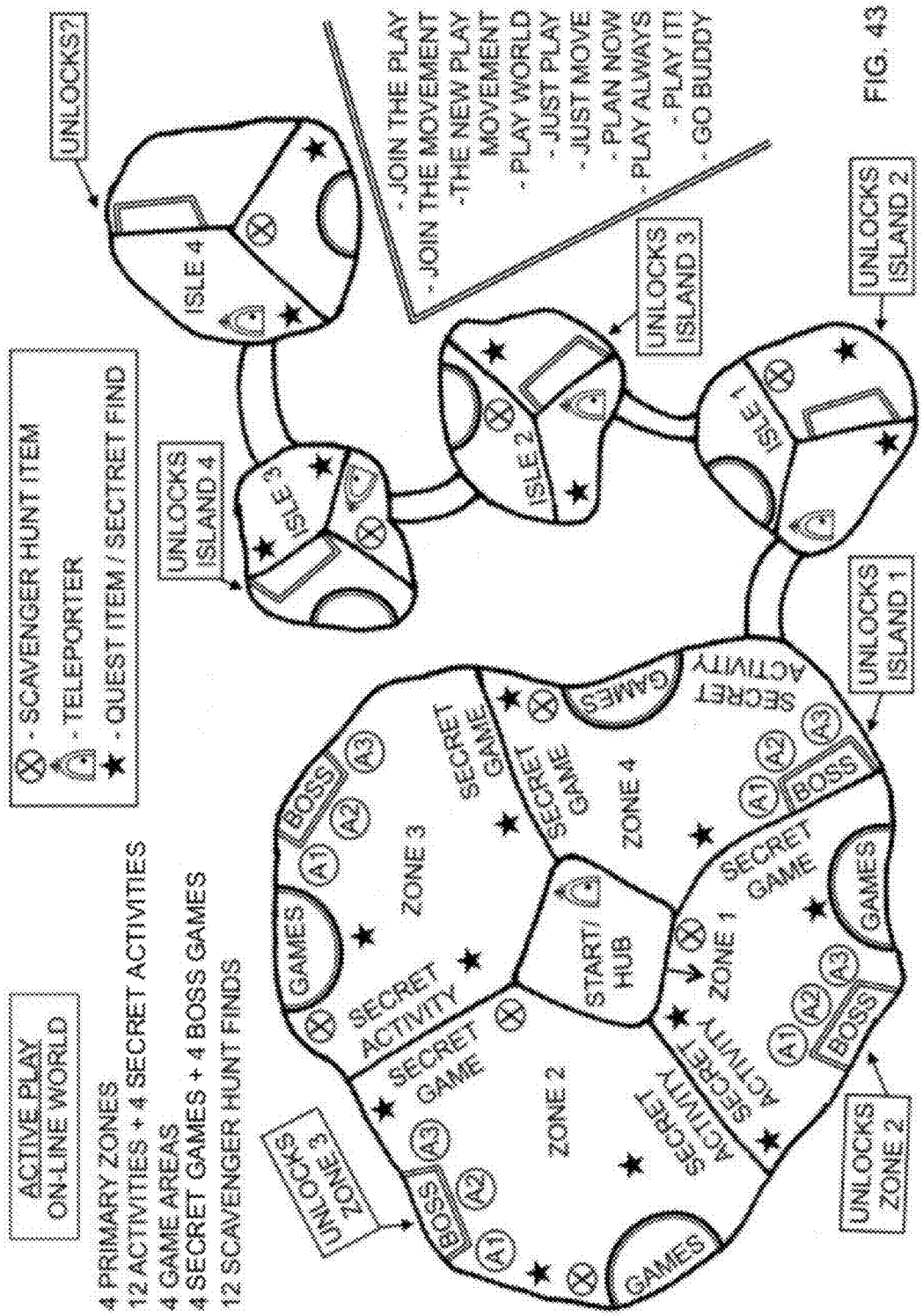

Fig. 61

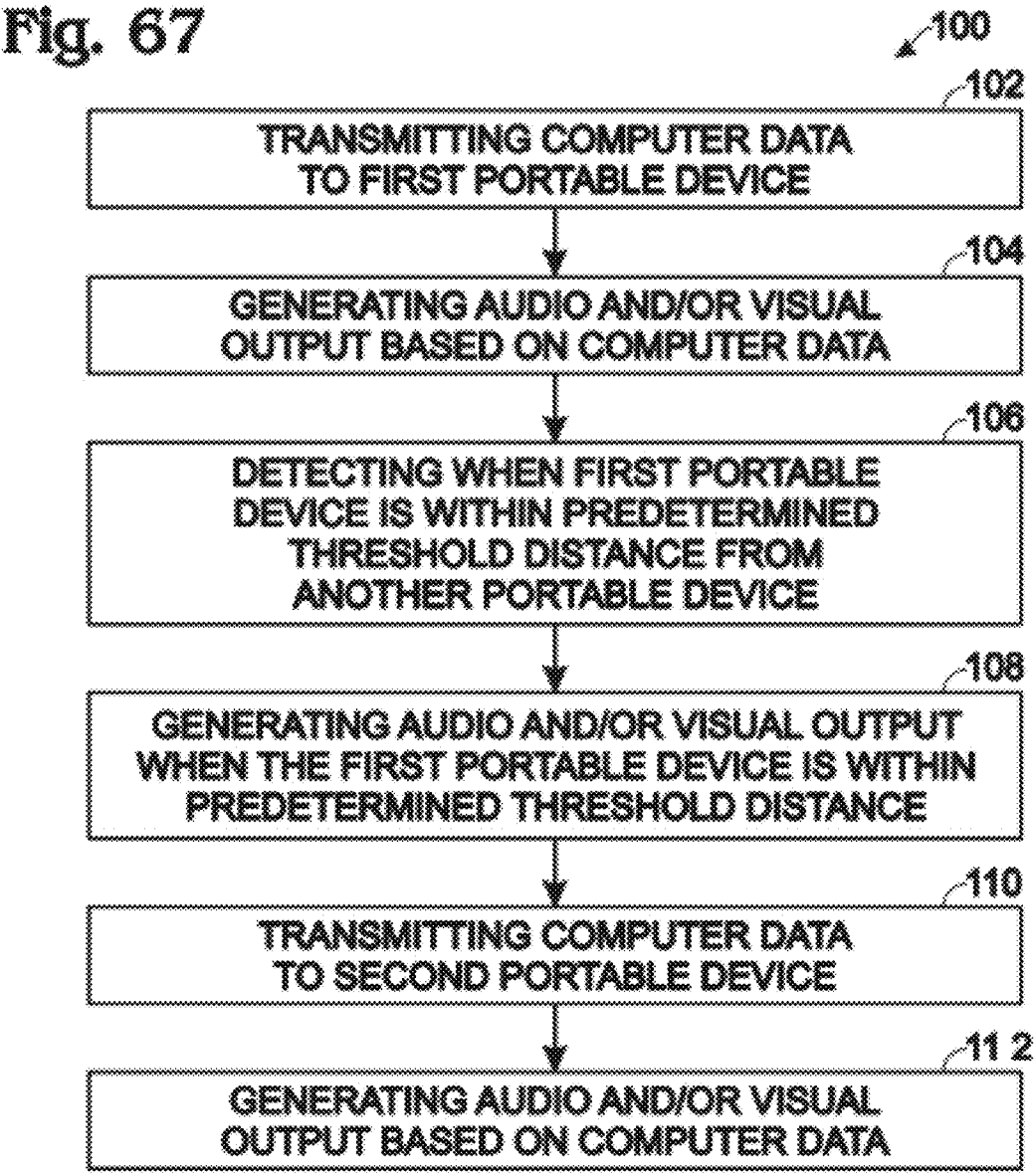

SYSTEMS, METHODS, AND DEVICES FOR ASSISTING PLAY

CROSS-REFERENCE TO RELATED APPLICATIONS

This application claims priority under 35 U.S.C. §119(e) to U.S. Provisional Patent Application Ser. No. 61/314,964 entitled "Systems, Methods and Devices for Assisting Play," filed on Mar. 17, 2010; U.S. Provisional Patent Application Ser. No. 61/315,008 entitled "Systems, Methods and Devices for Assisting Play," filed on Mar. 17, 2010; U.S. Provisional Patent Application Ser. No. 61/315,390 entitled "Systems, Methods and Devices for Assisting Play," filed on Mar. 18, 2010; U.S. Provisional Patent Application Ser. No. 61/322,728 entitled "Systems, Methods and Devices for Assisting Play," filed on Apr. 9, 2010; and U.S. Provisional Patent Application Ser. No. 61/325,737 entitled "Systems, Methods and Devices for Assisting Play," filed on Apr. 19, 2010. The complete disclosures of the above provisional patent applications are herein incorporated by reference for all purposes.

BACKGROUND OF THE DISCLOSURE

Examples of systems, methods and devices for assisting play and/or other activities are disclosed in U.S. Pat. No. 5,779,576, U.S. Pat. No. 6,213,872, U.S. Pat. No. 6,302,789, U.S. Pat. No. 6,499,000, U.S. Pat. No. 7,519,327, and U.S. Pat. No. 7,637,172 and in U.S. Patent Application Publication Nos. US20070197274, US20080027673, and US20100063778. The complete disclosures of the above patents and patent application publications and referenced herein are incorporated by reference for all purposes.

SUMMARY OF THE DISCLOSURE

The present disclosure is directed to a system for assisting play. The system may, in some examples, include a portable computer having a user interface configured to receive input from a user and a computer communication mechanism configured to transmit computer data based, at least in part, on the received user input; and a plurality of portable devices each having an enclosure, a device communication mechanism within the enclosure and configured to receive the computer data, a proximity sensor mechanism configured to detect proximity of one or more other portable devices of the plurality of portable devices, and an audiovisual output mechanism configured to generate at least one of an audio output and a visual output based on at least one of (1) the received computer data and (2) the detected proximity of the one or more other portable devices.

The present disclosure is also directed to a method of assisting play with a portable computer and a plurality of portable devices. The method may, in some examples, include transmitting, via the portable computer, computer data to a first portable device of the plurality of portable devices; generating, via the first audiovisual mechanism of the first portable device, at least one of a first audio output and a first visual output based on the computer data transmitted from the portable computer to the first portable device; detecting, via a first proximity sensor mechanism of the first portable device, when the first portable device is within a predetermined threshold distance from another portable device of the plurality of portable devices; generating, via the first audiovisual mechanism, at least one of a second audio output and a second visual output, when the first proximity sensor mechanism detects that the first portable device is within the predetermined threshold distance; transmitting, via the portable computer, computer data to a second portable device of the plurality of portable devices, the second portable device being different from the first portable device; and generating, via the second audiovisual mechanism of the second portable device, the at least one of the first audio output and the first visual output based on the computer data transmitted from the portable computer to the second portable device.

The present disclosure is further directed to a computer program product. The computer program product may, in some examples, include a computer-readable storage medium that store computer-readable instructions that, when executed, implement a method for assisting play. The method including transmitting data to a first portable device instructing the first portable device to generate at least one of a first audio output and a first visual output; receiving proximity data that indicates that the first portable device is within a predetermined threshold distance from another portable device; and transmitting data to a second portable device instructing the second portable device to generate at least one of the first audio output and the first visual output based on the received proximity data, the second portable device being different from the first portable device.

BRIEF DESCRIPTION OF DRAWINGS

FIGS. 1-67 show various features and functionalities of illustrative examples of systems, methods and devices for assisting play and/or other activities.

FIG. 1 schematically shows an illustrative example of a system for assisting play and/or other activities, including device(s) for assisting play and/or other activities.

FIGS. 2-7 show and outline illustrative examples of systems, methods, and devices for assisting play and/or other activities.

FIGS. 10-17 show and outline illustrative examples of play and/or other activities that may be assisted by systems, methods, and devices for assisting play and/or other activities.

FIGS. 18-38 show illustrative examples of devices for assisting play and/or other activities and that are suitable for use with and/or in systems and methods for assisting play and/or other activities.

FIGS. 39-42 show illustrative examples of options for systems and methods for assisting play and/or other activities.

FIGS. 43-46 show illustrative examples of online components for systems and methods for assisting play and/or other activities.

FIG. 61 shows and outlines illustrative examples of systems, methods and devices for assisting play and/or other activities, generally related to a ball with an integral accelerometer and communication system, used in connection with a handheld or wearable computer of the type shown in FIG. 60.

FIG. 67 shows an illustrative example of a method of assisting play.

DETAILED DESCRIPTION OF THE DISCLOSURE

Figure 1:
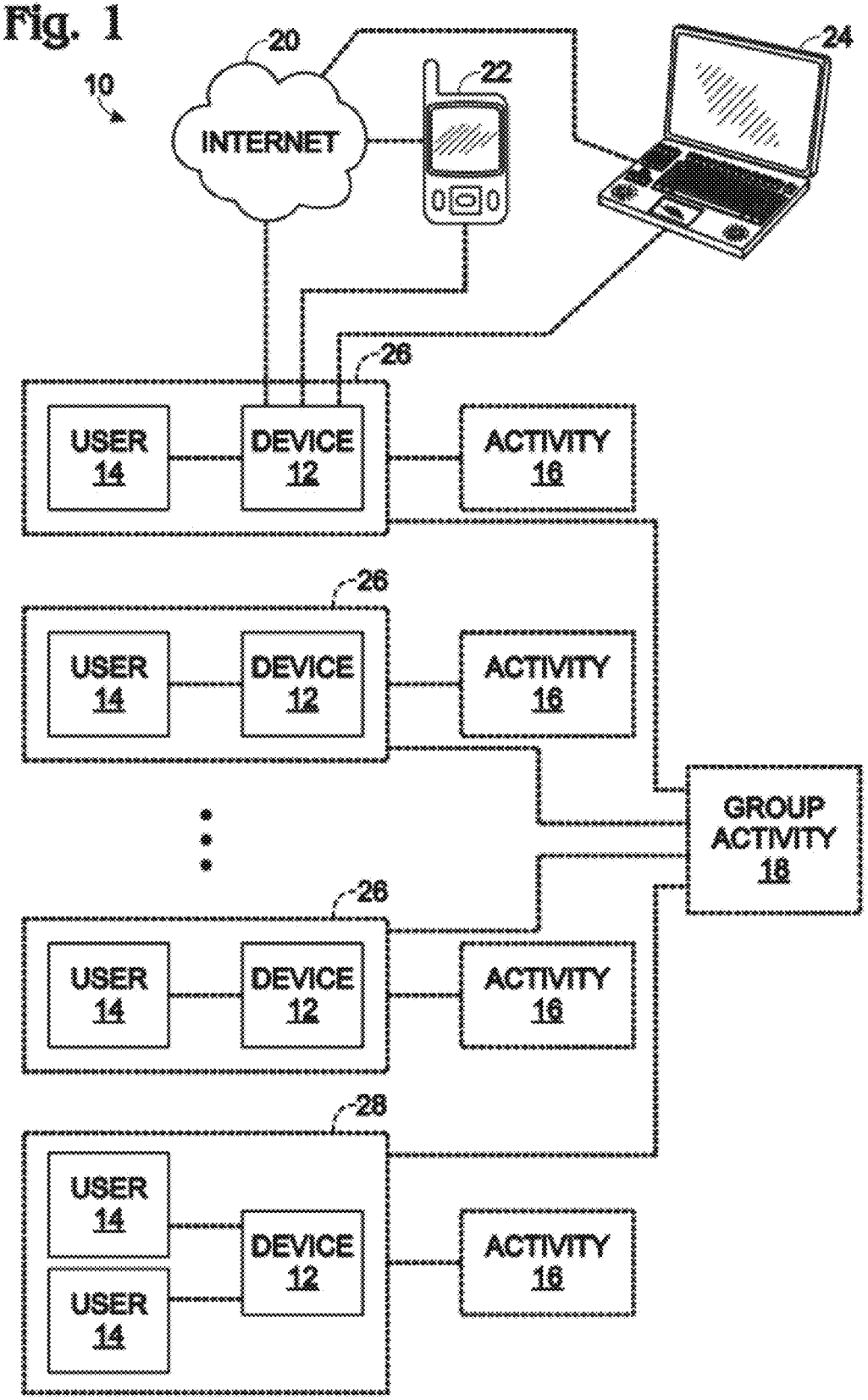

Illustrative examples of systems, methods, and devices for assisting play and/or other activities are shown generally in FIGS. 1-67. Unless otherwise specified, the systems, methods and devices for assisting play and/or other activities may contain at least one of the structures, components, functionalities, concepts, and/or variations described, illustrated, and/or incorporated herein. Where methods are described, the steps of the described methods may be performed in the order in which they are presented below, or the described steps, either alone or in various combinations, may be performed before and/or after any of the other following steps.

FIG. 1 schematically illustrates an illustrative example of an active play platform or system 10 for assisting play and/or other activities. The system 10, which may be used with methods for assisting play and/or other activities, includes one or more devices 12, which may be associated with, and/or used by, one or more users 14 for assisting play, such as by assisting participation in one or more activities 16 and/or a group activity 18. One or more of the devices 12 may be linked and/or connected with the internet 20, a wireless device, such as a cellular or mobile phone 22, and/or a personal computer (PC) 24. In some examples, one or more aspects of the system 10 may reside on and/or be performed via the internet 20, a mobile phone 22 or a PC 24. Each device 12 may be associated with a single user 14, as shown for the user-device combinations 26, or a plurality of users 14 may share a single device 12, as shown for the plural-user-device combination 28.

In some examples, the system may include a single device used by a single user to assist, enhance and/or motivate play and/or other activities. In some examples, the system may include a plurality of devices, which may be used by a plurality of users to assist, enhance and/or motivate play and/or other activities. In some examples, the plurality of devices of the system may be linked and/or connected. Methods for assisting play and/or other activities may involve one or more users using one or more devices to perform, execute and/or use the system to assist, enhance and/or motivate play and/or other activities.

Systems for assisting play and/or other activities may include the device, a "companion" on the device, and a virtual online world. In some examples, the devices may be relatively small in size, with a sleek and/or smooth exterior, and may include suitable internal components selected to provide a desired level of functionality and/or size for the device. For example, the devices may include an LCD screen, a suitable number of buttons, such as two or three, a suitably-sized LED display, which may be a 3-color display, a small speaker, and an accelerometer.

Illustrative examples of suitable devices are illustrated in FIGS. 18-38. The physical devices may be worn and/or carried and may include a lanyard, strap, belt, or belt clip, such that kids may wear the devices. In some examples, the devices may be configured as a Personal Play Assistant, or PPA, such as in the manner of an adult Personal Digital Assistant (PDA). For example, the devices may be configured such that kids want to and/or do carry the device at all times. Carrying the device at all times, or for significant periods of time, may permit use of the devices for health monitoring purposes.

The device may be any suitable size, such as about 2.7 inches (69 mm) high by about 1.8 inches (46 mm) wide by about 0.3 inches (8 mm) deep or thick), and may include components such as color LCD screen, accelerometer, wireless (RF) transmitter/receiver, R/W memory/chip, speaker, and/or various sensors.

The device may track a user's or kid's every move. For example, the more the user moves around off-line, the more functionality the user may access or unlock online, as will be more fully discussed below. Off-line and/or real-world activity may be the key to unlocking online fun for the user. The device may be worn all the time. A user may have more reasons to play, and may play with more purpose due the rewards provided for play or other activities. A user may wear the device, on the waist, clipped to the belt, on a finger tip, as a ring, or the like.

Illustrative examples of components that may be included in the device may include a color screen, an accelerometer, microcontroller, such as an ARM7, RAM Memory, flash Memory, provisions for connectivity to a personal computer, a housing, which may be plastic, a battery, suitable product packaging, suitable on-device content, and data collection/management. The device may track and or record such variables as speed, winning times or decoy strategies. Tracked variables and/or information regarding offline activities may be used to, and/or may lead to, enhanced online functionality.

The color screen may be a basic color LCD or color touch screen, which may have a suitable number of colors, such as one, two or three, and may have dimensions of about 1.5 inches×1.5 inches (38 mm by 38 mm) to about 1.5 inches×3 inches (38 mm by 76 mm. The color screen may display a character and/or a number of moves, as will be more fully discussed below. In some examples, the color screen may provide for some light interaction/game play, as will be more fully discussed below. The accelerometer may track the user's movements in one, two or three axes. The RAM Memory may be within a range of about 1 to 64 MB, such as about 16 MB. The flash Memory may be within a range of about 512 MB to 16 GB, such as about 2 GB. Connectivity to a PC may be by way of a USB port or via one or more methods of wireless connectivity, including RF or Wi-Fi. In some examples, the battery may be rechargeable via USB connection. The on-device content may include animations, or the like. The data collection/management may be software-based.

In some examples, the device may include a gyroscope, a GPS, and one or more sensors such as vertical, horizontal, light, touch, and temperature sensors. A gyroscope may allow measurement of a relatively wider variety of movement and/or more in-depth movement.

Figure 11:
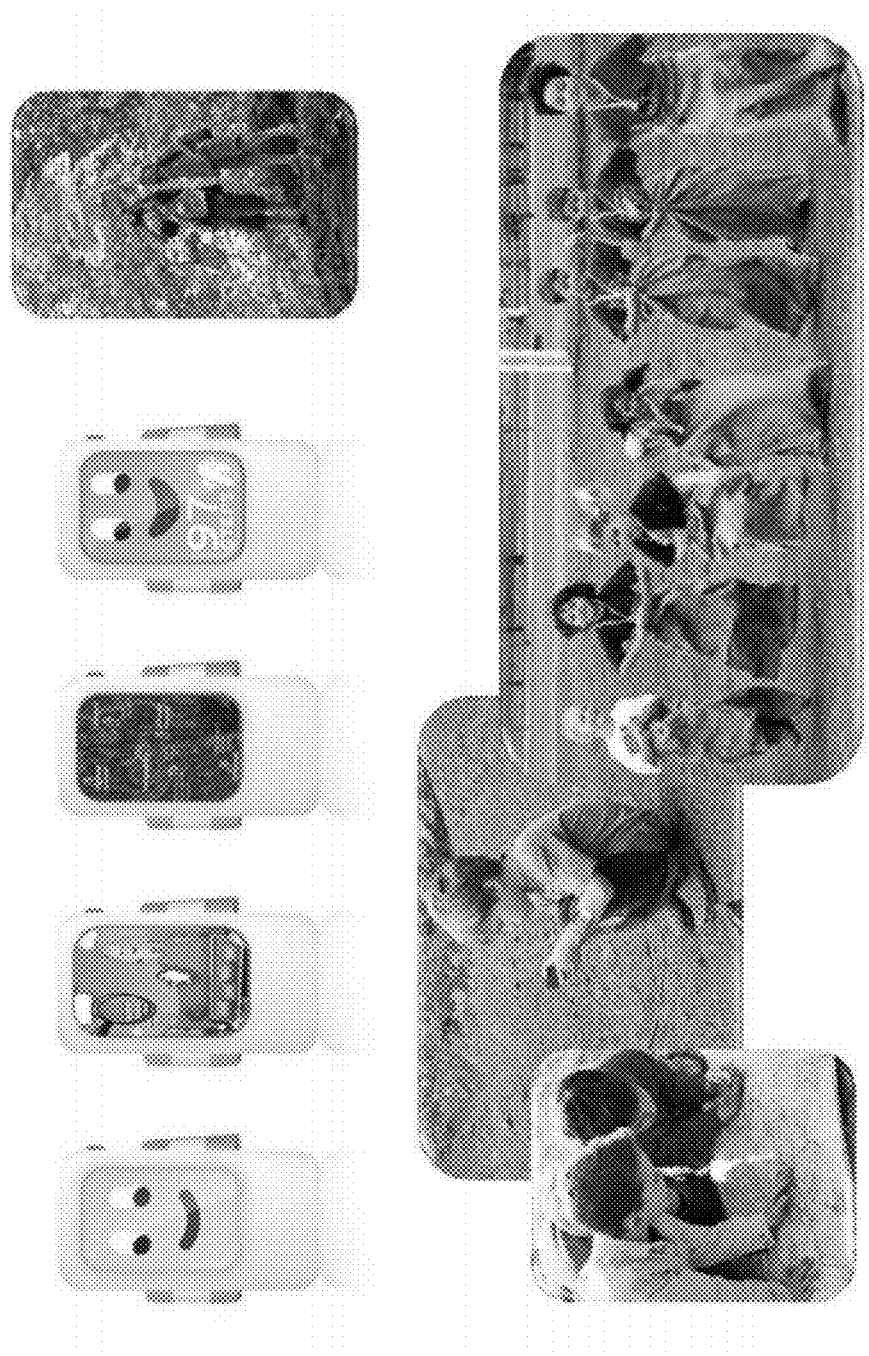
Figure 12:
Figure 13:
Figure 14:
Figure 15:
Figure 18:
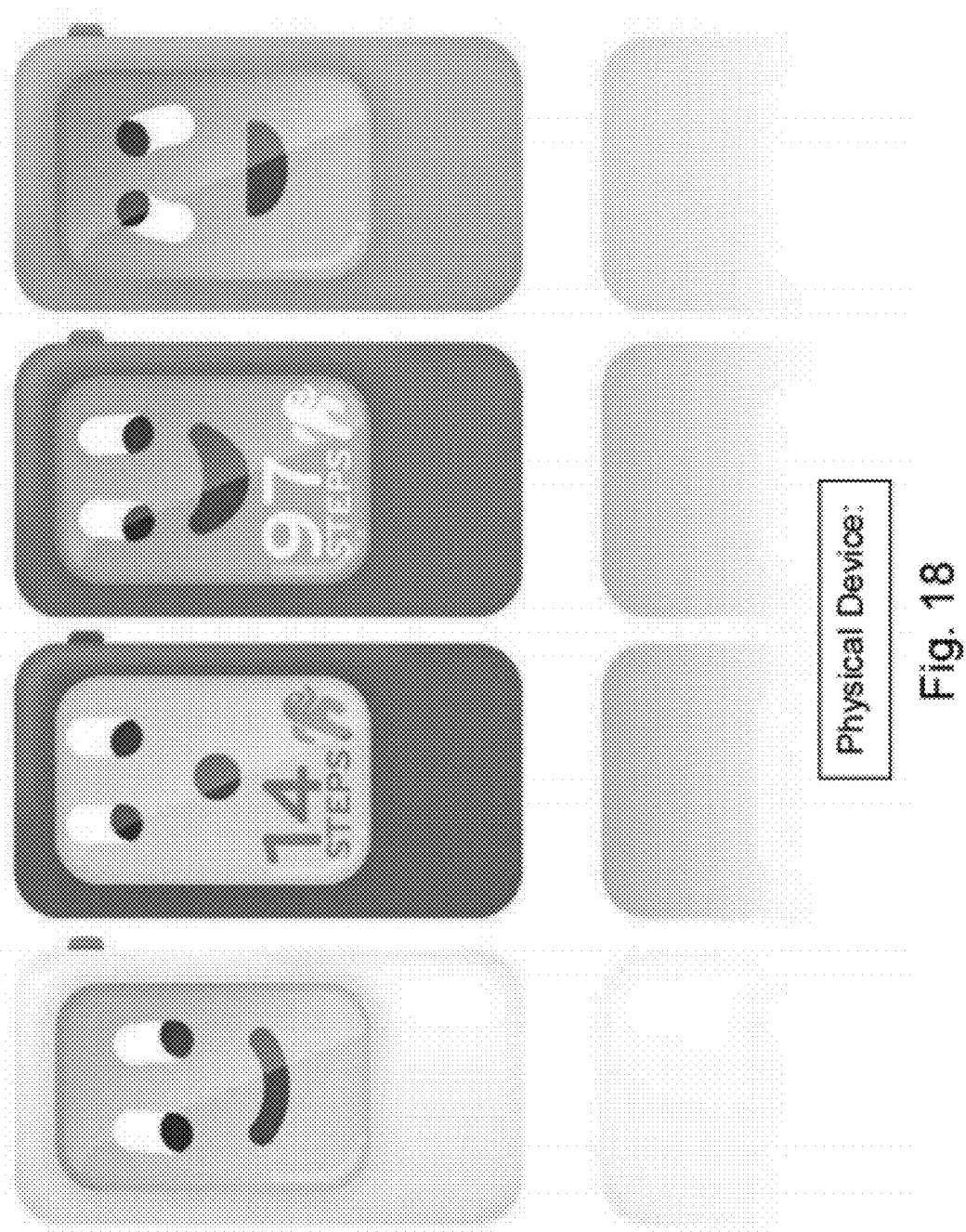
Figure 20:
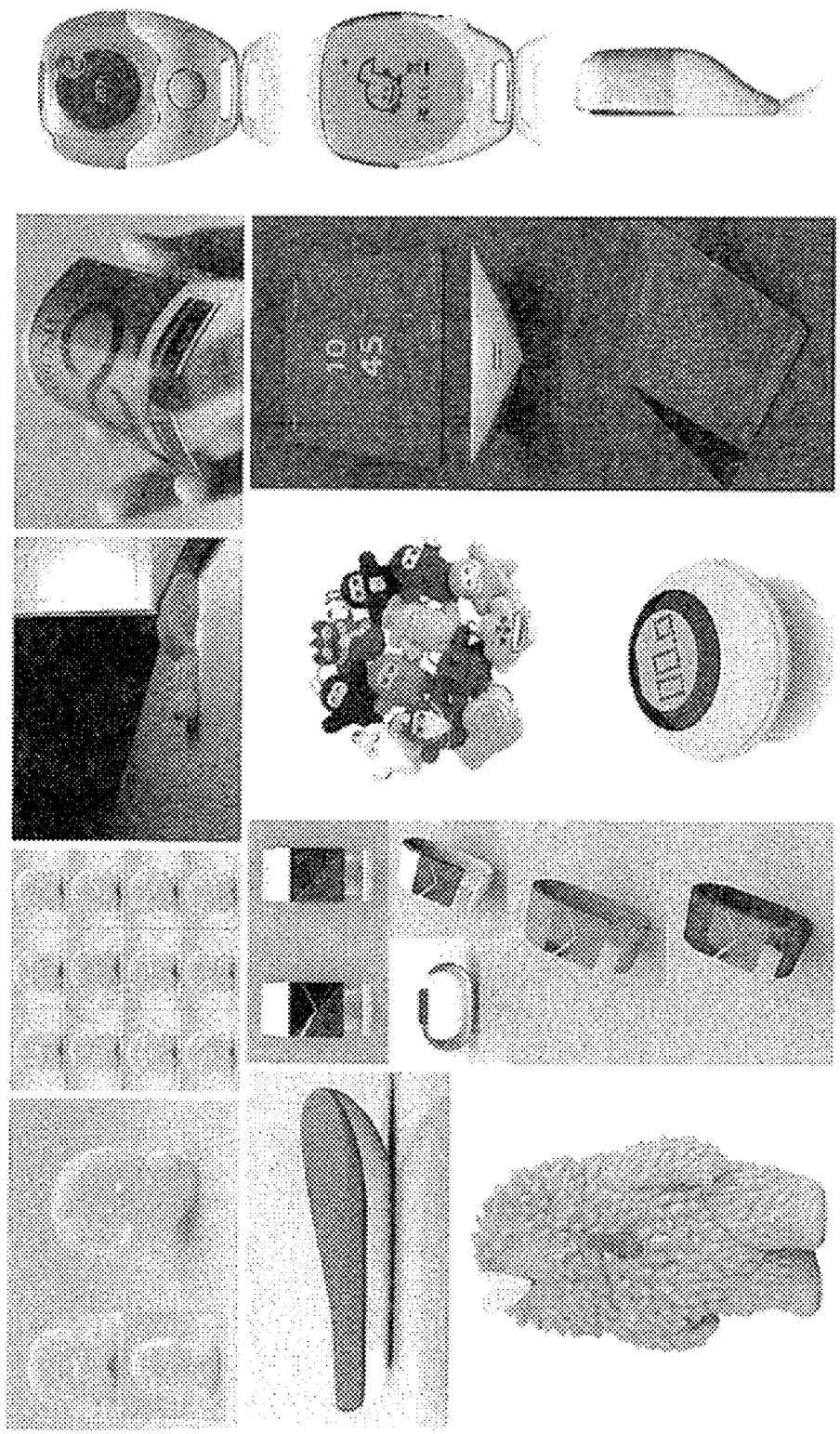
Figure 21:
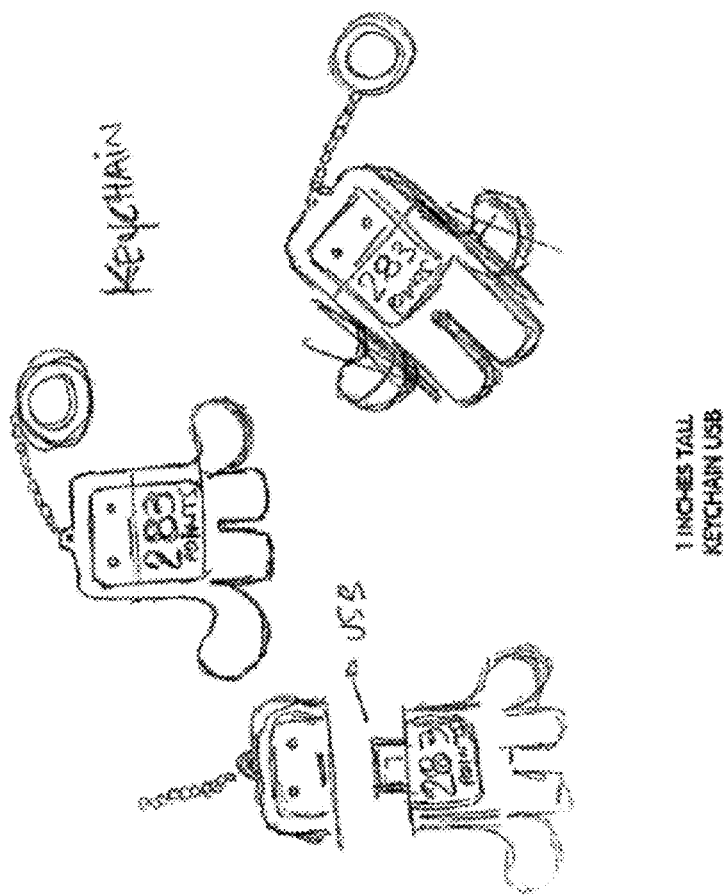
Figure 22:
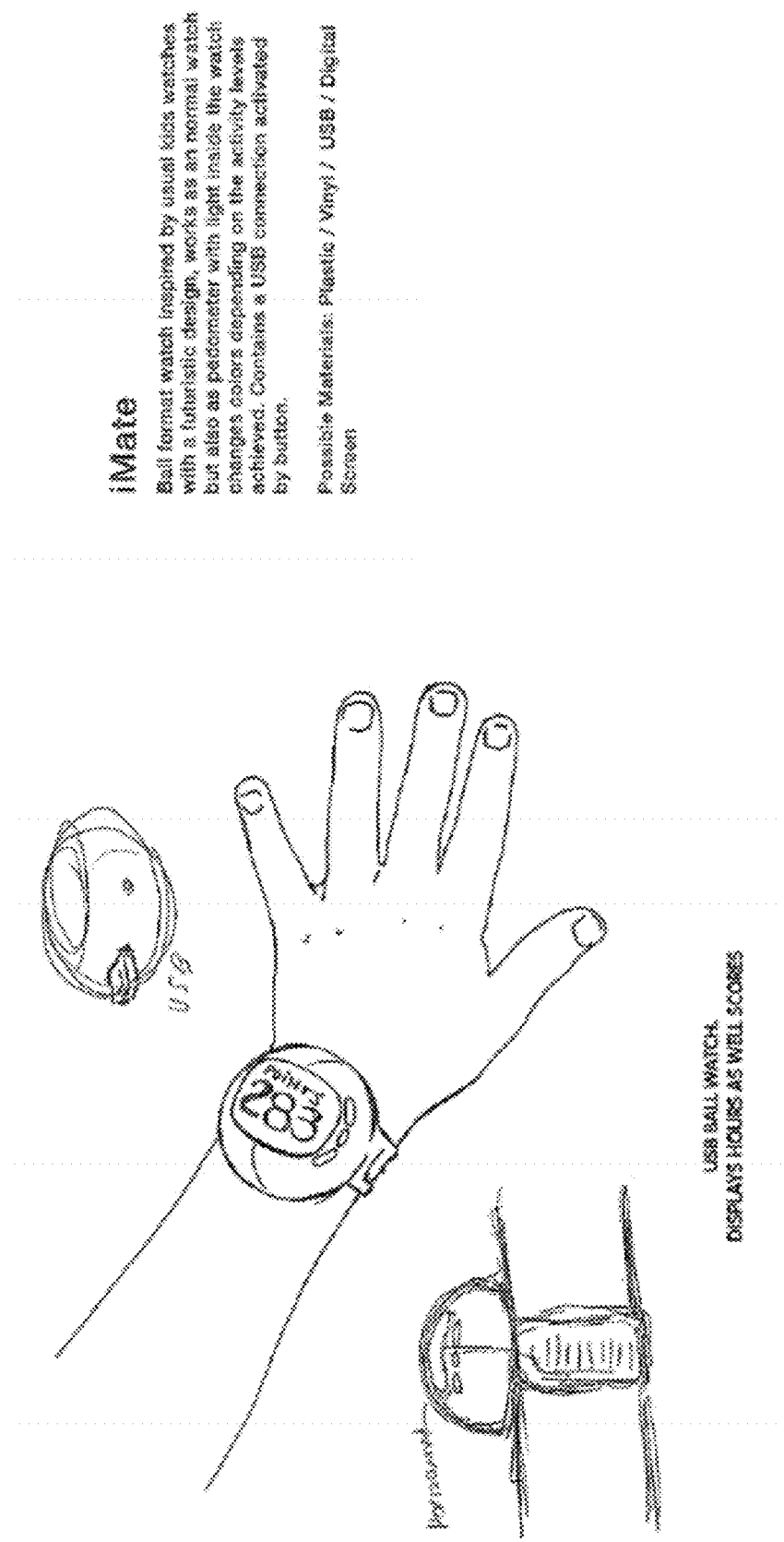
Figure 23:
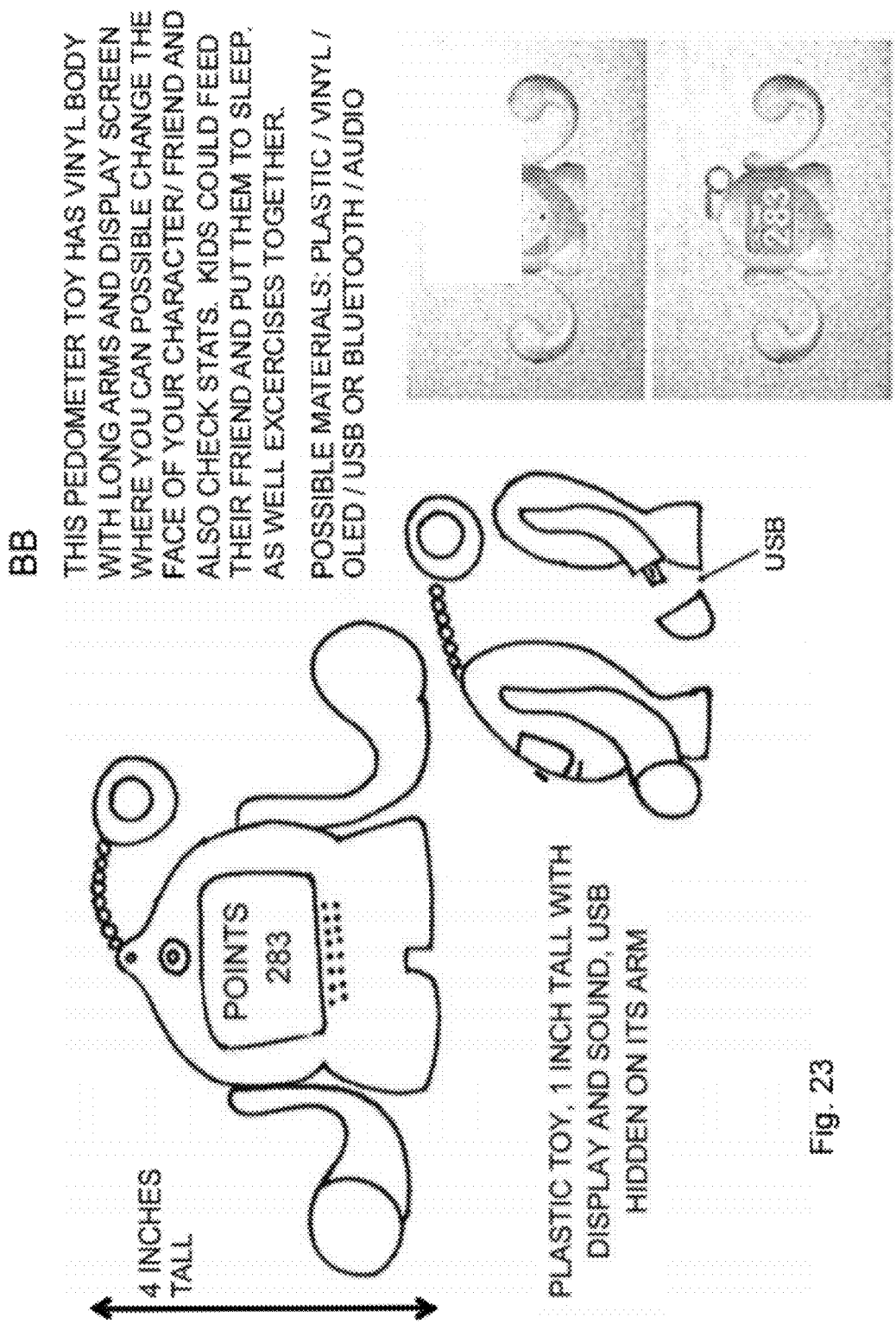
Figure 24:
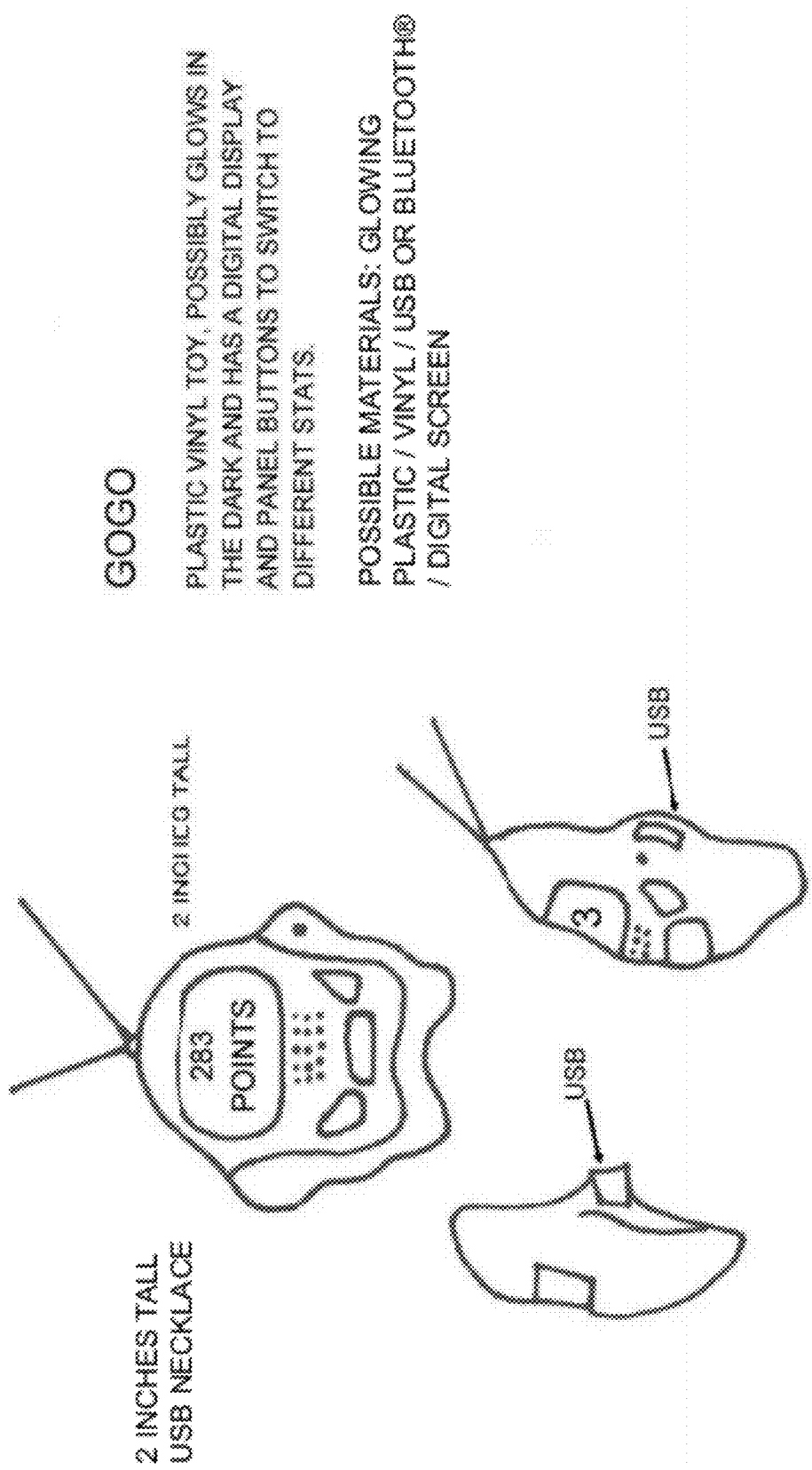
Figure 26:
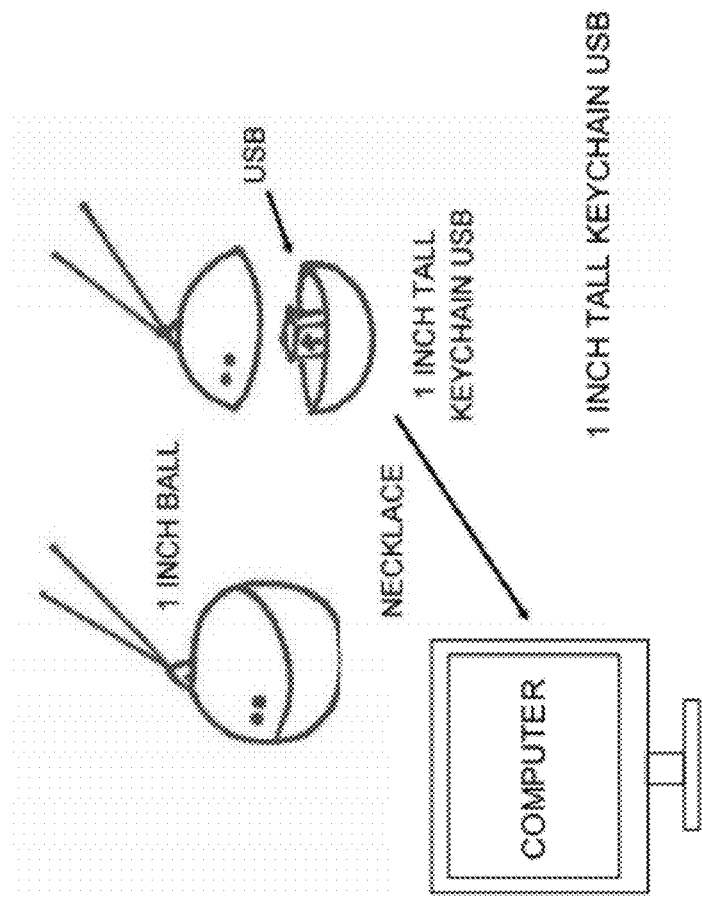
Figure 27:
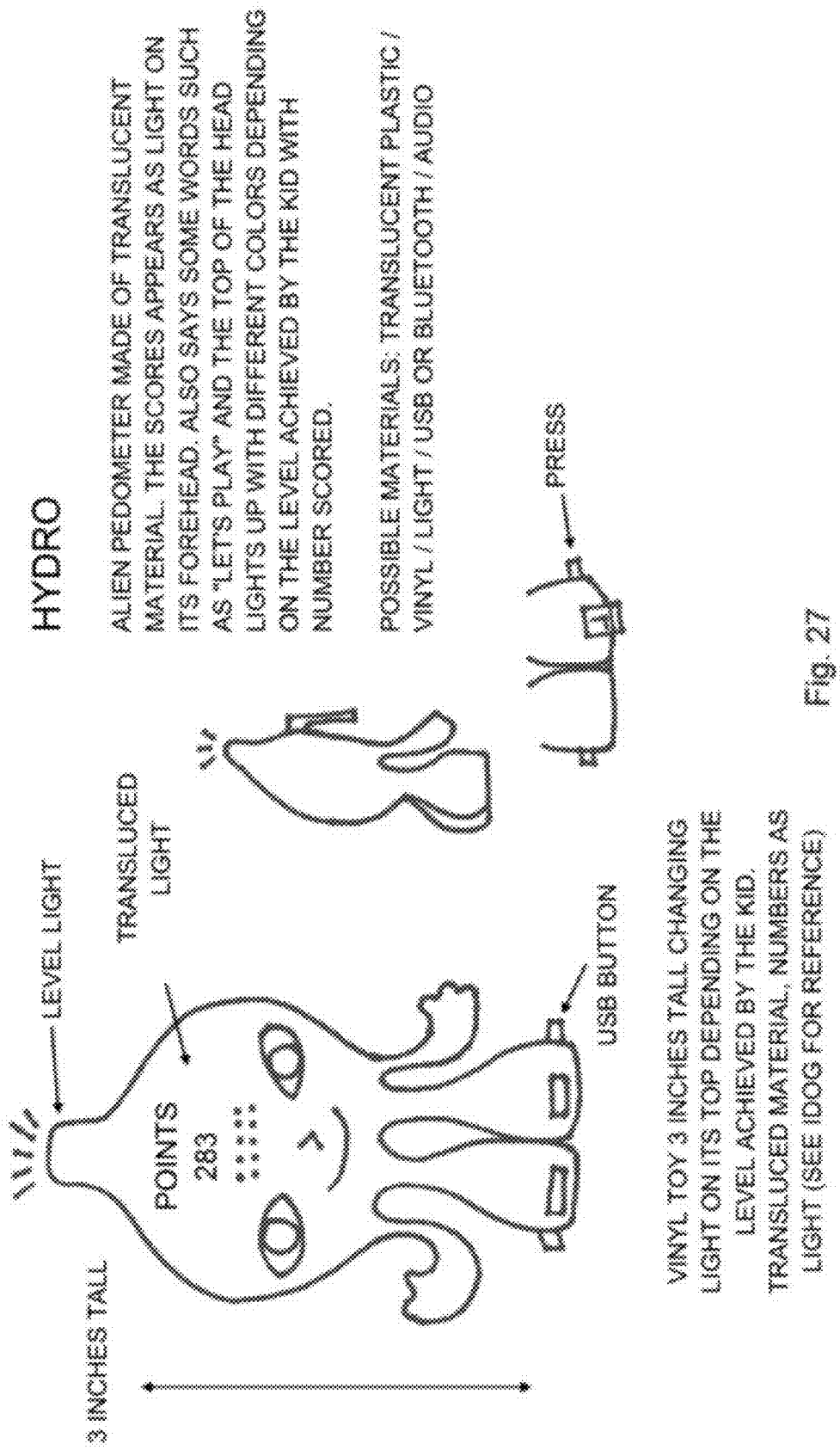
Figure 28:
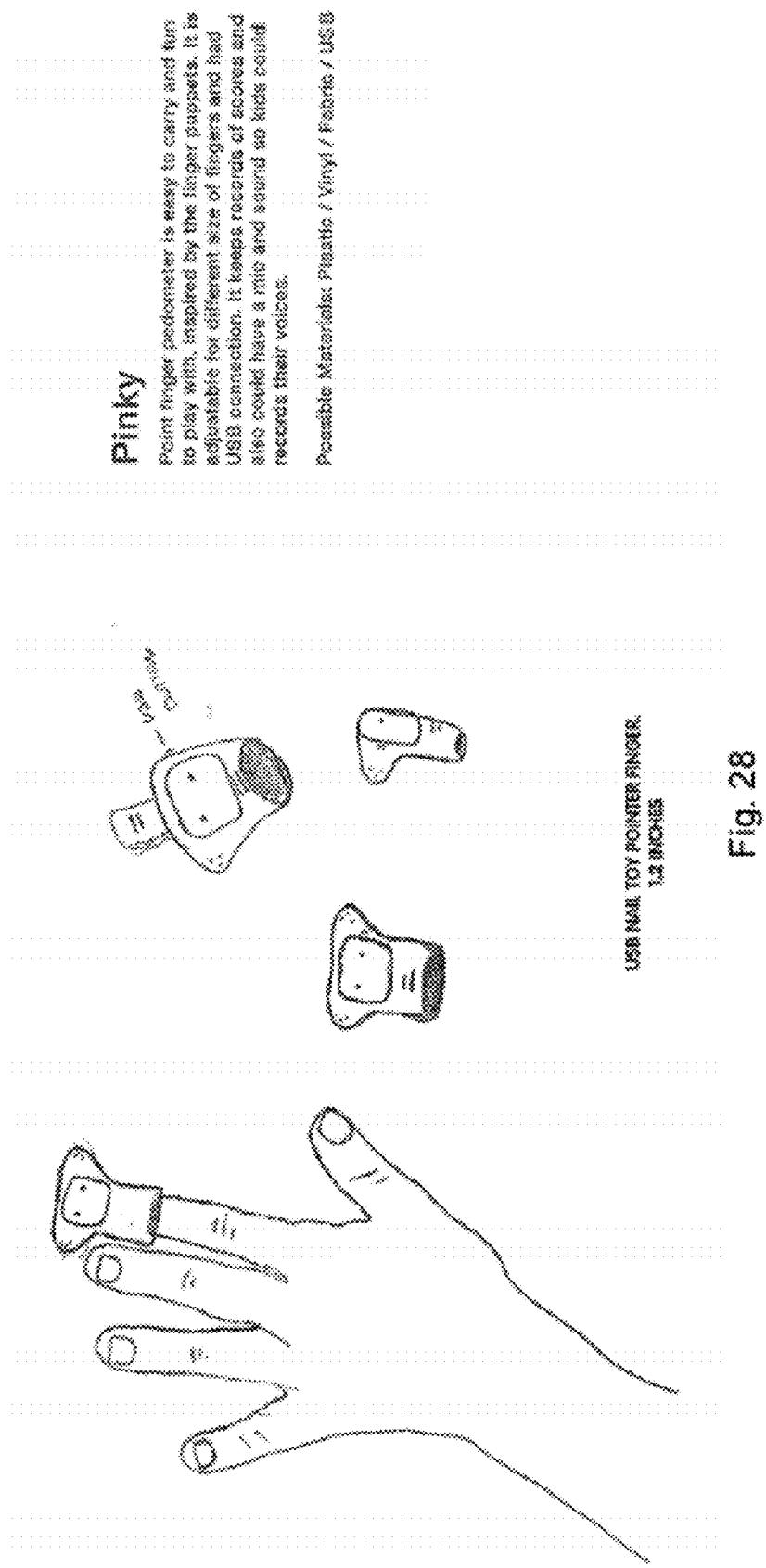
Figure 29:
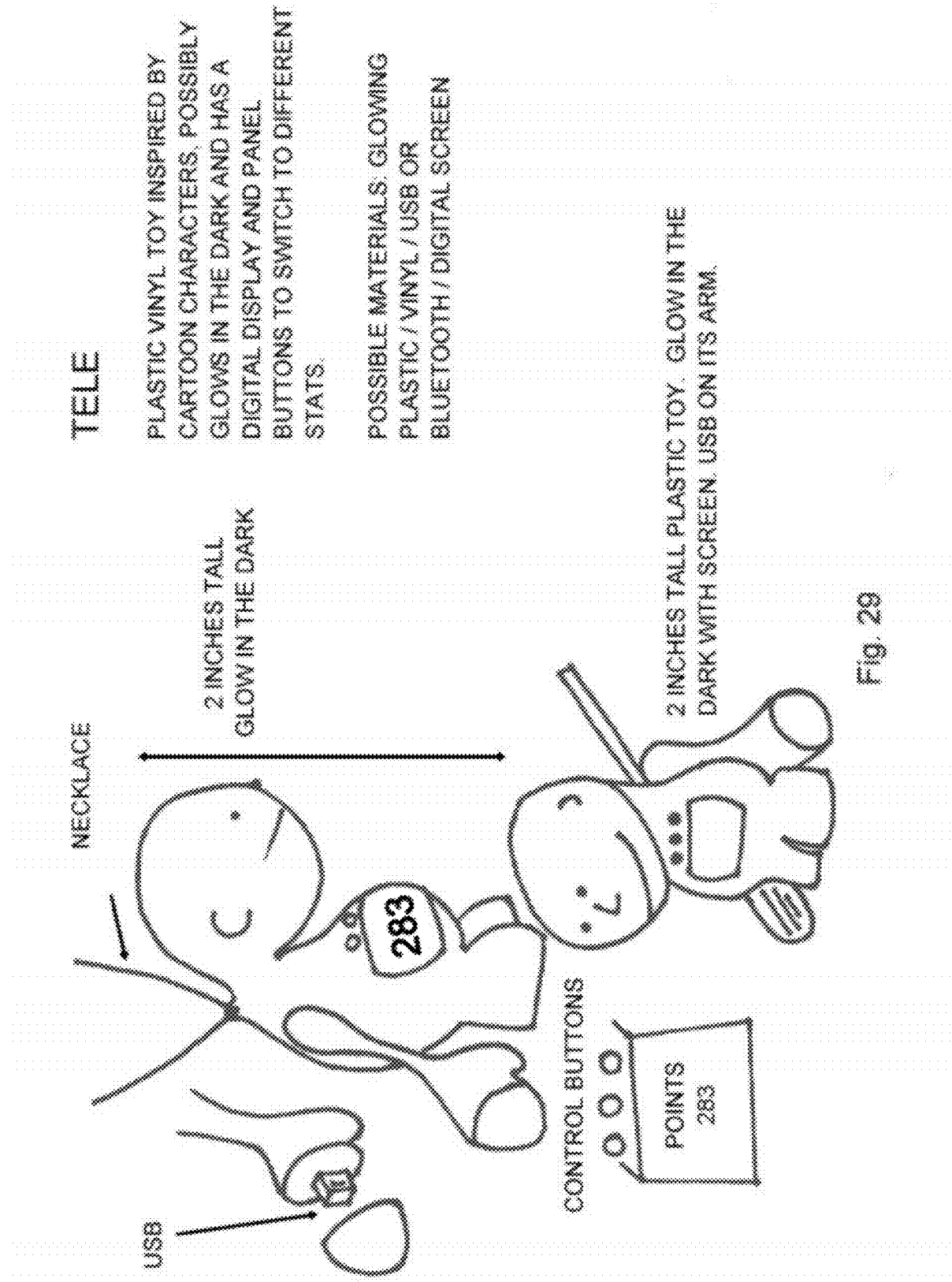
Figure 31:
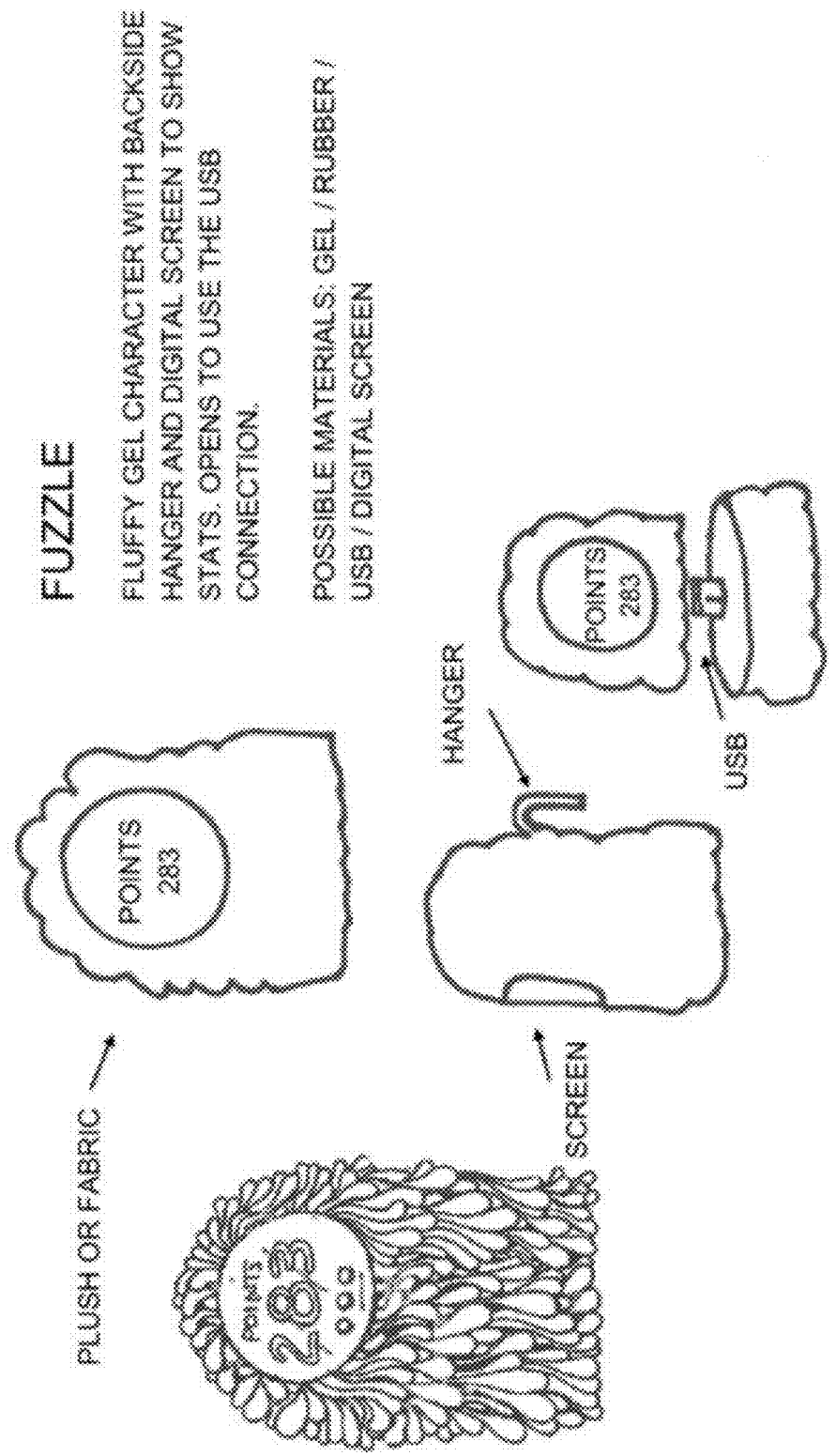
Figure 32:
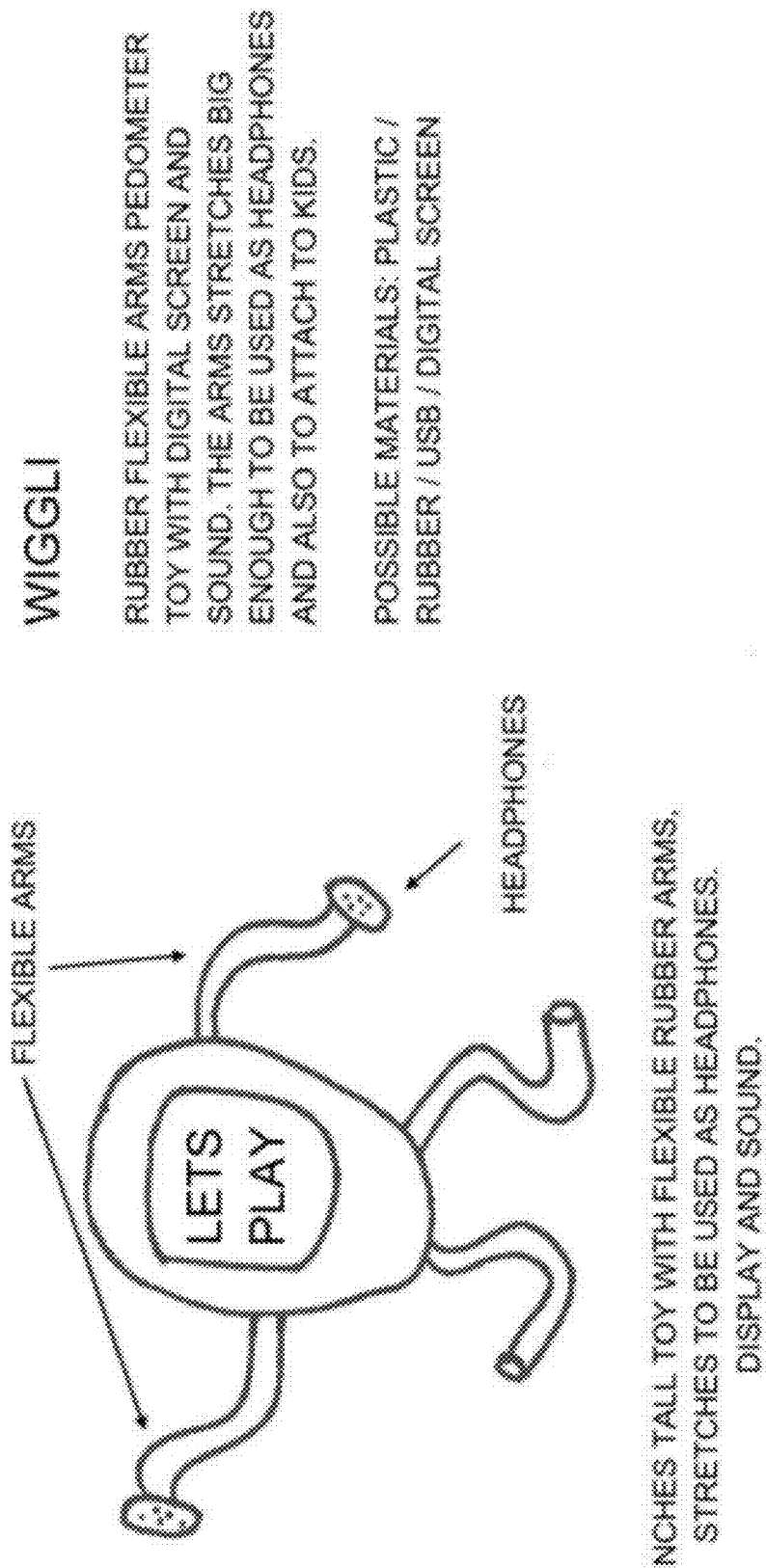
Figure 33:
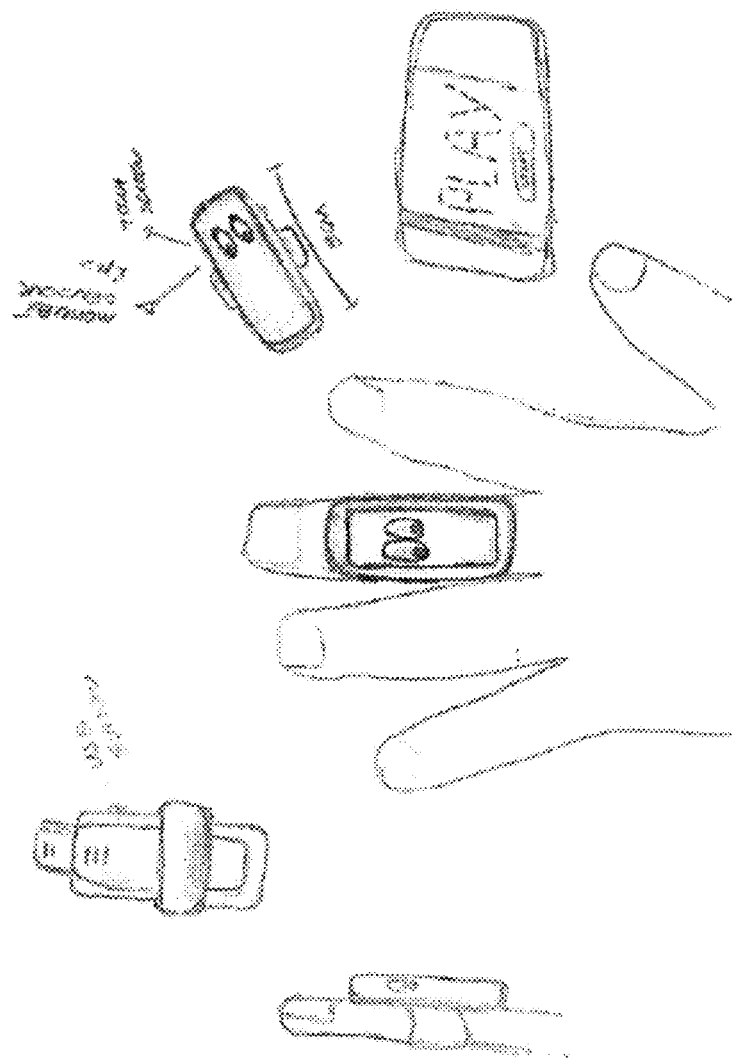
Figure 34:
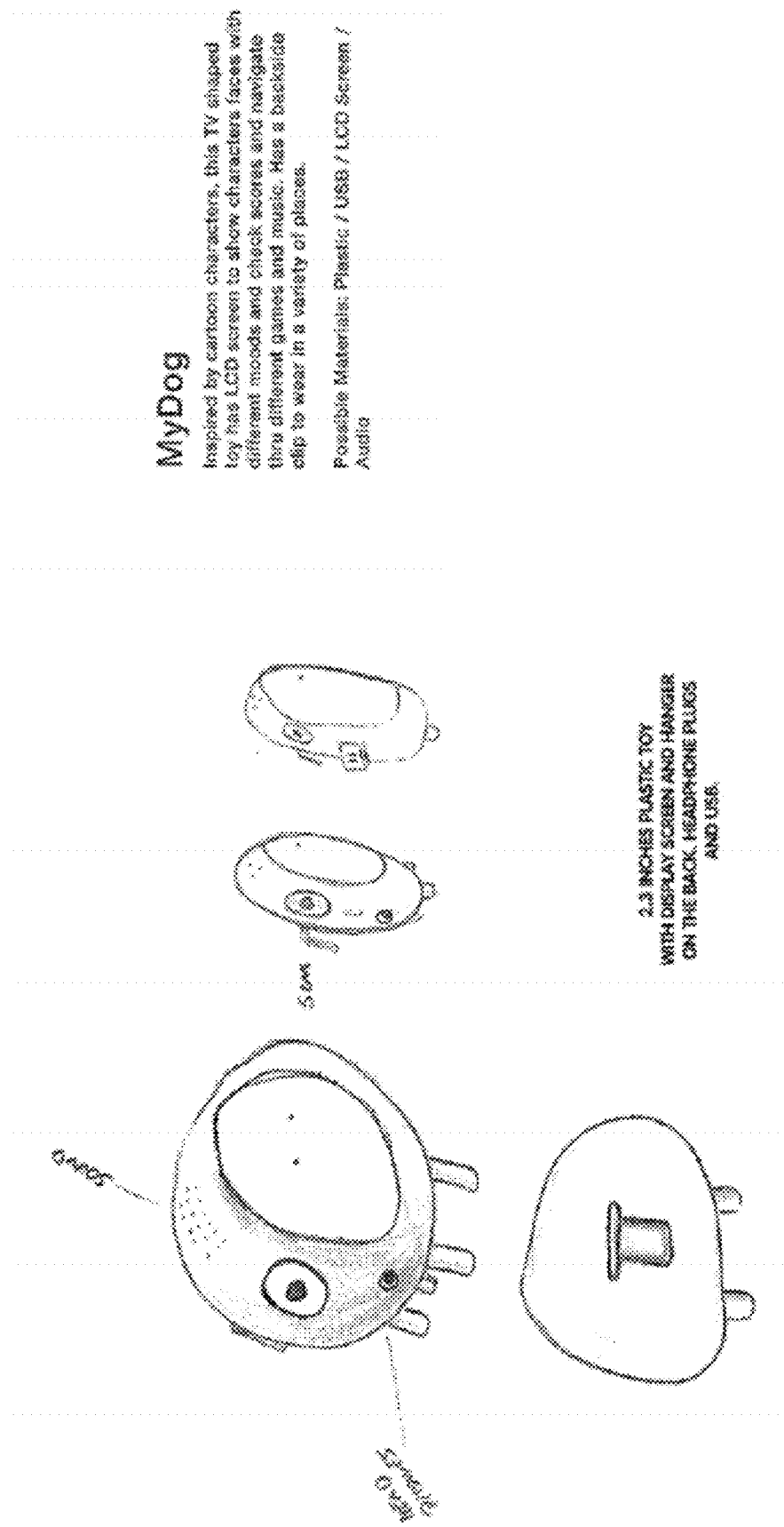
Figure 35:
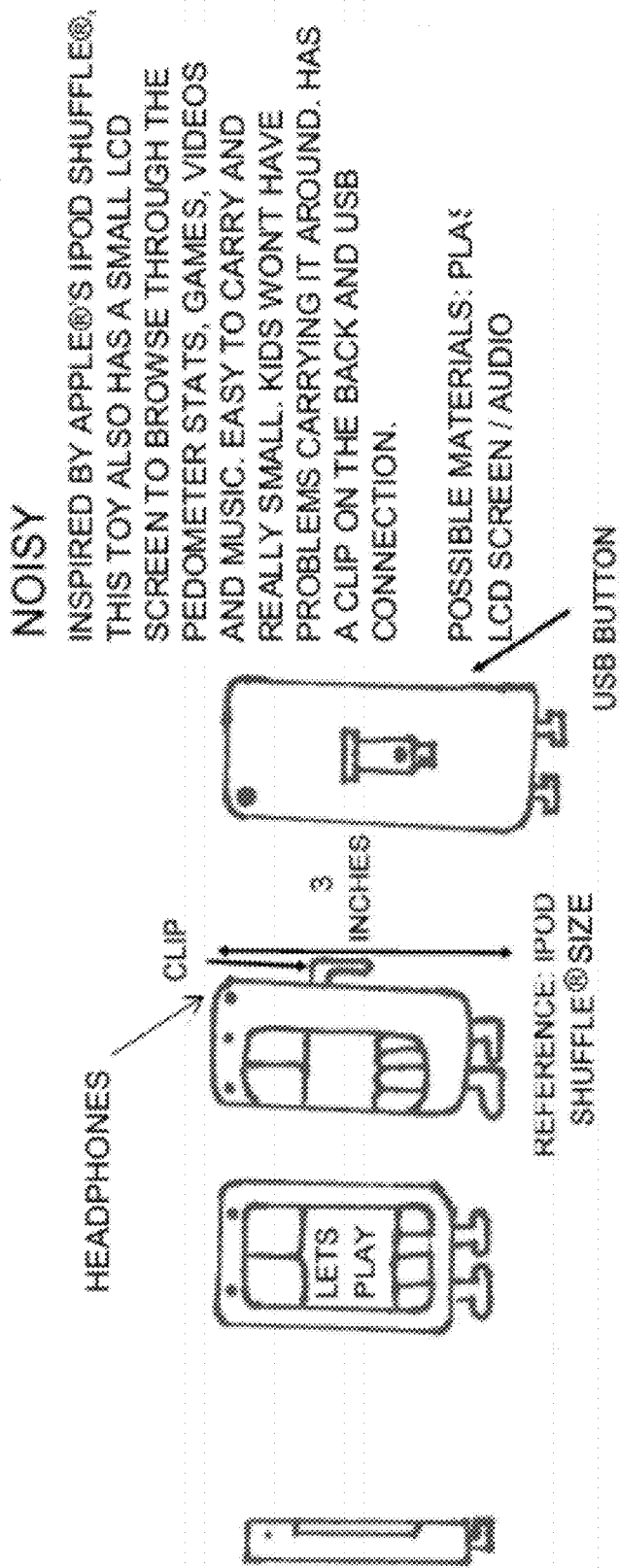
Figures 37, 38:
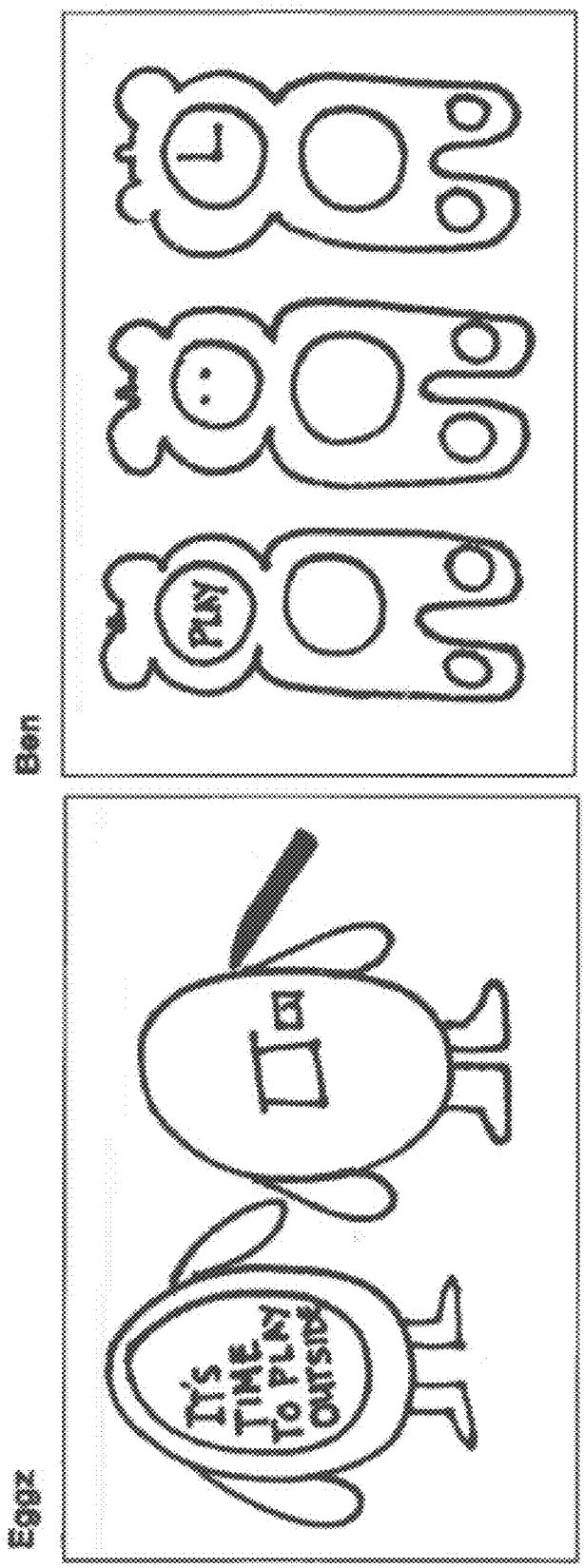
Figure 44:
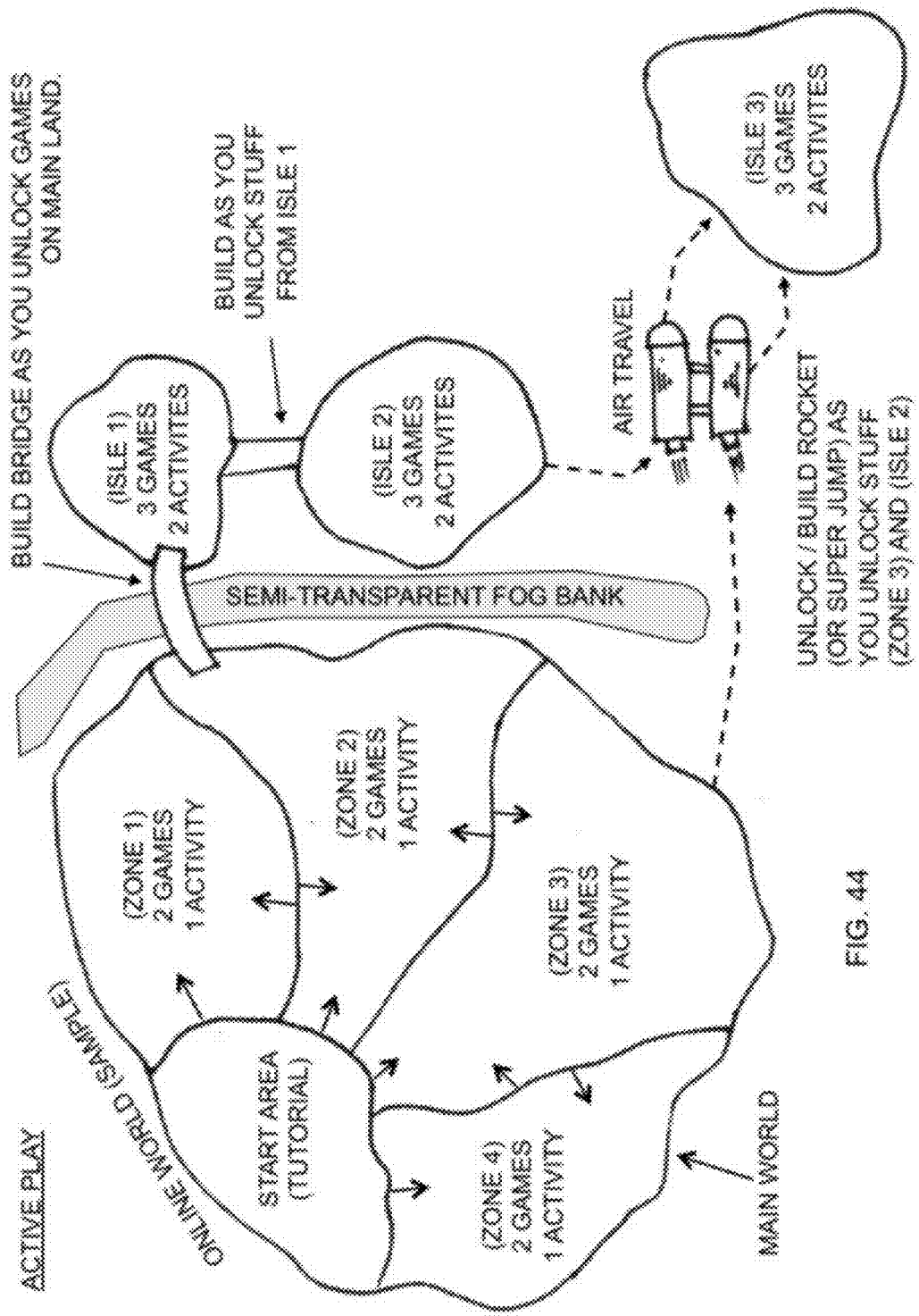
Figure 45:
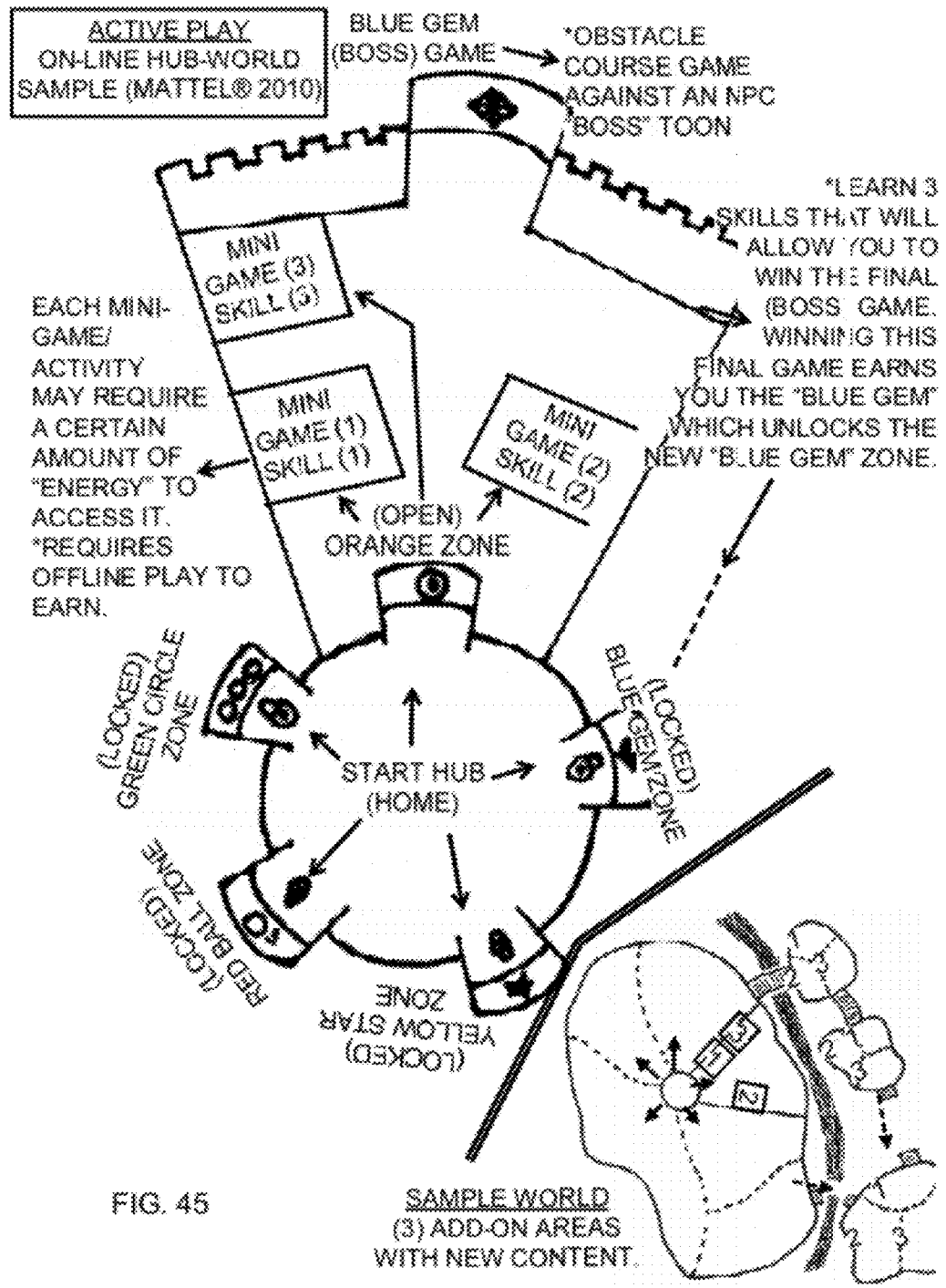
Figure 46:
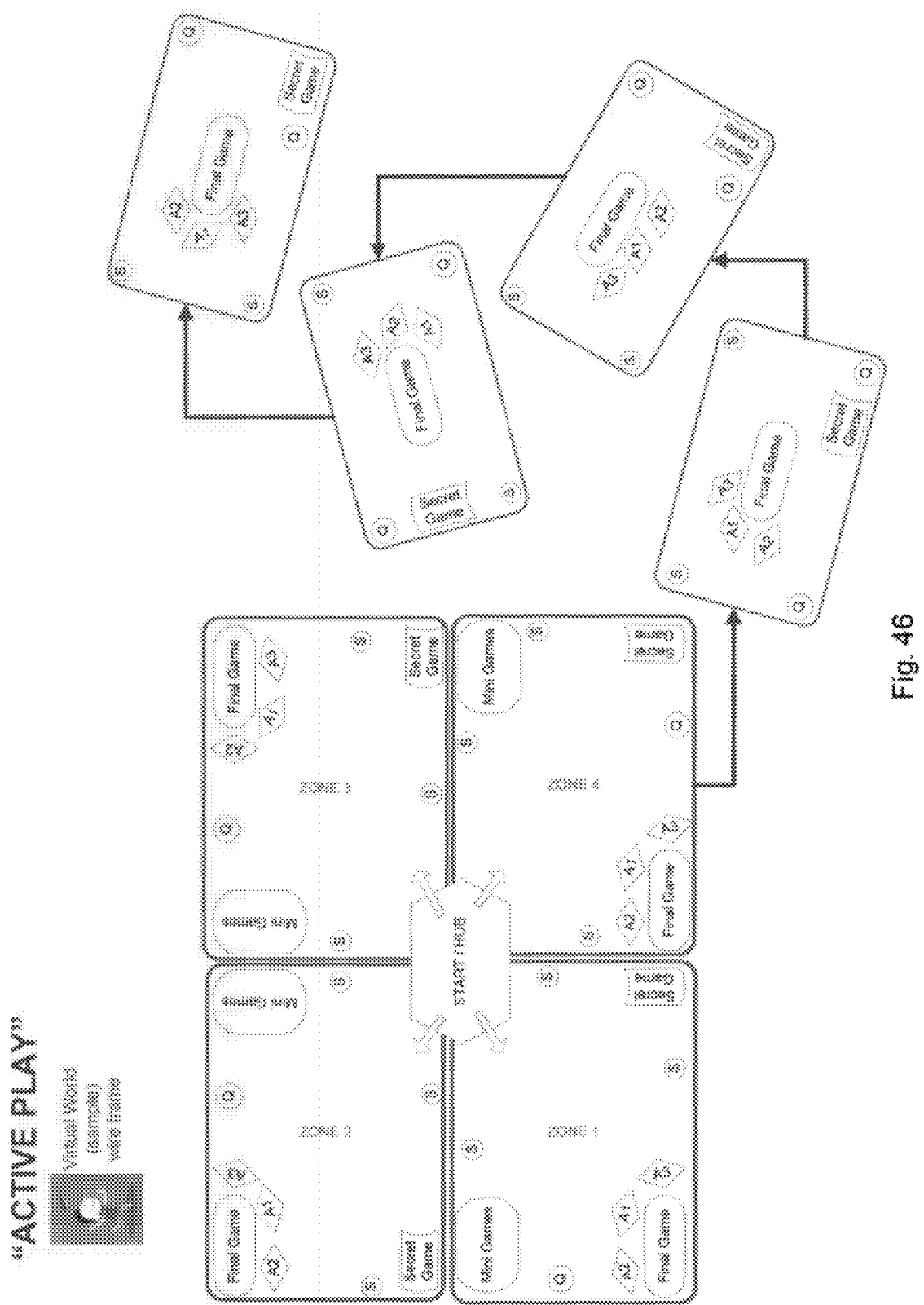
Figure 47:
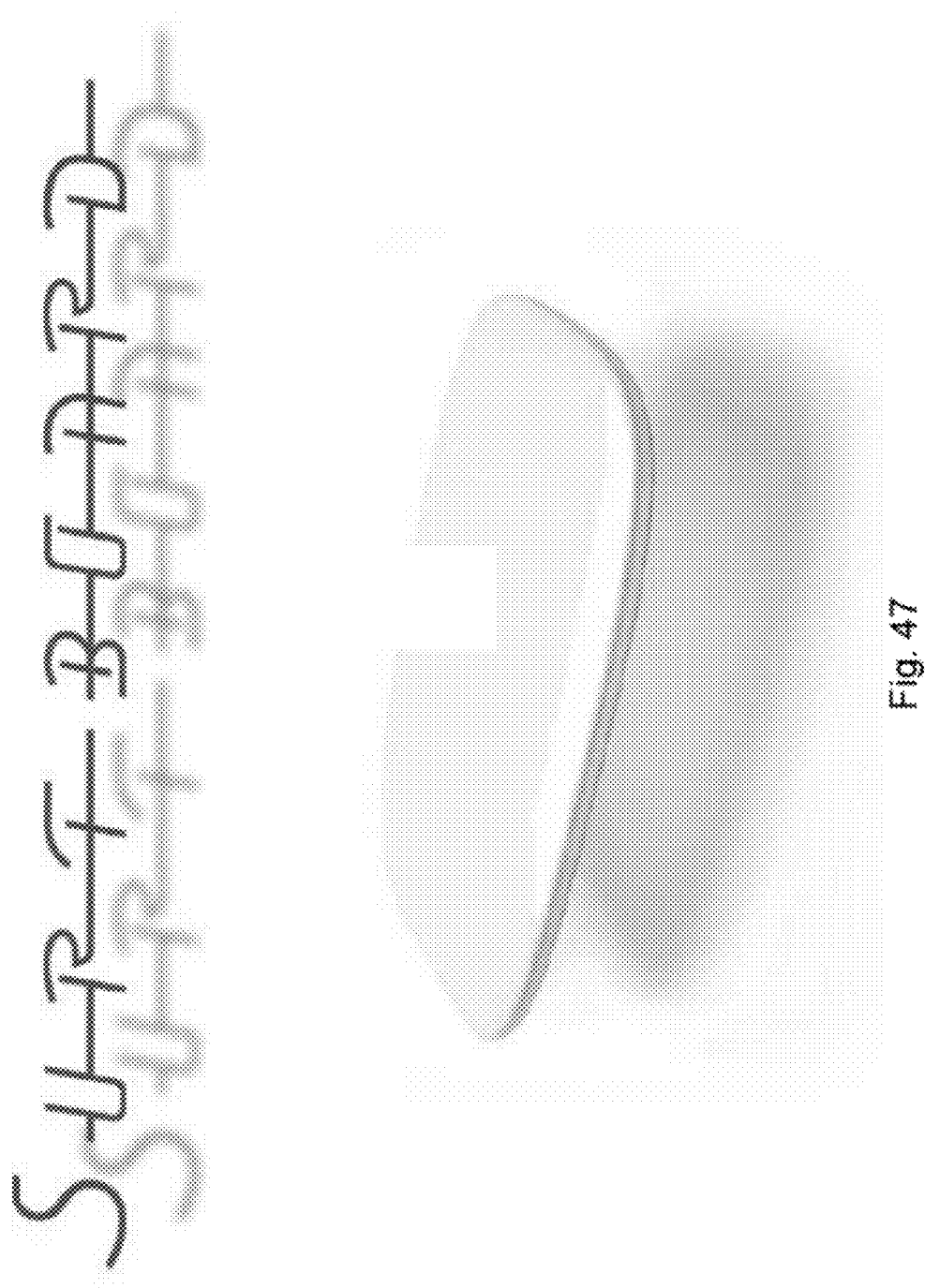
FIGS. 47-50 show further illustrative examples of systems, methods, and devices for assisting play and/or other activities.
Figure 48:
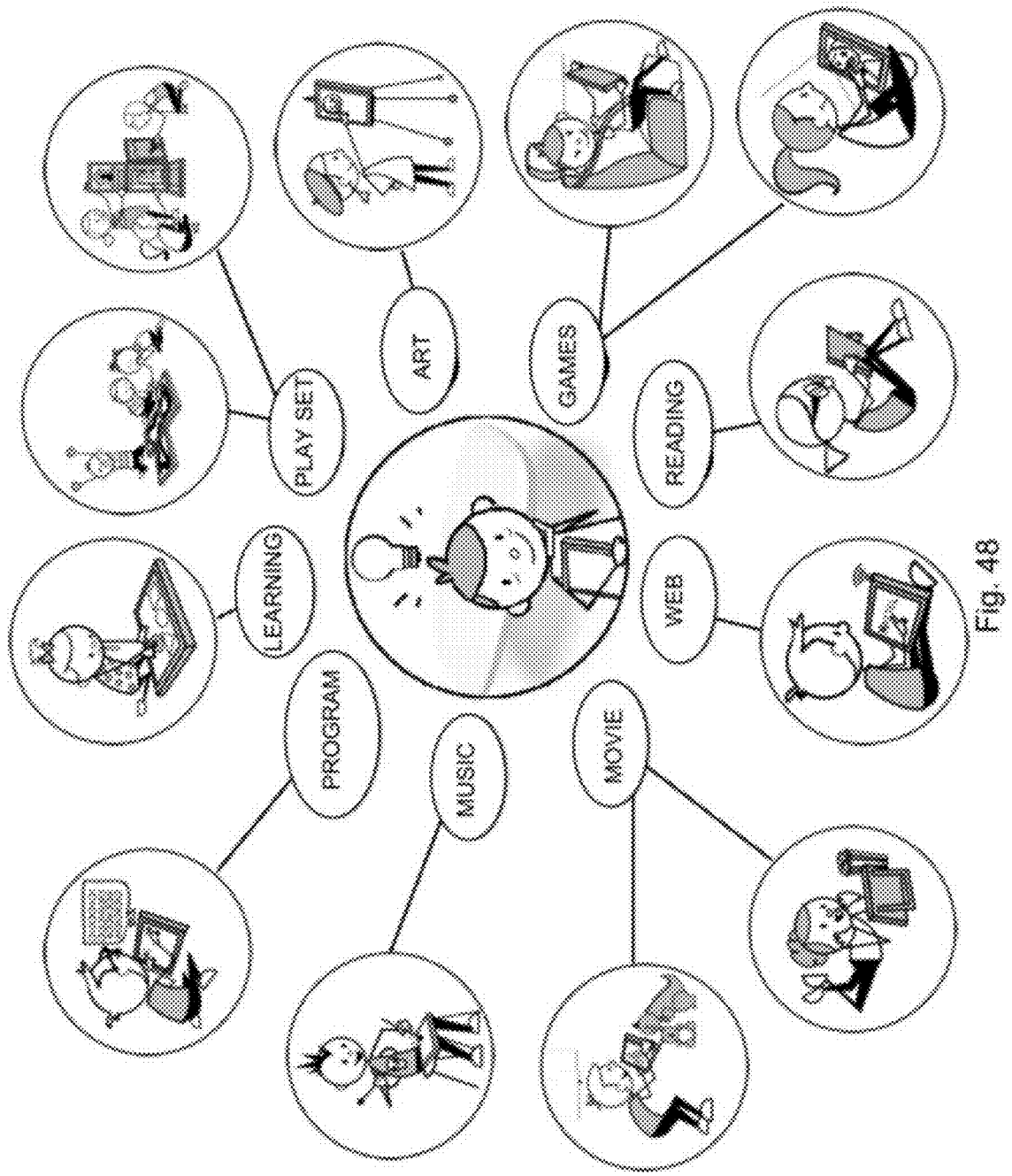
Figure 49:
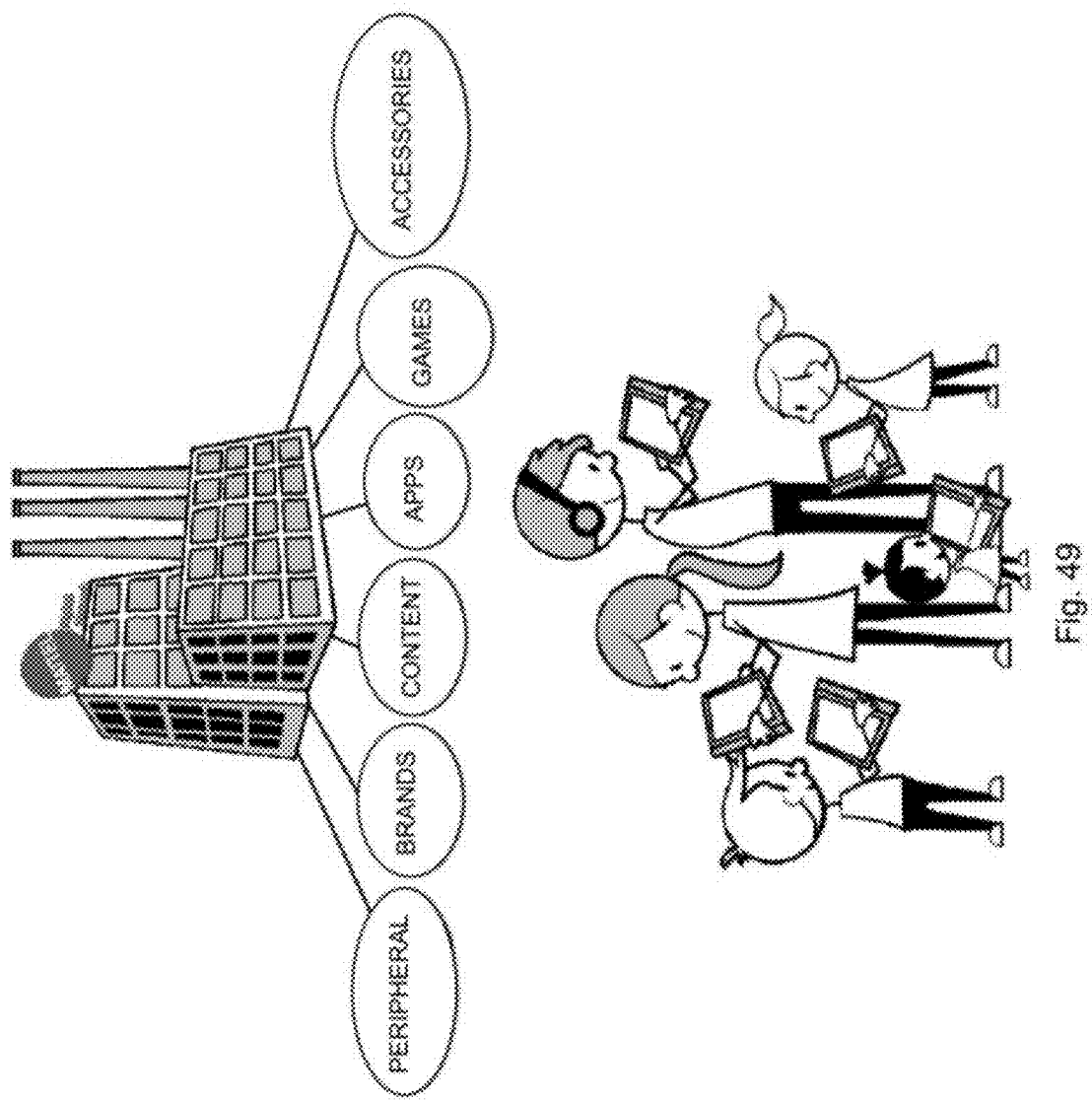
Figure 50:
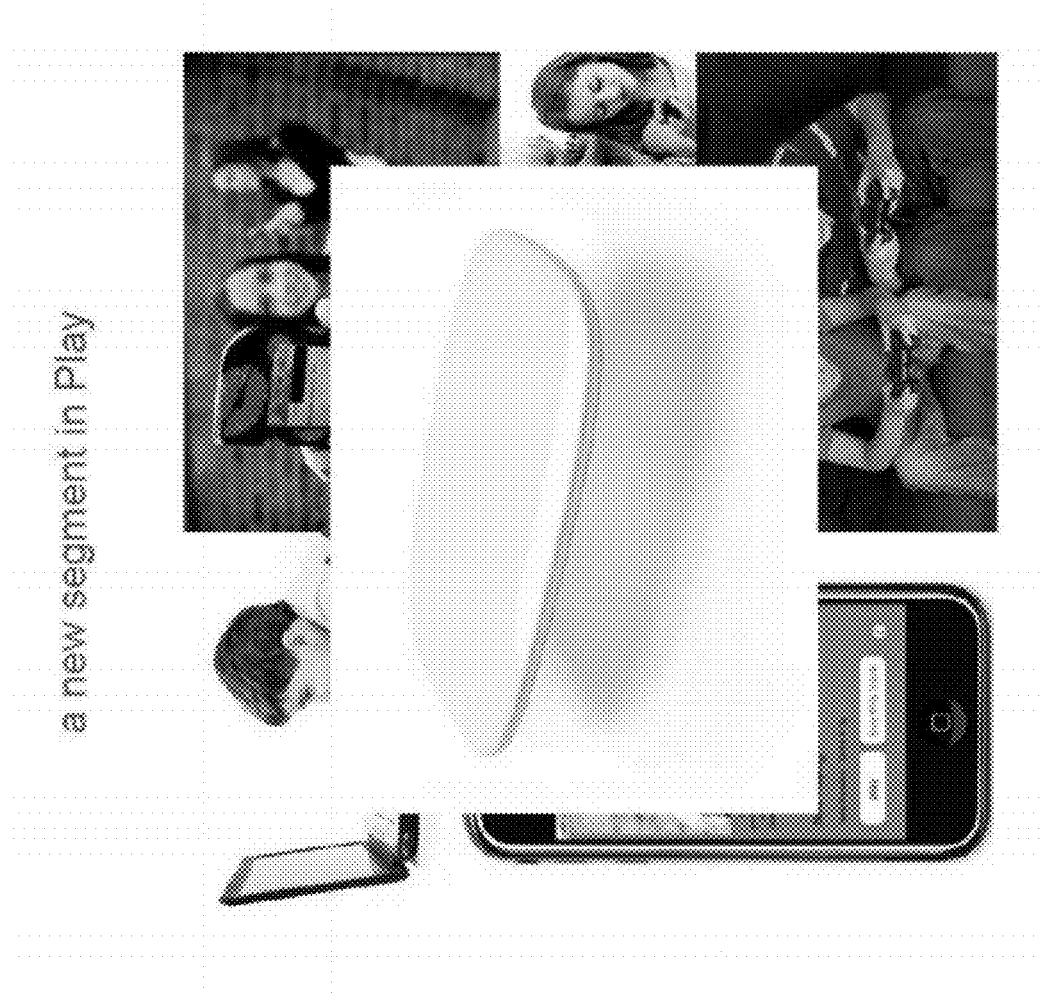

Illustrative examples of companions on the device, which may be a bitmap animated character, are suggested in FIGS. 11 and 18, and further in FIGS. 51-59. The companion may serve as not only a "mobile avatar," but also as a status indicator, which may target an amount of activity and may lead to avatar evolution/progress. Sub-par activity may lead to avatar regressing, such as devolving to a blob. Simple mini-games may also be provided, which may add off-line value to the device and/or may offer an additional way to reward the user for meeting certain criteria before connecting online and receiving virtual rewards.

Illustrative examples of virtual online worlds are illustrated in FIGS. 43-46. The virtual online worlds may provide a fun, "activity and mini game" based, world that may allow for exploration, challenges, customization, plug-ins/add-ons/expansions, or the like. In the virtual online worlds, once the user connects to their personal computer, for example, his/her accumulated off-line motions may translate to online "energy." The online "energy" could be presented as some sort of "tank" or "charge up," such as "Aura," glow, or the like. The companion on the device may transfer to the personal computer screen and may enter the online world. Based on an amount of "energy," the user may "spend/use" their "energy" in a number of ways, such as to customize their avatar, buy virtual items, or the like. In some examples, a user may use their "energy" to purchase "real" items, or the like. Mini-games and activities and certain areas in the online world may require a certain amount of energy to play/access, but once played, completed and/or explored, users may receive new virtual rewards. The online play experience may engage the users with fresh, fun and relevant interaction, but may also inspire users to go back off-line to stay active and earn more energy.

When using the system or practicing the method, kids or users could wear a device as they play, as suggested in FIGS. 11-17. The device may be any suitable size, and may include a color display screen, an accelerometer, and any other suitable components and may wirelessly connects to a PC and host a cute, customizable, on-screen companion that may evolves and grows with the user.

The device may track a user's every move. For example, as long as the user is wearing the device and being active, the device may track each move, and reward the user for his or her activity and may inspire the user to do more of the activity. The device may be worn while a user plays sports, dances, does karate, skateboards, bikes, hikes, at the park, at the beach, at school, and even while the user plays a video and/or computer game. The devices may be worn everywhere and anytime.

Users may receive (off-line) rewards as their personalized character gets in shape and expresses itself, such as according to the user's activity level. When the device is connected, such as wirelessly, to the online environment, the character may transfer from the device to the online environment via a suitable interface and become the user's playable (online) avatar. Automatically updating a user's statistics and accomplishments may lead to fun explorations, games/activities and/or meaningful rewards.

The virtual world may include a variety of areas to explore, mini games to unlock and/or a plurality of fun activities. There may also be Quest items to find if a user wants to earn special abilities and items. There may also be "Surprise" items to find, which may be random, seasonal/based on holidays, etc. . . . As users play off-line, the device tracks and accumulate "moves." Once connected, these moves turn into online "Energy." The more Energy, the more a user gets to do online. Thus, off-line movement, in the real world, throughout the day allows, enables and/or permits more activity in the online world.

The online "world," such as the examples shown in FIGS. 43-46, may start with a single area open and accessible. Within this area the user may explore and come across things to interact with, such as fun activities that teach new skills, challenging mini games that earn new character attributes and/or new items and even a "Final challenge" that may require the skills/items of the associated Activities/mini-games to complete. Once the Final Game is completed, a new area of the virtual world may be opened.

Each new area may be built on a very similar "content footprint." As a user continues to complete the challenges within each area, access to new, remote "Island" areas may be allowed. For example, a bridge may slowly be built to an island, as suggested in FIGS. 43 and 44, or a user may accumulate parts to build a balloon/air craft that will allow the user to "sail/fly" to the new areas to explore, which may allow for "teasing" the users with more areas and/or may continually add areas/content, for a potentially perpetual online reward experience.

A user may customize his or her character, unlock mini games and activities and get inspired to go play in new ways. A user may thus be inspired to play with more purpose, and users may become more fit without even realizing they are exercising. Parents may value the fact that their kids are required to go off-line, be active, and play in order to then go online. The experience may also be delivered via a mobile device, such as a mobile phone.

If the experience is made to be more online reward driven, the device itself may be relatively simple and may require fewer components to track user activity, and a majority of the rewards may be delivered to users online, via a rich, deep and immersive virtual world, which may reduce costs. Rewards may also be delivered to the users by delivering the rewards directly to the device, which may allow for a simplified online environment, such as where the online environment is a destination to post stats, view leader boards, other users' characters/accomplishments, or even for some light interaction and/or gaming.

Users may be able to "trade in" their off-line moves toward other digital play. For example, they could access special items, such as weapons, tires, paint jobs, or the like, in an associated or unassociated massively multiplayer online (MMO) game and/or on other websites. Users may also be allowed to use their off-line "Moves" toward coupons to purchase real/physical products from a store, such as a store associated with a sponsor of systems, methods and devices for assisting play and/or other activities.

The system may get kids excited about being outside again, which may help fight obesity, which has become an increasing problem for children in recent years. The system may encourage kids to spend more time on physical activity and less time participating in sedentary, media-driven activities, which often occur indoors. The system may add a high-tech aspect to well-known/traditional activities, with real world exercise leading to rewards within the online part of the system. The system may encourage participation in outdoor activities, which may be enhanced by use of the system. For example, a user may seek to participate in more outdoor physical activities in pursuit of more rewards or enhanced access to and/or enhanced status within the online aspects of the system.

As kids naturally have energy and find ways to utilize it, usually through play, motion, sports, or the like, systems, methods and devices for assisting play and/or other activities may capture and reward them for their activity, and inspire them to, not only continue it, but increase their level of activity. Since today's kids may have relatively less freedom in the real, off-line, world, they may be looking for ways to experience alternative freedom, often through gaming, online, physical (imaginative) play, etc.

Many kids may be actively participating in sports. The devices may be something they can wear all day, capturing their motion/activity no matter what it is they are doing. As long as they are being active! Thus, kids may get/stay fit without even knowing they are doing it, doing so through play.

The hardware may offer the ability to allow kids to move in front of their personal computer, capturing their movement, so the kids earn and use energy and/or rewards in real-time, affecting their online play. For example, if the kid or user has collected 90% of the required energy to meet an online goal, they can run in place, in front of their personal computer and see their avatar meet the goal. A slight latency could provide added play value, and the user could see the online/on-screen tank/energy reservoir fill up according to how much they are currently moving.

The devices may provide a companion for kids, being more than just an enhanced pedometer, the device may be an "imaginometer." The devices may provide a guide to a new world, leading users through online games and/or challenges, allowing users to create their own games, accompanying users on outside journeys, and directed, recording and encouraging the user's progress. The personalized character, or avatar, may move between the device and a personal computer, have a customized look, voice, interaction styles, and may gain abilities, powers, and/or access based on the user's accomplishments. The devices may provide a user with a key to his or her system account, including providing access to the user's avatar or virtual persona, unlocking storylines, and encouraging the user to play or engage in activities in the real world.

The devices may provide various functionalities. For examples, the devices may act as recording devices. Thus, the devices may record distance as a pedometer to provide a log of the journey, record heart-rate as a pulse-meter to provide proof of effort and exertion, and record sounds and/or images as a microphone, camera, or video-camera to provide a record of exploits. The devices may include a GPS (Global Positioning System) to allow for parental monitoring of kids' outdoor time, track kids preset outings, such as to track distance, and to find friends or hidden treasure. The devices may include Bluetooth capability, such as to receive the latest exercise and/or outing information automatically, to remotely upload an assignment and/or task to device, and/or to connect to peripherals and/or accessories that may provide for expand features. The devices may include USB Connectivity, such as to a personal computer, which may provide for updating settings, Avatars, challenges, and/or games, and to permit recharging the device's batteries.

The devices may provide safety benefits because parents could use the devices to track a child's movement with GPS, plan the course of play, and review outdoor play experience. The system, or active play platform, may consist of connected devices, a data and content services server infrastructure, and integration with personal computer and mobile browser content that may facilitate and/or enhance play activities without regard to location. With these devices, children of all ages and their families and friends may be able to experience the same games and activities they've always enjoyed, but in exciting new ways.

Activities and game play may be assisted and/or enhanced by the following system abilities:
  Track a user's location and/or the location of the user's friends;
  Plan scavenger hunts and/or treasure hunts with hidden objects that contain rewards and/or messages created by user;
  Compete against other users and track achievements and performance;
  Record scores and share achievements with other users, friends and family;
  Become a game champion based on the recorded scores and/or achievements for a particular game;
  Make up user-created games with the software development kit (SDK);
  Track other users in a game of hide and seek, know when the "finder" is close, and know when you are close to finding the "hiders;"
  Compete, explore, and exercise while riding a skateboard, bike, horse, scooter, rollerblades, ice skates, skis, water skis, snowboard, waveboard, roller skates, surfboard, or the like;
  Measure and monitor a user's health and activity, such as by monitoring heart rate, metabolic rate, blood sugar level, stress level, or the like; and/or
  Measure critical health conditions, such as diabetes, allergies, or the like.

Figure 9:
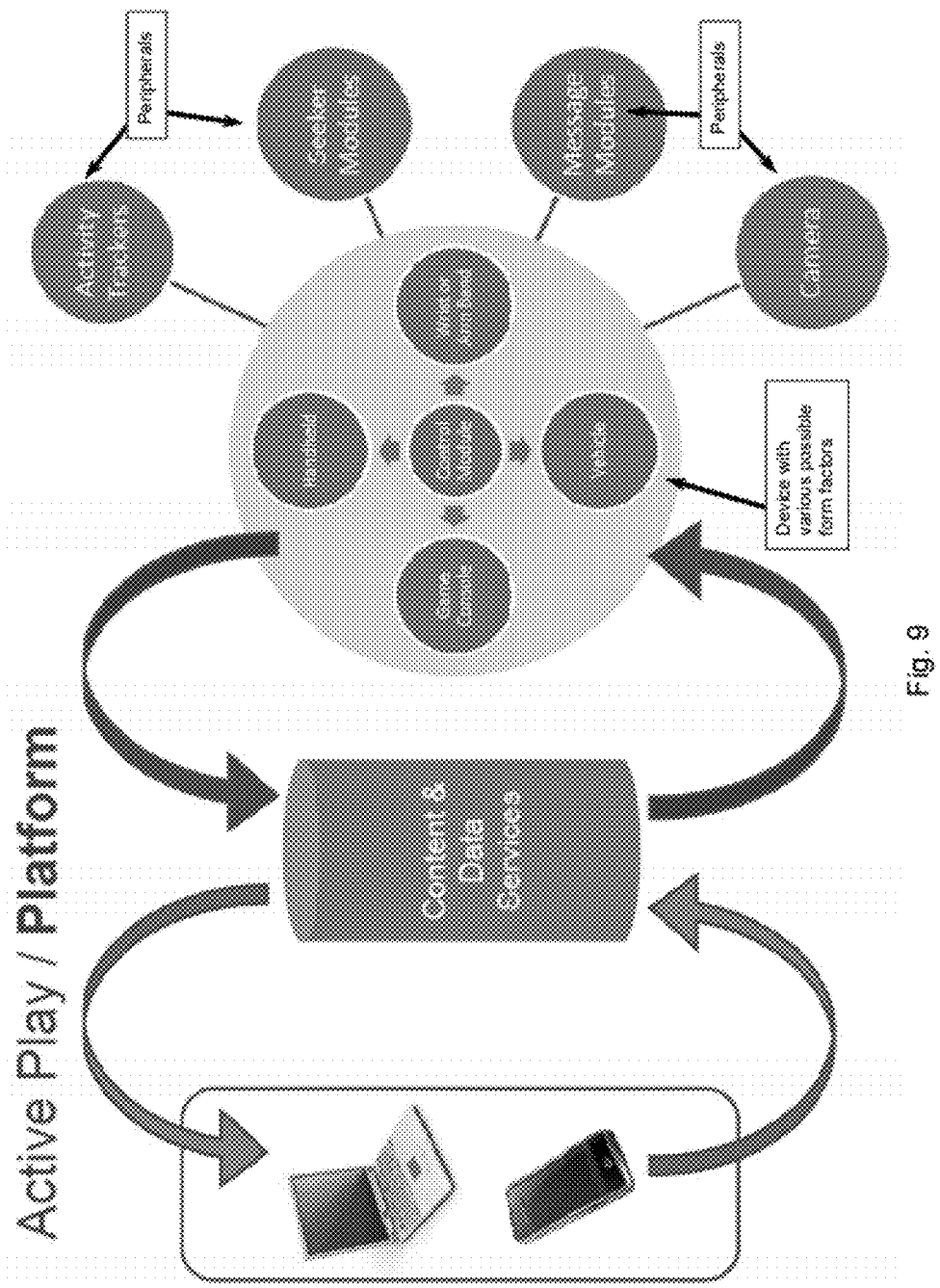

An illustrative example of a system, or active play platform is diagrammed in FIG. 9. As shown in FIG. 9, the system may include, amongst other elements, a device. The device may include a control module, which may be a modular unit that can be inserted into various housings or form-factors, which may be suitable for different play types. In some examples, the control module may be waterproof and/or shockproof. The control module may provide and/or support various capabilities, such as:
  Plotting a Location can be plotted on a map so a user can find or be found;
  Accepting navigational instructions from an external source;
  Providing sensory feedback based on adherence to navigational instructions, such as auditory, temperature-based, visual, and/or vibration based;
  Sensing and providing location data for peripheral devices;
  Plotting the location of devices on maps using supplied software;
  Collecting and sending activity data to an application server and/or to a data infrastructure via cellular network;
  Collecting and sending activity data from other devices via Bluetooth or other pathway, such as via a Wi-Fi connection;
  Tracking and collecting data on complex movements and conditions, such as vertical and horizontal, velocity, depth and height, gravitational or centripetal force, repetition of programmed movement, movement path, slight 3-dimensional body movements, temperature, time to the millisecond, and the like;
  Tracking individual movements for special applications via peripherals;
  Sending and receiving data over cellular network, Bluetooth, Wi-Fi, or the like; and/or
  Connecting to a personal computer or other device via USB.

The device and/or its housing may be available in various Form Factors, as suggested in FIG. 9. For example, various housings may be available to provide and/or support multiple core functionalities into which the control module may be inserted. In some examples, the control module may require one of these housings for use. Illustrative examples of Form Factors may include Handheld, Wearable (armband, wristband, leg band, headband, waistband), Vehicle, and Game Console. The Vehicle Form Factor may permit programming a vehicle with GPS enabled routes for use in game play. The Game Console Form Factor may allow the control module to act as a central group game-play device. In some examples, peripherals may interact with a centrally placed console or device in various ways. In some examples, the Form factors may be waterproof and/or shockproof. Illustrative examples of variations of Form Factors are generally illustrated in FIGS. 18-38.

Several illustrative examples of Peripherals suitable for use with the device and/or with the system are illustrated in FIG. 9. Peripherals may be smaller devices that may add functionality to the device, which may be in the form of a control module combined with its form factor, to allow specific types of game-play and interaction, as the case may be. In some examples, Peripherals can send data and content to the control module, which in turn can send data to the data and content services infrastructure to be made available to personal computer and mobile device users, as suggested in FIG. 9. Illustrative examples of Peripherals may include an activity tracker, a seeker module, a message module, an audio/video recorder, and a beacon. In some examples, Peripherals may be waterproof and/or shockproof.

An activity tracker may allow tracking of a specific type of activity or combination of activities, such as for specific game-play opportunities. A seeker module may include a proximity detector that may interact with the control module. The seeker module may provide sensory feedback, such as audio, visual, vibration, or temperature, when a control module approaches. The control module may detect proximity of a seeker module and may provide feedback, which may depend on the particular form factor. A control module can provide the same basic sensory feedback as a tracker module, or it can plot location(s) of various tracker module(s) on a map.

A message module may be used to facilitate guided scavenger hunts, treasure hunts, secret missions, and/or other imaginative ARG play. Message modules can contain an audio message and/or can playback audio and/or video, such as when plugged into a form factor containing a control module.

An audio/video recorder may create and share movies and audio recordings, or even add Audiovisual tasks to game play. A beacon may broadcast its GPS location. In some examples, a beacon can be used as a finish line, a trail marker, a rendezvous point, or the like.

As shown in FIG. 9, Data and Content Services may be and/or provide a server infrastructure, which may provide user identity accounts, a payment system, reward and achievement systems, virtual goods inventories, activity tracking systems, reporting systems, messaging systems, and/or the like. The server infrastructure may also receive and deliver content between the devices and both personal computers and mobile browsers. In some examples, the server infrastructure can act in both a push and a pull capacity, retrieving and providing data and content as necessary.

In some examples, the system may include browser based web content. For example, the system may have multiple browser based interface points. Access to user achievements, progress, and rewards may be available. Shared leader boards may be provided, which may allow users to compare their scores, accomplishments, and/or ratings. Rankings and titles may also be provided, which may allow users to achieve status in the community of users, such as by being considered and/or rated as a Novice, Pro, Champion, or the like.

A rewards system may exist to provide for the accumulation of points, or "energy," as the case may be. These points may be redeemable for content and game play in any number of premium content offerings. Integration with a suitable Digital Network may be provided and/or supported to allow for point redemption in existing and/or new properties within a system provider's digital entertainment ecosystem. Points may also be redeemable for coupons, such as those offering discounts on physical product and/or for direct purchase of physical product. An API may exist, which may allow integration with third parties, which may facilitate point redemption on partner content sites. Integration with one or more loyalty programs may also be possible.

Examples of the system 10 may be scaled to provide a predetermined level of cost, experience and/or complexity. Illustrative examples of suitable scale options for the system are generally illustrated in FIGS. 39-42. As will be more fully described below, some examples of the system 10 may include and/or be implemented using the device 12 in addition to an online environment or world, which may be accessed via the internet 20, such as via a personal computer 24. Some examples of the system 10 may include and/or be implemented using the device 12 and a mobile device 22. Some examples of the system may include and/or be implemented using only the device 12.

In examples of the system that include the device plus an online environment or world, as suggested in FIGS. 39 and 41, the device, may track a kid's or user's moves. The device may have a friendly character/companion, or Avatar, that may react to the user's activity level. For example, if the user meets a daily and/or weekly activity criteria, the character may become increasingly happier and/or progressively more fit. If the user does not meet daily and/or weekly activity criteria, the character may become more lethargic, unhappy and/or chubby. The user may go online, where off-line moves may turn into online "energy."

The online world may be broken up into Zones, such as suggested in FIGS. 43-46. Each zone may include areas to explore and find secret content, such as videos, photos, scavenger hunt pieces, bonus material, or the like. Each zone may also include several Activities (such as "A1," "A2" and "A3" in FIG. 46), and several Games. The Games may include one mini-game and one Final or Boss game.

In some examples, one of the four main zones may be accessible initially. Activities may require a predetermined amount of energy, which may be acquired through off-line moves, to access and complete. Each Activity may teach the user a new skill. The Final or Boss game may require that the user complete all three Activities, which may require using three newly learned skills to complete the three activities. Once the Final/Boss game is completed, the user may earn the "key" that may be needed to unlock and/or access a new Zone on the world map, which new Zone may have been previously locked and/or inaccessible. The user may need to go back off-line, be active and track moves using the device, and then return online to access/compete in some new, and now unlocked, zone-activities and/or games.

New zones, their new activities, games and/or other aspects, may be "teased" from initial entry into the online world, which may increase the usable life of the online world for a user, which may justify and/or support a monthly subscription model to allow for continued revenue production.

Examples of the system that include the device plus an online environment or world may be and/or provide a premium option, which may have the richest and deepest play experience. In such examples device and online play may be dependent on one another.

In examples of the system that include the device and a mobile device, the device may track the user's moves, as described above. The device may have a friendly character/companion, or Avatar, that may react to the user's activity level. For example, if the user meets a daily and/or weekly activity criteria, the character may become increasingly happier and/or progressively more fit. If the user does not meet the daily and/or weekly activity criteria, the character may become more lethargic, unhappy and/or chubby. If the user meets the daily and/or weekly activity criteria, the user may receive a code and/or points. The user may then use any suitable mobile device to access a system, or "Active Play," application portal, which may unlock mobile applications and/or games. As the user continues to be active and meet daily and/or weekly activity criteria, he/she can build up games within the Active Play portal. For example, accomplishment of physical, or off-line, moves may result in the acquisition of a "currency," which may allow the user to "buy" applications.

In such an example, ongoing and/or continuous application development and/or deployment may allow long-term life span of the system and/or the device.

Examples of the system that include the device and a mobile device may provide and/or be mid-ranged option. Such examples may be sufficiently versatile to work on any mobile device. Leveraging the system provider's application portal may allow for relatively unlimited applications that can be developed and/or delivered as a reward mechanism.

In examples of the system that include and/or are implemented using only the device, as suggested in FIGS. 40 and 42, the device may track the user's moves, as described above. The device may have a friendly character/companion, or "Avatar," which may react to the user's activity level. For example, if the user meets daily and/or weekly activity criteria, the character may become increasingly happier and/or progressively more fit. If the user does not meet the daily and/or weekly activity criteria, the character may becomes more lethargic, unhappy and/or chubby. If the user meets daily and/or weekly activity criteria, the character on-screen may evolve and/or become more personable and/or a new mini-game may be unlocked. In some examples, the character may challenge the user to a new task.

In such an example the device may include USB connectivity to allow a user kid to update the device with new content, games, challenges, or the like, which may be downloaded from the internet. Such new content may be monetized to extend the life of the device or system. In some examples, USB connectivity may allow for updatable and/or extension content, with some content modules providing a separate purchase opportunity.

Examples of the system that include and/or are implemented using only the device may be and/or provide a basic option. For example, an electronic toy that may include animations and/or online connectivity for add-on content. An illustrative example of a play and/or reward flow for examples of the system that include an online component may include:
1. User logs on and creates profile;
2. User picks from a handful of basic (default) avatars;
3. User goes through "personal treasure box":
   a. One default outfit for avatar; and
   b. One default poster, plant, basic décor for hub/home area;
4. User is prompted to go out and play, such as in the outdoors and/or the offline world.
5. User sees on-screen avatar jump from personal computer interface to device, which may provide a magic moment of avatar transferring from online world to mobile device;
6. User goes off-line and gets active;
7. As User meets daily and/or weekly, or any other suitable period, activity criteria, his/her avatar (on device) begins to express its happiness. Facial expressions and body shape changes take place to reinforce off-line reward;
8. Device counts and keeps track of every move user makes throughout the day; and
9. When user meets initial pre-determined amount of moves (relatively low to start) on-screen display alerts user that he/she should go online and explore.

An illustrative example of an online component of the system may, such as suggested in FIGS. 43-46, may include:
1. Starting in a lightly decorated Hub/Home area;
2. Avatar transfers from device to personal computer interface;
3. User sees pulsing, open gate for Zone 1;
4. User navigates into Zone 1 and is presented with a tutorial;
5. As user explores zone 1, which may be via a somewhat confined pathway, he/she learns what is there, such as games, activities, secret areas, or the like;
6. As user finds and/or completes activities he/she is rewarded with points to get new stuff for Avatar/Home-décor;
7. User also learns a new "play-ability" that will allow him/her to perform better in the final "Boss" game;
8. As user completes all 3 activities/challenges, learns 3 new skills, he/she sees the "boss" game/challenge open;
9. "Boss" game/challenge now pulses and it becomes clear to user that, when completing this game, they will earn the ability to open Zone 2 gate, from within the primary wearable device;
10. Complete Boss Game, return to Hub and see that Zone 2 is now accessible;
11. Follow same footprint for each Zone; and
12. Once online energy is depleted, users will be urged to go back off-line and play in the real world. Once they have earned enough "moves," they can come back online and unlock more fun stuff.

There may also be a variety of things to find: Videos, music, puzzles, scattered items to collect (Meta scavenger Hunt), or the like. These may be tradable to other users/players, such as through multiplayer and/or social play. For example, two users may each find half of an item and together it makes a complete, unique and powerful item, which may provide enhanced playability.

Illustrative examples of play patterns may include a centralized game that may reward achievement based on outside physical actions or a centralized server, where a sequence may include: "I'm getting fat," "I need to go do some exercise," and the character would get thinner. A Web Enabled, or at least partially inter-based, system may provide modern versions of kids outdoor games, such as hide and seek, GPS Geocaching, "Go Find the Fun," "Go Grow," "Go Explore" or even may integrate physical activity into unlocking game play.

Illustrative examples of aspects of the online components for systems and methods for assisting play and/or other activities, such as those illustrated in FIGS. 43-46, may include:
1. A virtual world that supports any suitable number of users, such as more than 50,000 simultaneous users.
2. Web-User registration
3. Data/Content received from device to web and/or from web back to device.
4. Content, which may include characters and/or avatars, themed world(s), perpetual (add-on) virtual areas, leader boards, or the like.
   A. In some examples, a "light" community hub and/or interface may be included, such as for kids to share their stats.
5. Server/back-end support
6. Analytic reporting Illustrative examples of different "play types" are illustrated in FIGS. 10-17. Illustrative examples of different "play types" may include explore, nurture, questing, cooperative play, competitive play, family fun, and sharing play. Explore play may include open-ended, surprise oriented and/or scavenger hunt-type play. Nurture play may include character-centric, growing and/or evolving the user's character, customizing the user's character, gaining new attributes, expressions, stuff, expressions, or the like. Questing play may include objective-based, "treasure hunt" type play, and may include more close-ended reward incentives. Family Fun play may include play with and/or against family members, sharing achievements, or the like. Sharing play may include sharing with schools, camps, sports organizations, or the like.

In some implementations of the system, revenue streams may be derived from devices, peripherals, accessories, content, services, licensing, and/or brand extensions.

Illustrative examples of revenue that may be derived from systems, methods and devices for assisting play and/or other activities may include and/or be based on:
   Initial sales, such as:
   Console/device
   Cables
   Other connectivity components
   Add-on Incremental sales, such as:
   Peripherals
   Device skins (any suitable theme, waterproof case, etc.)
   Content
      Play packs/additional games
      System provider application store—3rd party games
      Books, audio books
      Pictures (any suitable format)
   Recurring sales (Subscription and Advertising), such as:
   Web environment subscription
   Brand sales uplift (co-marketing)
   Ad sales (on store and on web environment)
   Data hub/repository revenue
   Transaction fees (e.g., 5% of every in-world purchase, inter-user game purchase, etc.)
   Sell data to advertisers
   Replacement Parts Revenue, such as:
   Batteries
   Service
   Other replacement parts
   Membership sales, such as:
   Partner program membership Illustrative examples of related or competing markets may include children's and or adult markets. Children's markets may include those where Kids build stuff w/sensors, those that include portable consoles w/wrist bands and optional game cards, and also markers for remotely or radio-controlled (RC) toys, such as tanks, robots, dolls, or cars. In some examples, the system, or its devices, may be used to control such toys. Adult markets may include adult-oriented workouts.

Many game play opportunities may exist for the system. The system may be used to facilitate and enhance traditional game play in games such as hide and seek, tag, races, riding any number of kid's vehicles, such as bikes, skateboards, scooters, skates, or the like. Game play may also involve any sport activity, such as basketball, baseball, track, football, soccer, softball, swimming, skiing, or the like. The system may be used to track and score a substantial portion of, or even all, activity. The scoring may be based on defined rules associated with specific activity. Illustrative examples of tracked activity may include vertical and/or horizontal movement, activity intensity, which may be based on the amount and/or speed of overall body movement, G-forces and speed. The system may calculate values or scores for levels of exertion and/or consistency of activity, and the scores may be factored into the achievement points/rewards.

Illustrative examples of game play, or related, activity may include Hide and Seek, Treasure Hunt, Tag, Horse, Scavenger Hunt, Spy Mission, Rally and Catch. The Hide and Seek game play, or related, activity may include use of devices with a hand held form factor that may include a control module, a plurality of seeker modules and a beacon module.

Game play for the Hide and Seek activity may include users deciding on the boundaries of the game, which may include a house, yard, street, or block. Additionally, users may select a type and/or level of feedback for the game. In some examples, the scanning interval, feedback type, and/or decoy strategies may be configurable. During play, a user may be "it" and may set the timer and activate the seeker modules and the beacon module on one of the devices. The devices may include a count down timer that counts down with loud beeps, the last of which may be different in tone. After the timer counts down, the device used by the user who is "it" may act as "finder," while the devices of the other users, with the seeker modules, may act as "hiders." The device used by the user who is "it" may provide seeker location feedback at selected intervals and/or via a selected method, such as vibration, audible beeps or visual indicators, which may be blue, yellow or red. The seeker modules may also provide feedback regarding finder proximity via a selected interval and method.

"Hiders" may win the game by making it back to the device with the beacon module without being tagged. An alarm may sound in the device used by the user who is "it" when a "hider" is running toward the beacon. If the "hider" makes it to the beacon, the device used by the user who is "it" may record that player as "safe." If the finder tags the hider, the handheld may record that player as "it." "Hiders" may have the option of selecting several decoy strategies to throw the "finder" off the trail. For example, they can broadcast a shadow location, send a false alarm to the device used by the user who is "it," which may make the finder believe someone is running toward the beacon, or can cause the seeker module to stop broadcasting for a preselected period.

A reward for the Hide and Seek activity may include, in addition to overall activity tracking, awarding points to users for time until a first user is tagged, time to making it safely back to the beacon, and successful decoy strategies. Successive wins may result in increased ranking, such as on public leader boards.

The Treasure Hunt game play, or related, activity may include users following a map and clues. The Treasure Hunt game play, or related, activity may include use of devices with a hand held form factor that may include a plurality of message modules, a plurality of beacons, and a controller. A user may hide the treasure beacon and may assign value from a preselected list of values. The user may create a map to the beacon and set message modules and other clues in place to lead players to the treasure. The first user to the treasure may win. Speed to find the treasure may be a component of the reward.

The Tag game play, or related, activity may include use of devices with a hand held form factor that may include a plurality of seeker modules, a control module and an optional beacon. The Tag game play, or related, activity may be similar to that for hide and seek, albeit without hiding. Multiple forms of Tag game play may be possible, such as tag in specific order, such as an order predefined by recognized modules, multiple tag patterns, such as tag followed by a race to a home-base beacon, with the loser becoming "it," or the like.

The Race game play, or related, activity may include a simple contest using a beacon. The Scavenger Hunt game play, or related, activity may include a handheld mobile console with an optional proximity-sensor peripheral.

Set-up for the Scavenger Hunt game may include one user who is the "hider," and one or more other users who is/are the "hunters." The "hider" may go to a series of locations, while recording how to get to each location. The game play may include several options for recording. For example, without any peripherals, the "hider" may record one detail of what he/she sees at the various locations, and may record the detail(s) on the device by typing or reading. For example, the "hider" may type for location 1: "the rock is red", for location 2: "the street sign can be seen between the two trees", for location 3: "the green bin is here", or the like. With peripherals, the "hider" may plant a peripheral, which may be as complex as a location sensor that confirms when it is close to the "finder" who is holding the console, or as simple as a marked "chip" (with or without a number 1-7) that needs to be collected before continuing to the next location. The locations may lead to the final destination, where the prize may be located. The prize may be any object, or it may optionally be a proximity-sensor peripheral that may flash or generate a sound when the console is very close.

Game play for the Scavenger Hunt game may include the "hunter" hitting a button, which may be a physical button or an on-screen button, to begin the game play. An optional timer may start counting. In some examples, the game may have a countdown timer, while others may have a count-up timer to record fastest times, with others having no timer at all. The first clue may appear on the screen, or may be read in the "hider's" voice through the speaker of the mobile console. The "hunter" may then attempt to find that first location. In some examples, the "hunter" may be required to record the clue before continuing, to verify that he/she has hit the correct location. When the first location has been arrived at satisfactorily, the "hunter" may press a button (or just scroll) to read the clue for the next location, and then proceeds to the next location, and so on. When the last location, which may be "destination" or the "treasure location" has been reached, the "treasure" may be collected. The treasure may be a game piece that is part of a treasure hunt pack, which may include the chips 1-7 plus a "treasure" chip that may merely be a game marker; or also this could be an intelligent peripheral that may produce sounds and/or flashes when discovered and/or may optionally cause the console to emit sounds and/or flashes.

Game play for the Scavenger Hunt game may end when the "finder" is congratulated on finding the treasure, with his/her time presented (if this is a timed game), and the online reward system may be quietly updated on the back end to reflect a successful find by the "finder" and a successful game creation by the "hunter." The avatar and/or the leader boards may reflect these results when queried by a browser.

The Spy Mission game play, or related, activity may include setting a goal, finding a spy, finding a secret, decode a message, or the like.

The Rally game play, or related, activity may include following a map on foot, or on a vehicle, to predefined points at predefined times. For example, Rally game play may include timed movement to specific points, such as by biking, running, walking, skateboarding, skiing, or swimming. Accuracy may be important in Rally game play. For example, going too fast or too slow may result in lost or deducted points.

The Catch game play, or related, activity may include selecting a preset order or design a new order. Points may be won or lost for accuracy, interception, following a pattern, or the like.

In some examples, game play activity within the system may include Points and Rewards. Points and Rewards may be awarded for a wide range of actions and accomplishments. A rule-set may award points for physical activities based on actions described in game play section above. Points and Rewards or achievements may also be awarded based on levels achieved, games completed, competition performance, and/or overall health improvements. Points and Rewards may be maintained at the server level and may be accessible via the system as well as via multiple browser based devices. Points and Rewards may also contribute to overall achievements displayed in user leader boards.

In some examples, game play activity within the system may include a Level Up function, which may reflect or encourage long term activity goals. For example, assigned achievements may be made for different movements and activities, distances, steps, speed, strength, reps, or the like.

In some examples, game play activity within the system may include an SDK. An SDK may allow for the creation of custom games by both users and professional content creators. In some examples, game play activity within the system may include Health and/or Biometric Monitoring. For example, the devices may have the capability of providing real-time health monitoring and/or biometric data on such stats as heart rate, metabolic rate, or the like.

In some examples, game play activity within the system may include an Avatar or Character. For example, each user account may maintain a character of the user's choosing. This character can be a representation of the user, such as an Avatar, or this character can be another available character, such as a pet, a plant, or even an alien. Character attributes and qualities may be maintained at the server infrastructure level and may be accessible by the system or any device browser. In some examples, the avatar/character may be positively affected by level of activity, accomplishments, and/or rankings. In some examples, the avatar/character may be negatively affected only by the absence of any activity.

In some examples, game play may be divided into three general areas, namely questing, nurturing, and exploring. Furthermore, game play within any of the general areas may be divided into off-line play, which generally encourages a kid or other user to move and be active, and online play, which generally requires that the user be close to or in front of a computer. An overriding theme of the product is to encourage a 360-degree playing experience, in which the device becomes an integral part of an active day.

Figure 51:
FIGS. 51-59 show examples of game devices and game play suitable for combining real world and online game play.

As shown in FIG. 51, the device may include an LCD screen, for example a TFT 32-bit screen, and multiple pushbuttons. The LCD screen may be a color LCD screen. The pushbuttons might include two simple pushbuttons, and one four-button rocker, as is common with handheld video games. The pushbuttons may allow the kid to interact with the device and thereby influence aspects of game play.

Furthermore, enclosed in the device may be a shake sensor or a three-axis accelerometer. These motion sensors may be configured to track movements through an area, such as a pedometer, and/or require more demanding motions, such as a number of steps, jumps, jukes, and side-to-side movements. A shake sensor may be less accurate and/or sensitive as a motion detector than a three-axis accelerometer. The entire device may be enclosed in a decorative housing, shaped somewhat like a cell phone or music player, and is intended to be worn in a pocket or attached externally, with for example, a belt clip.

In some aspects of game play, as shown in FIG. 51 and further presented in FIGS. 52-59, the device LCD screen may display an avatar moving around in a simulated mapped environment. Movement of the avatar on the LCD screen may be driven by movements of the kid wearing the device. As the kid moves with the device in real space, there will be a corresponding movement of the avatar on the LCD screen. Coupling of the kid's movement to an avatar's movement may occur through activation of the shake sensor and/or three-axis accelerometer enclosed in the device.

Figure 52:
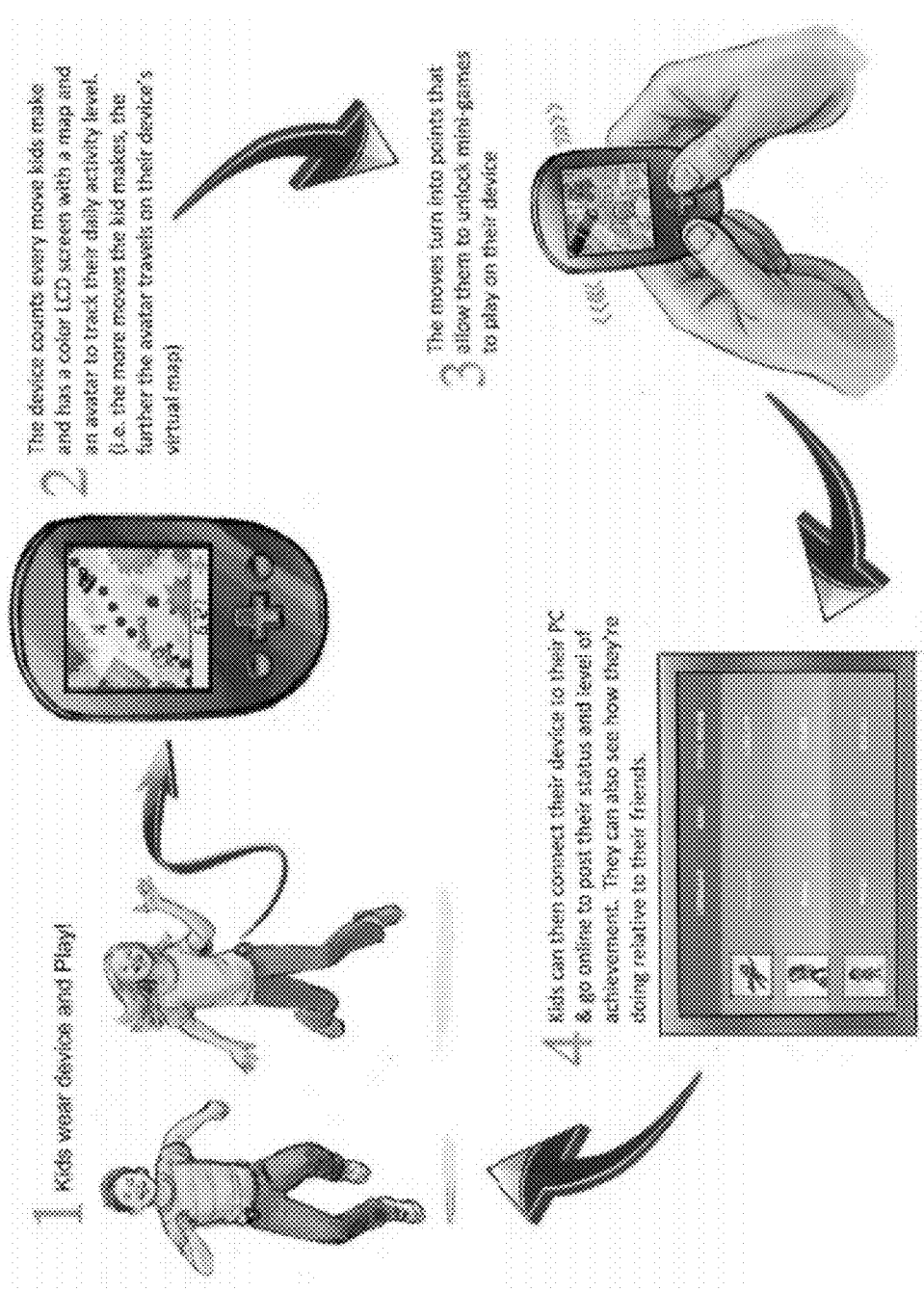

FIG. 52 shows an embodiment in which the device may count some or all movement of the kid, such as distance moved, steps, jumps, spins, or other activity. Movement of the kid counted by the device is shown on the device by a color LCD screen with a map and an avatar to track the level of daily activity. Thus, the more moves the kid makes with their device, the further the avatar travels on the virtual map of the device. As further shown in FIG. 52, the accumulated moves turn into accumulated points that allow the kid to unlock mini-games to play on their devices. Game unlocking may occur at particular point accumulation totals.

As further shown in FIG. 52, the kid may then connect their device to a personal computer, which may be used to post their status and/or level of achievement online. The on-screen avatar from the device may be shown as transferring from the device to the screen on the computer. Online posting or reporting may occur through an internet website or through an active update service. Connection of the device to a personal computer can also allow the kid to see and compare their friends' status and achievements in playing the game. At selected times, the software on the computer may encourage the kid to move the device near the computer, thus encouraging more physical activity.

As shown in FIG. 52, game play may be generally described in four conceptual steps. In step one, kids wear the device and play. In step two, the device counts every move kids make and has a color LCD screen with a map and an avatar to track their daily activity level (i.e., the more moves the kids make, the further the avatar travels on their device's virtual map). In step three, the moves turn into points that allow them to unlock mini-games to play on their devices. In step four, the kids can then connect their device to their personal computer and go online to post their status and level of achievement. They can also see how they're doing relative to their friends.

It should readily be appreciated that any one of these steps may occur separately, and that any combination of these steps may occur serially or concurrently. It may also be appreciated by this description that game play may generally be divided into off-line play, such as shown in steps one, two, and three, which generally encourages a kid to move and be active, and online play, such as shown in step four, which generally requires that the kid be close to or in front of a computer.

Figure 53:
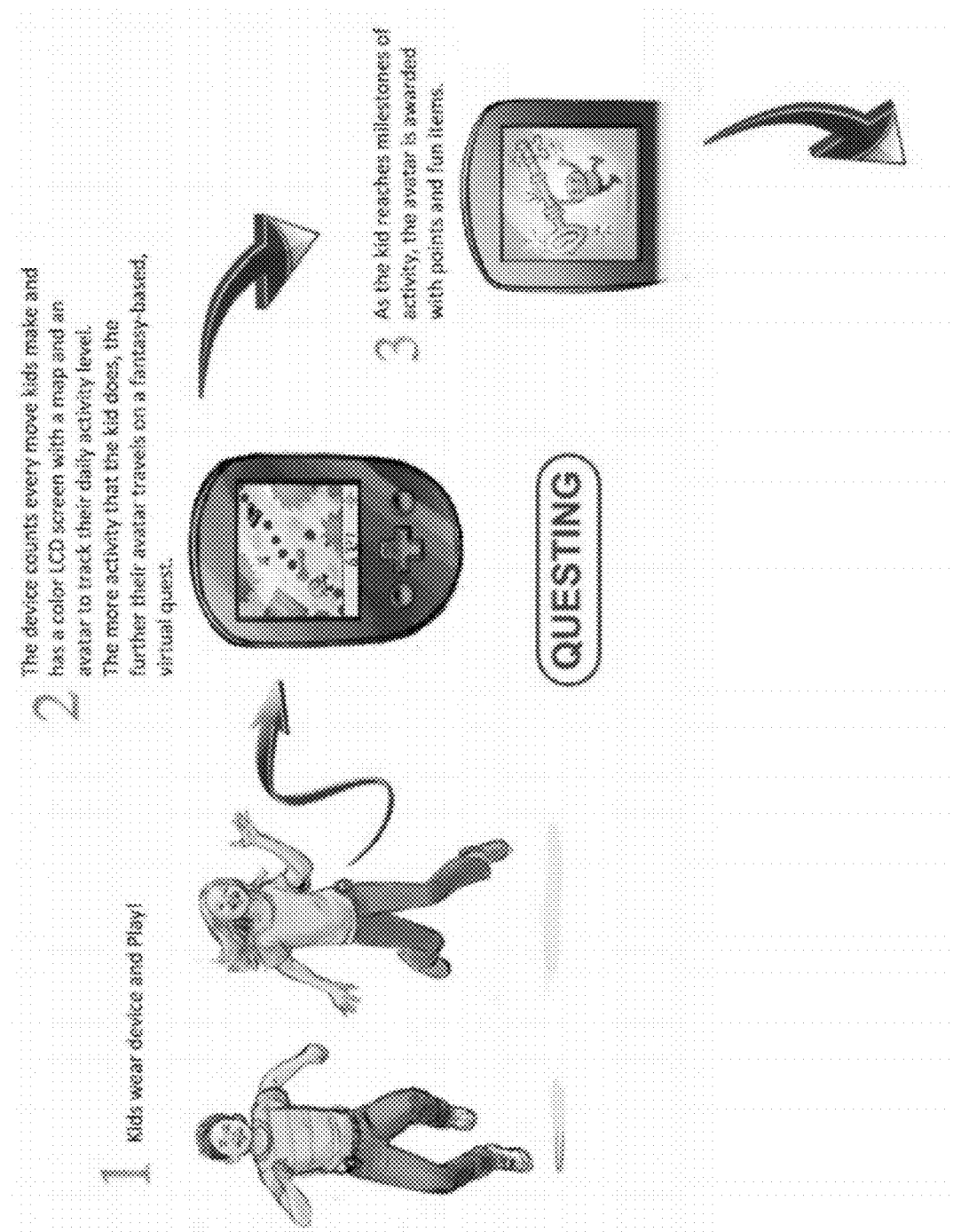
Figure 54:
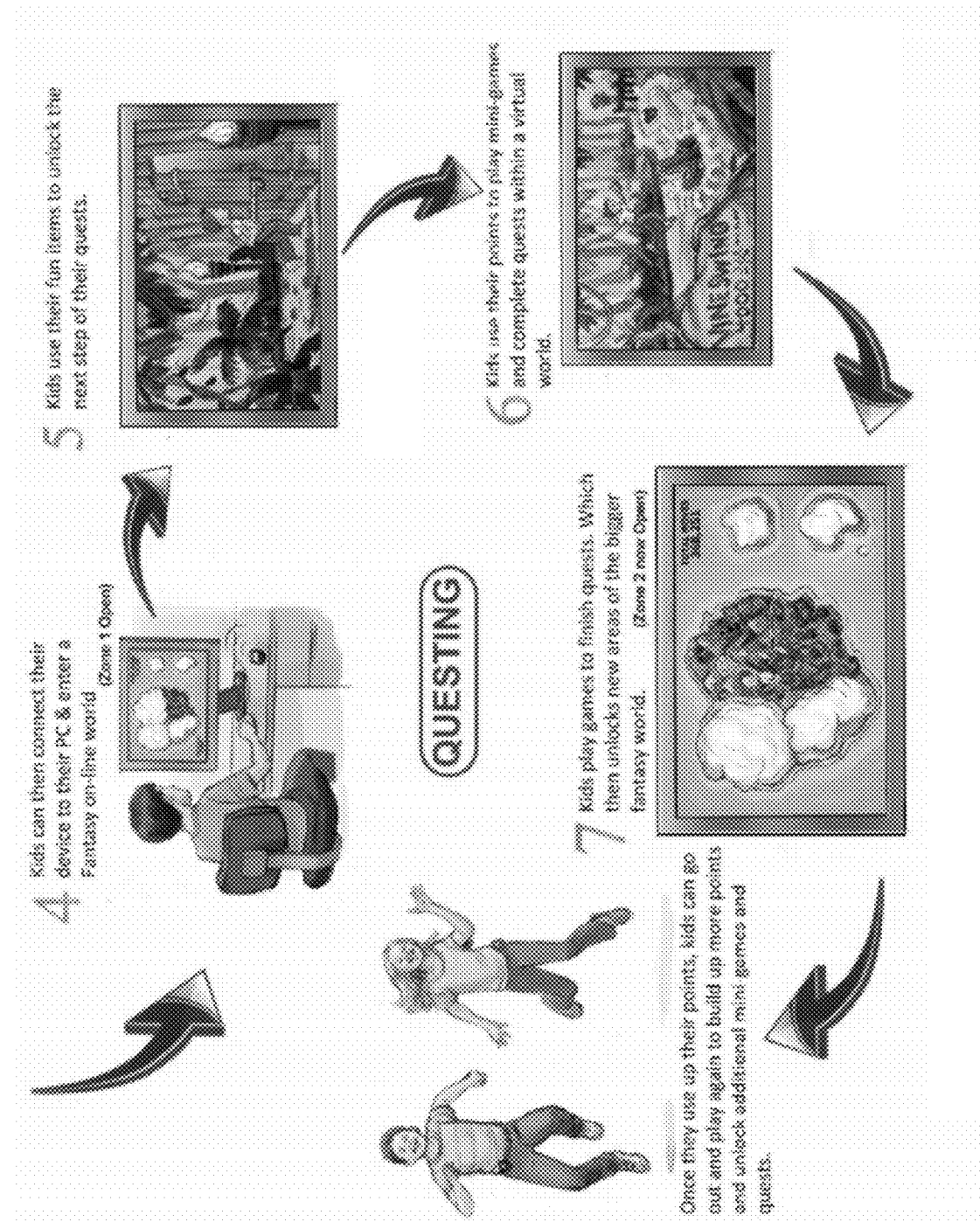

FIGS. 53-54 show a mission-focused treasure hunting game in the questing area of game play. In questing, the on-screen avatar acquires skills and tools during game play. For example, a simulated key found at one point in the game may later be used to unlock a door.

Different views of the map may be presented, at different simulated zoom levels, with more of the map being revealed as game play progresses. For example, in FIG. 54, step seven, the clouds are shown revealing an additional portion of a simulated Island, relative to step four. Winning the game causes the clouds to dissolve when the avatar reaches the blue gem.

As shown in FIGS. 53-54, the questing area of game play may be described by the following conceptual steps. In step one, kids wear the device and play. In step two, the device counts every move kids make and has a color LCD screen with a map and an avatar to track their daily activity level. The more activity that the kid does, the further their avatar travels on a fantasy-based virtual quest. In step three, as the kid reaches milestones of activity, the avatar is awarded with points and fun items.

In step four, kids can then connect their device to their personal computer and enter a fantasy on-line world. In step five, kids use their fun items to unlock the next step of their quests. In step six, kids use their points to play mini-games and complete quests within a virtual world. In step seven, kids play games to finish quests. This then unlocks new areas of the bigger fantasy world. Once they have used up their points, kids can go out and play again to build up more points and unlock additional mini-games and quests.

It should readily be appreciated that any one of these steps in the questing area of game play may be played separately, and that any combination of these steps may be played serially or concurrently. It may also be appreciated that questing game play may include play which is generally off-line play, such as shown in FIG. 53, steps one, two, and three, which generally encourages a kid to move and be active, and that questing game play may include play which is generally off-line play, such as shown in FIG. 54, steps four to seven, which generally requires that the kid be close to or in front of a computer.

Figure 55:
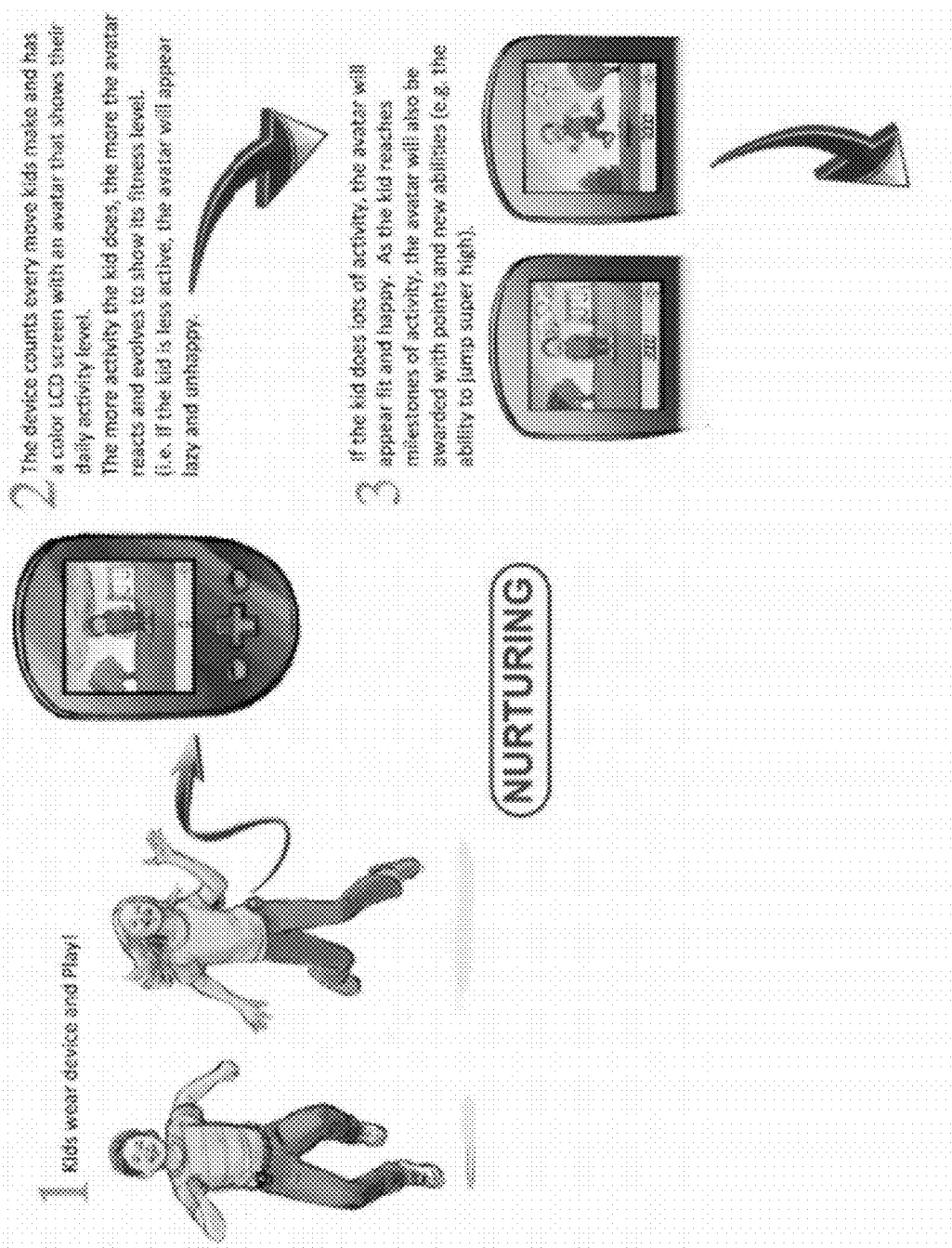
Figure 56:
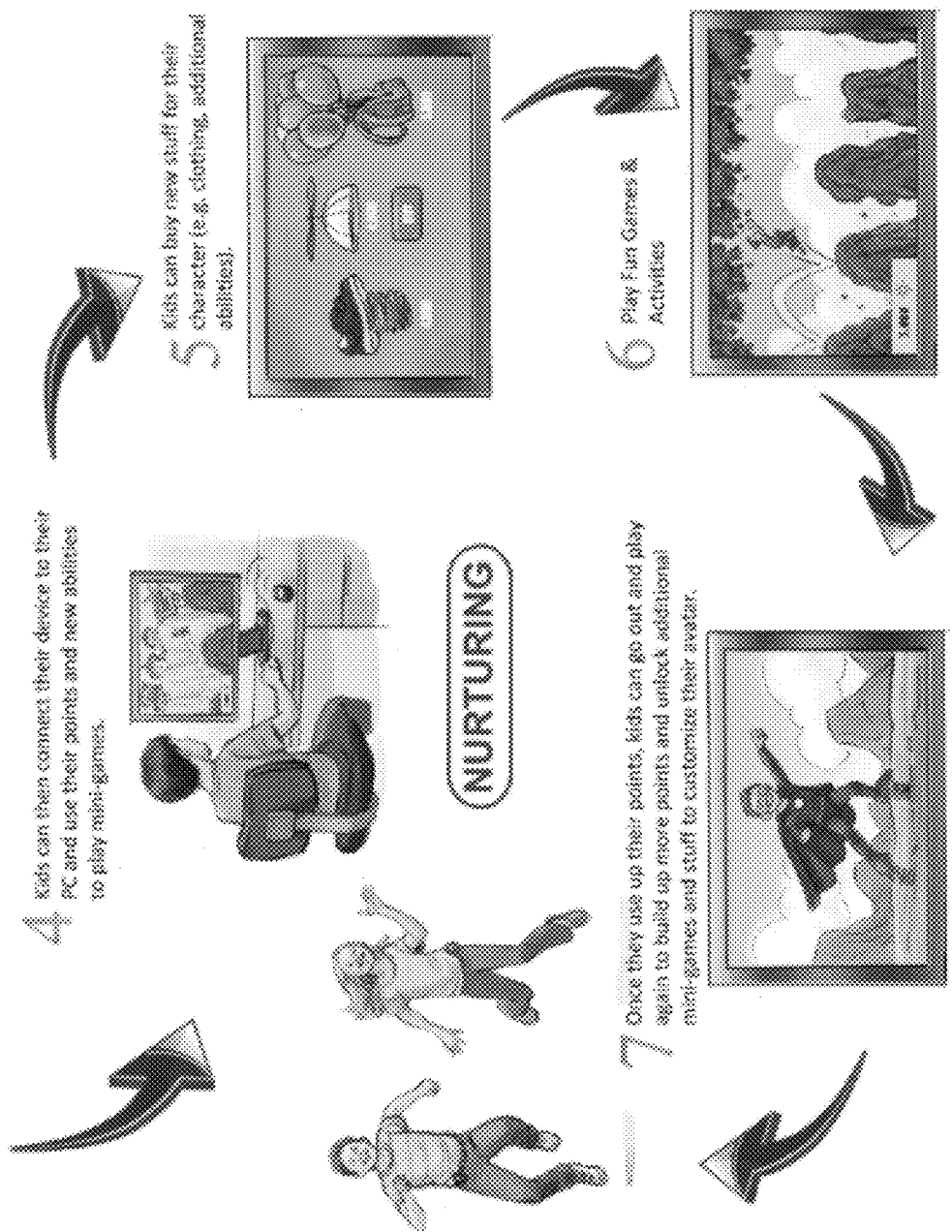

Nurturing game play is illustrated in FIGS. 55 and 56, with FIG. 55 generally representing off-line play, and FIG. 56 generally representing online play. During nurturing game play, the avatar and visual displays are very much about the character or the health of the character, so that more activity relates to a happier and perhaps better looking character. Furthermore, the avatar tends to acquire better skills as a kid wearing the device is more active. Thus, more moves of the device may translate to more progress in the game, more skills, exposure of more of the map, discovery of more treasure, and the availability of more simulated points to acquire various gadgets. Conversely, lack of moves of the device may cause the avatar to retreat from prior areas, and you lose the ability to perform certain skills.

As shown in FIGS. 55-56, the nurturing area of game play may be described by the following conceptual steps. In step one, kids wear the device and play. In step two, the device counts every move kids make and has a color LCD screen with an avatar that shows their daily activity level. The more activity the kid does, the more the avatar reacts and evolves to show its fitness level (i.e., if the kid is less active, the avatar will appear lazy and unhappy). In step three, if the kid does lots of activity, the avatar will appear fit and happy. As the kid reaches milestones of activity, the avatar will also be awarded with points and new abilities (e.g., the ability to jump super high).

In step four, kids can then connect their device to their personal computer and use their points and new abilities to play mini-games. In step five, kids can buy new stuff for their character (e.g. clothing, additional abilities). In step six, kids can play fun games and activities. In step seven, once they use up their points, kids can go out and play again to build up more points and unlock additional mini-games and stuff to customize their avatar. It should readily be appreciated that any one of these steps in the nurturing area of game play may be played separately, and that any combination of these steps may be played serially or concurrently.

Figure 57:
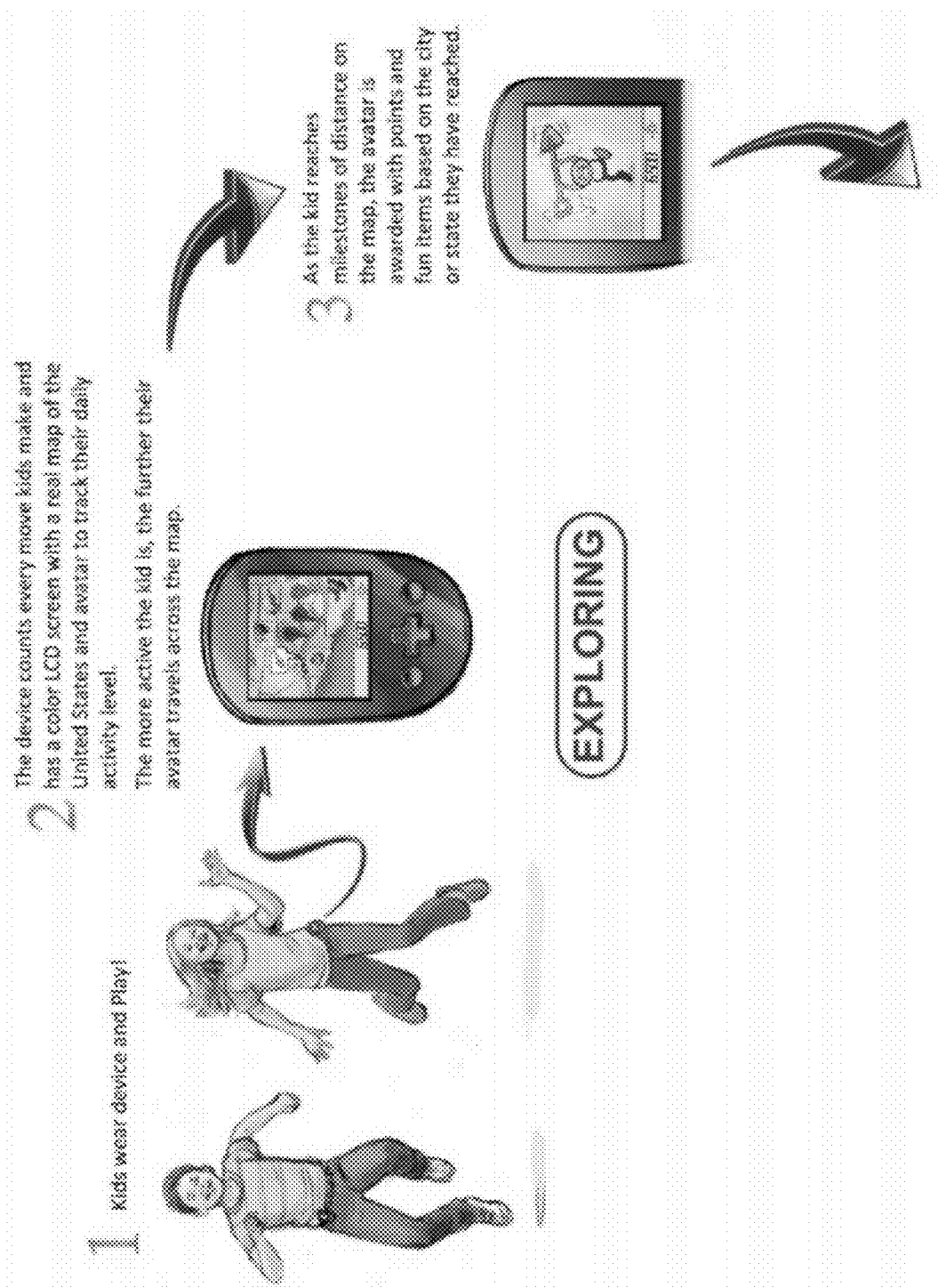
Figure 58:
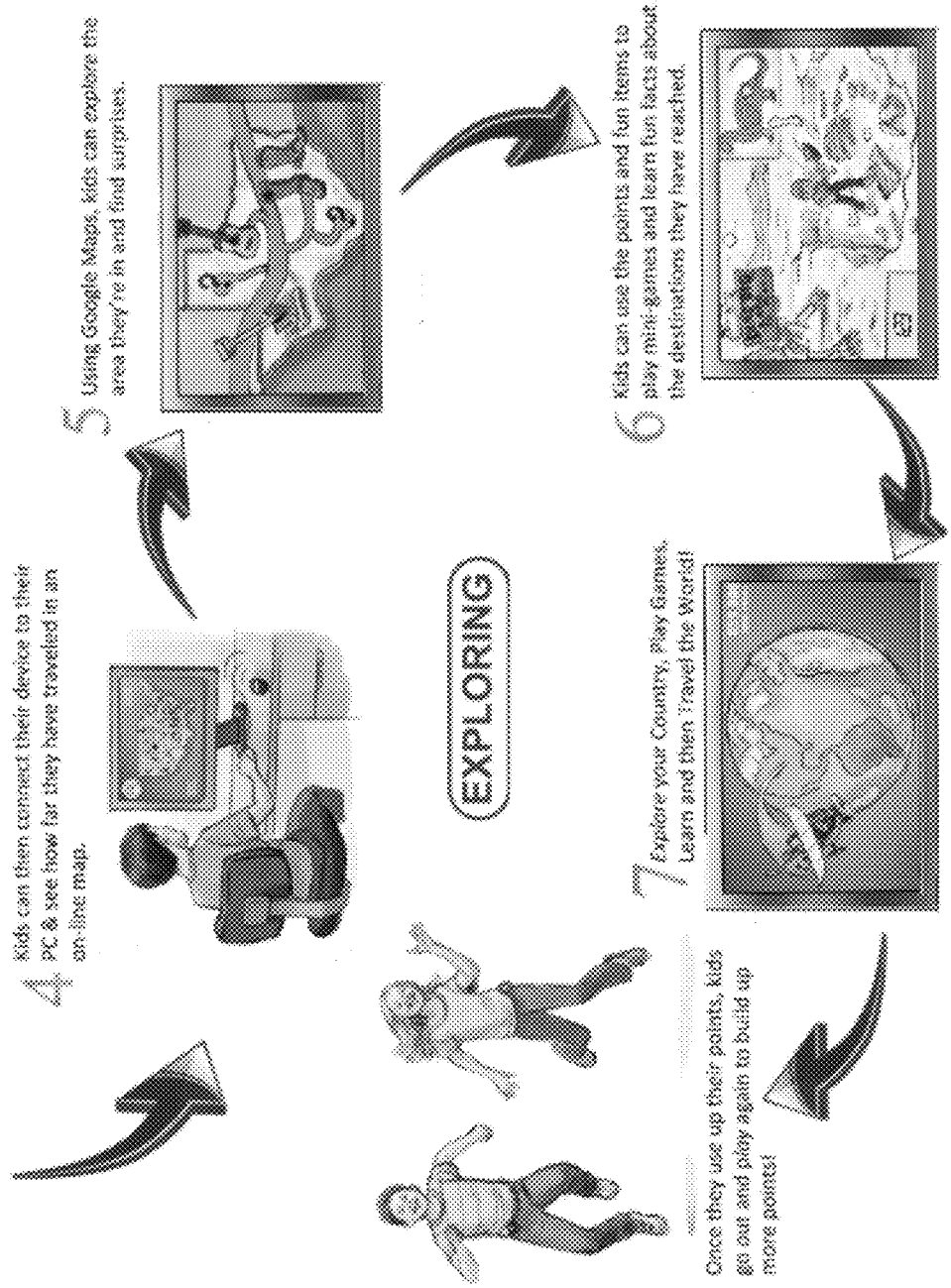

Exploring game play is illustrated in FIGS. 57 and 58, with FIG. 57 generally representing off-line play, and FIG. 58 generally representing online play. The exploring area of game play is more open-ended, and more surprise-oriented. Preferably, exploring game play involves traveling around a map that relates directly to the real-world location of a kid playing the game. For example, a kid living in California might start exploring a map representing the state of California. In one embodiment, the kid is encouraged to select a destination, for example Florida, and game play involves progressing from a current location to the destination, for example from California to Florida.

Preferably, the destinations and routes would relate directly to real-world locations, cultures, communities, buildings, ecosystems, and the like. The exploring game play area may work well in connection with an online mapping website, such as "Google Maps." The on-screen displays would show real locations, with real points of interest. This would encourage a kid to explore an area and learn real geography.

As part of game play, the avatar may use previously acquired objects to play mini-games associated with real points of interest, further integrating the game play with the real world exploration. For example, in one embodiment, shown in FIG. 58, step 6, kids may use acquired points and a previously acquired virtual shovel at a geographic destination they have reached, to play a mini-game, in which virtual dinosaur bones are excavated from the (virtual) ground and then arranged in their anatomically correct positions to reconstruct the skeletons of one or various extinct dinosaur species.

As part of game play, the avatar may discover mechanical parts that will later be assembled into a traveling machine. For example, the avatar may discover a propeller in one state, and a fuselage in another state. After exploring enough of a particular country, the avatar will have acquired enough mechanical parts to assemble the traveling machine. This will allow the avatar to select a different country, for further exploration.

As shown in FIGS. 57-58, the exploring area of game play may be described by the following conceptual steps. In step one, kids wear the device and play. In step two, the device counts every move kids make and has a color LCD screen with a real map of the United States and avatar to track their daily activity level. The more active the kid is, the further their avatar travels across the map. In step three, as the kid reaches milestones of distance on the map, the avatar is awarded with points and fun items based on the city or state they have reached.

In step four, kids can then connect their device to their personal computer and see how far they traveled in an on-line map. In step five, using an online map, kids can explore the area they are in and find surprises. In step six, kids can use the points and fun items to play mini-games and learn fun facts about the destinations they have reached. In step seven: explore your country, play games, learn and then travel the world. Once they use up their points, kids go out and play again to build up more points. It may readily be appreciated that any one of these steps in the exploring area of game play may be played separately, and that any combination of these steps may be played serially or concurrently.

Figure 59:
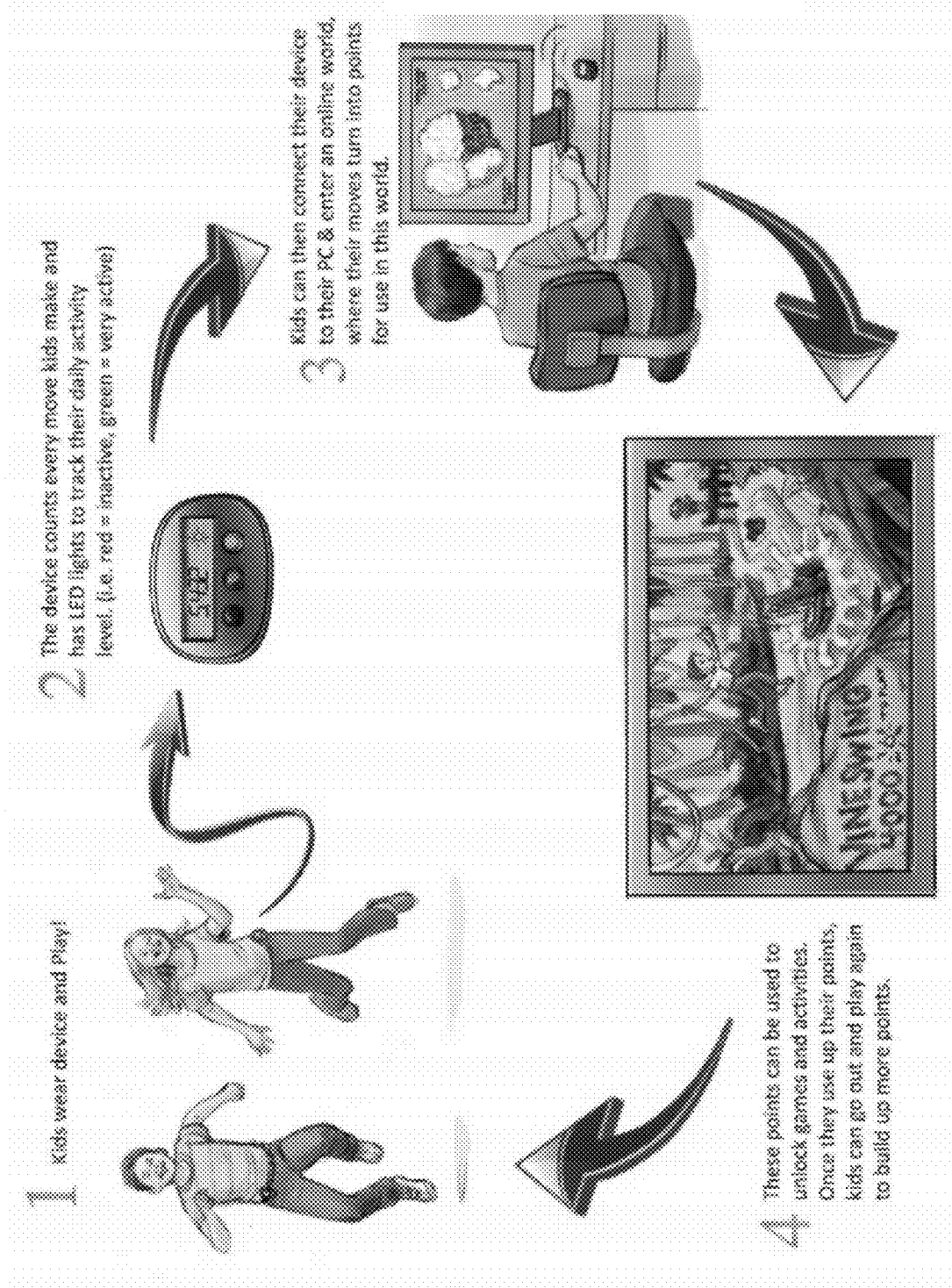

Play progression may generally continue between off-line play and online play, thereby encouraging a 360-degree planning experience, in which the device becomes an integral part of an active day. An example of continuous game play progression is shown in FIG. 59, including the following conceptual examples of game play steps. In step one, kids wear device and play. In step two, the device counts every move kids make and has LED lights to track their daily activity level (e.g., red=inactive, green=very active). In step three, kids can then connect their device to their personal computer and enter an online world, where their moves turn into points for use in this world. In step four, these points can be used to unlock games and activities. Once they use up their points, kids can go out and play again (step 1) to build up more points (step 2). When the device is near a computer, you may connect automatically, and consequently transition to an online mode in which the shake sensor is locked out, or has limited functionality.

The embodiment of the device shown in FIG. 59 is much simpler than what is shown in FIGS. 51-58. The embodiment of FIG. 59 has a single-line LCD text display, with minimal graphics. The embodiment of FIG. 59 has few if any pushbuttons or other input devices. The device of FIG. 59 simply tracks motion of the kid wearing or carrying the device.

Figure 60:
FIG. 60 shows and outlines illustrative examples of systems, methods, and devices for assisting play and/or other activities, generally related to a handheld or wearable computer that monitors activity and facilitates role playing.

Turning now to FIG. 60, a handheld or wearable portable computer that monitors activity and facilitates role playing is shown. Gameplay consists of guided play via interactive story installments downloaded wirelessly to the child's wearable or handheld device. As the story unfolds, the child is prompted to act out parts of the story with motion. The motion may involve their device, e.g. a swinging sword, or may involve simple actions—jump over the river!, crawl through the bushes!, etc. Points and other rewards are given for achievements throughout the game.

If two or more players are involved, then the devices interact to add dimension to the game—e.g. swing your swords, slay the dragon together! Also competitive dimensions can be added: quick, run 100 yards, jump up and down faster than your friends!

Motion Sensor: Accelerometer
Display: LCD or LED
Text based instructions with sound FX (sound effects)
Able to set game time and difficulty and mode
Connect to the Internet for story download, customization
Connect to other similar devices in proximity
Dance/Jump/Run/Twirl
Random prompts
Playtime 15 minutes to 24 hours
Story payoff/mission complete For older players, this play experience can migrate to mobile applications to take advantage of the installed mobile device base.

Play Together or Apart
Older play
Cell phone application (software application)
Players can create missions and invite participants or join global missions via a virtual handshake All of the above games can be played individually, in local teams, or in disparate teams located around the world. Activities can be coordinated to create "flash mob" like events.

Figure 61:
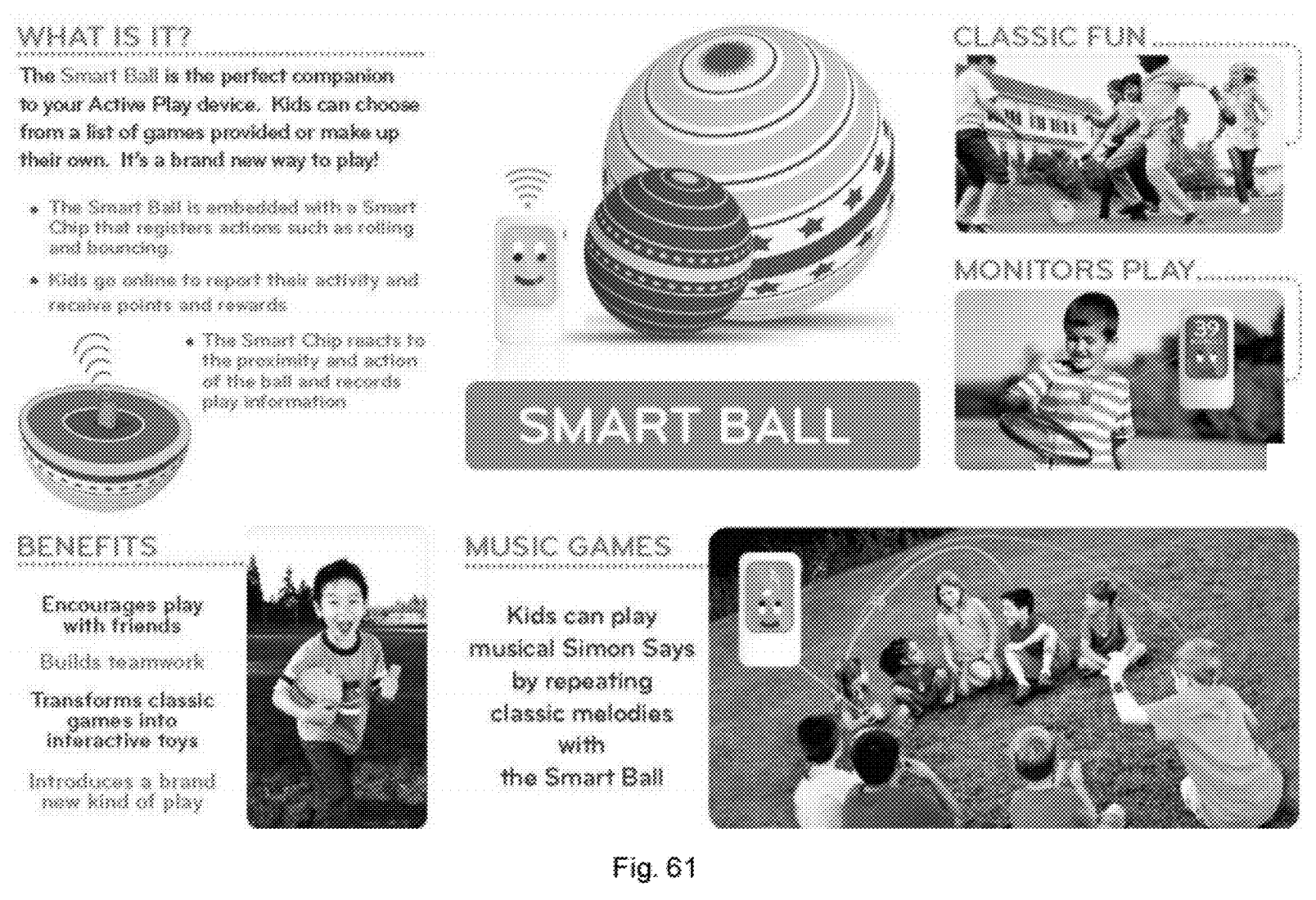

Activity creates story or story directs activity
Enable pretend play
  "House"
  "Store"
  "Camping"
Accelerometer or greater
Has display (LCD or LED)
Text based instructions with sound FX
Able to set game time and difficulty and mode
Connect to net for story download, customization
Connect to other devices in proximity
Dance/Jump/Run/Twirl
Random prompts
Playtime 15 minutes to 24 hours
Story payoff/mission complete Turning next to FIG. 61, a "smart" ball is shown, generally for use in connection with the handheld or wearable portable computers of FIG. 60. The ball shown in FIG. 61 is a peripheral to the primary wearable device/controller of FIG. 60. The ball interacts with the device to provide sensory feedback that can be used to create new individual or group games. For instance, if the rules of a particular game are followed properly, an audible tone signifying success is heard. The ball can record and store a count of the number of bounces, angle of bounces, heights achieved, speed achieved, distance achieved, and/or pressure applied.

The basic components shown in FIG. 61 include one or more smart balls each with an imbedded sensor and optional audio or visual feedback, and a primary wearable tracking device with sensory feedback such as auditory or visual outputs.

Various games may be played, as follows.

Game #1: Concentration Catch

What's needed? One smart ball as shown in FIG. 61, and a primary wearable device as shown in FIG. 60 for each player. Players arrange themselves in a circle and decide who will be first. The first player takes the ball and presses the "start" button. The players' wearable devices play a simple melody. Each player's device plays one note of the melody. Each player's device plays a unique note and only one unique note. As each note is played, a color unique to each device is displayed. Players must replay the melody by throwing the ball to each other in the proper order. If player one is also the first note, he/she must toss the ball in the air and catch it before throwing to the player with the second note. As the ball is thrown, the melody either progresses or an error tone sounds. If an error tone sounds, the melody must be restarted from the beginning. Once the melody is successfully played, a new melody is played and play continues.

Variations include:
Times melodies—players must play the next note in a specific period of time. Time shortens as play progresses.
Complex melodies—player devices may play more than one note or play multiple notes in succession.
Melody only—no color cues are provided
Lights only, no melody
Players stand in a line rather than a circle Game #2: Dodge Ball What's needed? One larger smart ball as shown in FIG. 61, and a primary wearable device as shown in FIG. 60 for each player. (The larger ball may be soft or bouncy, to avoid injury or pain if the ball hits a user.

Players decide who is "it". Remaining players line up against a wall. The player selected to be "it" presses a start button. The devices worn by the other players against the wall sound off in a specific order determined by programming in one or more of the devices. The player selected to be "it" tries to hit the other players with the ball, in the specific order. If player selected to be "it" does not follow the order properly, that player who is "it" must start over.

Game #3: Target Catch

What's needed? One smart ball as shown in FIG. 61, and a primary wearable device as shown in FIG. 60 for each player. Any player decides to be "First," and presses a start button. All players' devices display a unique color using a light on an on-board screen. Lights inside the ball change color to correspond to at least one of the player devices. The player holding the ball must throw the ball to the player with the corresponding color, within a selected time frame.

Game #4: Ball Games

What's needed? One smart ball as shown in FIG. 61, and a primary wearable device as shown in FIG. 60 for each player. Players accomplish tasks with their ball, either in competition with themselves or others. If in competition, wearable device that is present will record winning ball.

Tasks/Variations include:
Bounce x number of times
Bounce off x surfaces x number of times
Throw the ball the highest
Throw the ball the farthest
Throw the ball the fastest
Squeeze the ball the hardest
Do any of the above in a preselected order Continuing to FIG. 62, small card-shaped sensors with onboard light and/or sound outputs are shown (labeled as a "Go-Card") used in connection with a handheld or wearable computer of the type shown in FIG. 60. The system shown in FIG. 62 allows kids to play traditional games such as hide-and-seek or tag, and also to create new games.

Figure 62:
FIG. 62 shows and outlines illustrative examples of systems, methods and devices for assisting play and/or other activities, generally related to a wearable cards or tags with an integral accelerometer and communication system, used in connection with a handheld or wearable computer of the type shown in FIG. 60.

What's needed? Multiple Go-Cards as shown in FIG. 62, and a primary wearable device as shown in FIG. 60 that communicates between the Go-Cards and the Internet or other network. The primary wearable device acts as a communication hub that connects to the Internet or other network via cell networks and/or Wi-Fi. The Go-Cards may be placed inside a card holder that may look like a ball or bracelet. One such card holder may be shaped to accommodate up to 15 Go-Cards.

Additional or expansion pieces might include:
Sensing Play Chips—for detecting things that enhance playing
    Action chips (can tell if you are walking, jumping, running, etc.)
    Location detection chips
    Biometric chip (detects heart rate, blood oxygen level, glucose)
    Brightness chip (can tell if they are in a bright/dark place)
    Camera chip
    Button and Stomp chip (it's just waiting for you to jump on it, or press its button!)
Feedback Play Chips—for communicating information to players
    Light chip (the primary wearable device controls what color is displayed. Alternatively, a button on the Light Chip will cycle through available colors, and communicate a color selection to the primary wearable device.)
    Display chip (has a display controlled by the primary wearable device.)
    Vibrate chip (By vibrating, it gives hints, or may indicate that something related to gameplay is about to happen, or whether something used in the gameplay is close.)
    Sound chip (talks, plays exciting music, tones, or other sounds to enhance gameplay)
Play Chip key-chain: string your Go-Cards together loosely for showing off to your friends
Play Chip arm band: Wear your Go-Cards in an arm band, where all players can see them.
Your phone or computer can be used to go to a vendor web site, such as a
Game App Store, where a user may buy games that are loaded wirelessly straight into to a primary wearable device.

Game #1: Tag (and other "it" games like Duck-duck-goose/Last man out)

What do you need to obtain?

A pack of 7 "Go-Cards" (One "Go-Card" per person). The Go-Cards are about the size of an SD-memory chip, and twice the thickness.

A primary wearable device as shown in FIG. 60 that communicates between the Go-Cards and the Internet.

Software that defines a Tag game application, which is downloaded to the primary wearable device.

Game Play

Single Tag: Everyone has a color/light Go-Card. The primary wearable device randomly assigns one person to be "it" by controlling a corresponding Go-Card to light up red. All other Go-Cards might light up differently, such as green. When a trigger event occurs (the "it" sensor taps another, or a long (say 20 second) time has elapsed), the primary wearable device randomly assigns someone else to be "it". The resulting gameplay is exciting! For example, in the game of Tag, the randomized choice of who is "it", and introduction of a time limit both may make players play faster.

Group tag: Everyone has a color/light GO-Card. The primary wearable device randomly assigns half of the people to be "it" by controlling corresponding Go-Cards to light up red. All other Go-Cards might light up differently, such as green. When a trigger event occurs (all "it" sensor tap a "non-it" sensor, or a long (say 20 second) time has elapsed), the primary wearable device randomly assigns a different grouping of people to be "it".

Users may collect (purchase) more Go-Cards, so that additional games may be played. The Go-Cards may be limited in certain respects, to encourage collecting and showing off of Go-Cards on key chains, necklaces, and bracelets.

Game #2: Hide and Seek

Optional additional parts:

Proximity/location chips for each player

1 Vibrate chip for each hider

Biometrics chips for each hider, that communicate to the primary wearable device, and tell the seeker when the hiders are getting anxious.

Color/Vibrate/Screen/Sound chip for the seeker, to tell the seeker when he/she is getting close to a seeker.

Game Play

As the seeker approaches a hider, the hider's vibrate chip begins to vibrate with increasing rapidity—the hider knows that the seeker is getting close!

Optional: If the hider also has a Biometrics Chip, and the seeker has a Feedback chip (either Color, Vibrate, Screen, or Sound), the primary wearable device communicates the state of the hiders' combined biometrics to the seeker!

Game #3: Freeze Tag

This game is like tag, except that to "unfreeze," a player has to move around enough to cause the Go-Card to record a pre-set minimum amount of activity.

Figure 63:
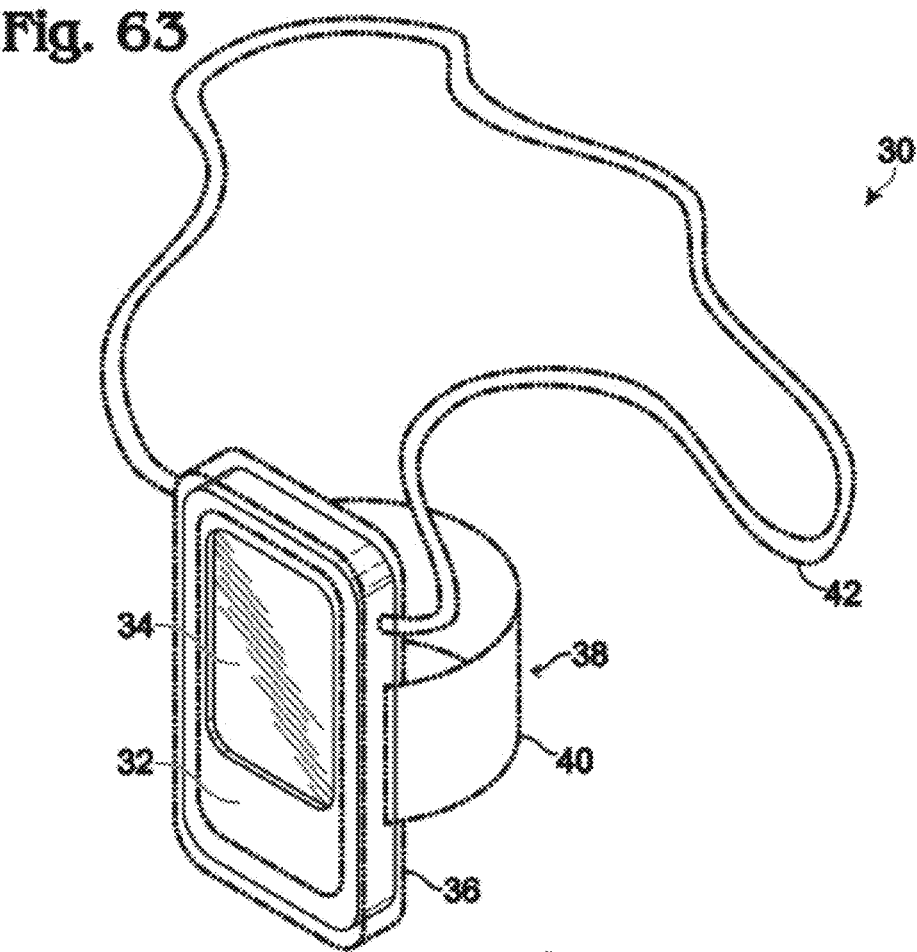
FIG. 63 shows an illustrative example of a portable computer of a system for assisting play and/or other activities.

FIG. 63 shows an illustrative example of a portable computer 30. The portable computer may include any suitable structure configured to perform one or more functions of device 12, such as one or more functions of the primary wearable device described above. For example, portable computer 30 may include an enclosure or housing 32 and a display 34, such as a touch-screen display. The portable computer also may alternatively, or additionally, include one or more other input devices, such as buttons, toggle switches, levers, etc.

In some examples, the portable computer may include a case 36 configured to hold or enclose at least a portion of housing 32. The case may include one or more attachment devices 38 that may allow a user to attach or support the portable computer on a portion of the user's body. For example, attachment device 38 may include at least one strap 40 that may be worn on a person's arm and/or a lanyard 42 that may be worn around the user's neck. Other attachment device(s) may alternatively, or additionally be included with case 36, such as clips, cords, etc. The attachment devices may alternatively, or additionally be included with (or attached to) the housing.

Figure 64:
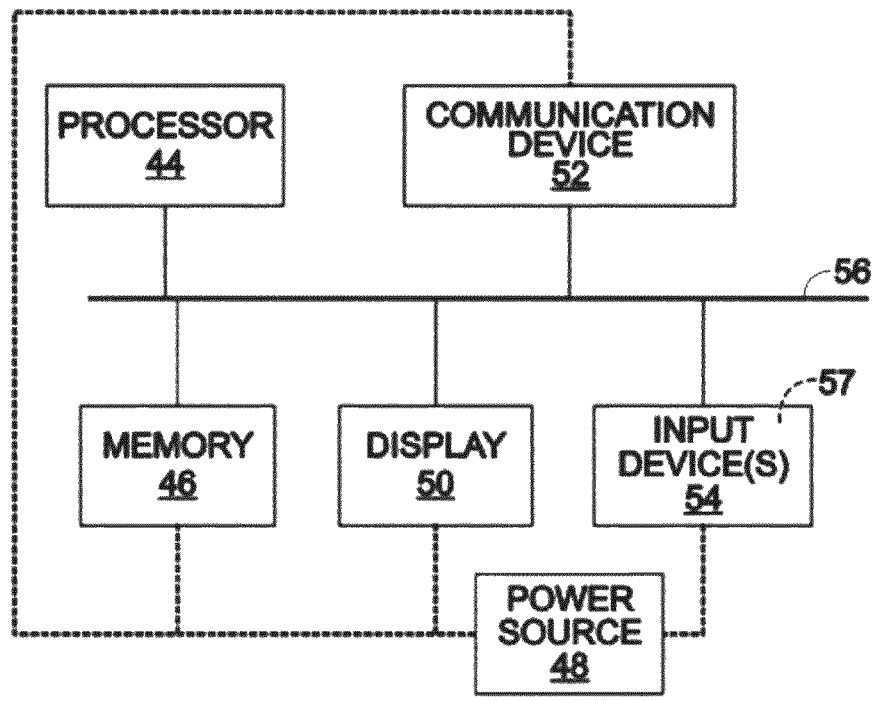
FIG. 64 shows illustrative components of the portable computer of FIG. 63.

FIG. 64 shows an illustrative example of components of portable computer 30. For example, portable computer 30 may include a processor 44, memory 46, a power source 48, a display 50, a communication device 52, and one or more input devices 54. The components of portable computer 30 may be connected by a bus 56 and/or in any suitable manner, such as one or more components being directly connected to the processor. Unless specifically excluded, portable computer 30 may include one or more components of other systems and/or devices described herein, including one or more components of the portable devices described below.

Processor 44 may be configured to control operation of one or more other components of the portable computer. The processor and memory 46 may be separate components, as shown in FIG. 64, or the memory may alternatively, or additionally, be part of processor 44.

Power source 48 may include any suitable structure configured to provide power to one or more other components of the portable computer. For example, the power source may include one or more batteries, one or more fuel cells, one or more solar panels, one or more DC or AC connectors, etc. Power may be provided directly and/or in any suitable manner to the components.

Communication device 52 may include any suitable structure configured to transmit computer data based, for example, on input received from the input device(s). Additionally, or alternatively, communication device 52 may be configured to receive computer data from other separate devices, such as the portable devices described below. In some examples, communication device 52 may be referred to as a "computer communication mechanism."

Input devices 54 may include any suitable structure configured to receive input from a user and/or one or more portable devices described below. For example, input devices may include a user interface 57 such as a touch screen display. Alternatively, or additionally, input device 54 may include one or more buttons, levers, toggle switches, keyboards, pointing device (such as 3D mice, joysticks, or pointing sticks), controllers, cameras, scanners, readers, microphones, sensors, monitors, and/or any other suitable input devices described herein.

Figure 65:
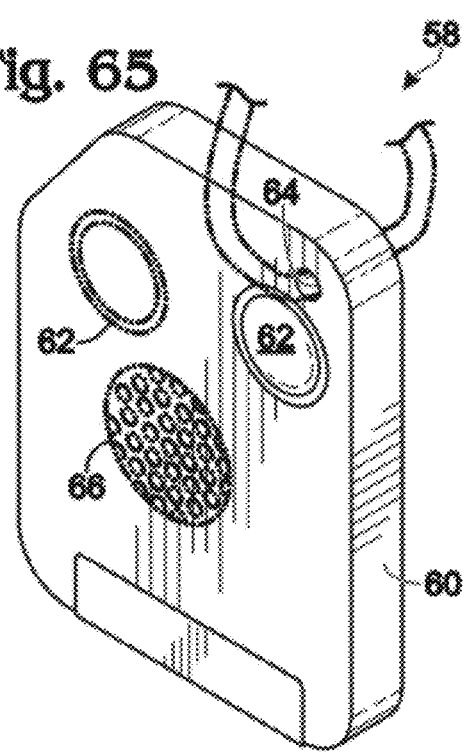
FIG. 65 shows an illustrative example of a portable device of a system for assisting play and/or other activities.

FIG. 65 shows an illustrative example of a portable device 58. The portable device may include any suitable structure configured to perform one or more functions of device 12 and/or interact with one or more separate devices 12, such as portable computer 30. For example, portable device 58 may include an enclosure or housing 60 and one or more light devices 62. The housing may include at least one aperture 64 that may be sized to receive a strap, chain, cord, and/or lanyard. In some examples, the portable device may include one or more audio devices 66, such as a speaker. Unless specifically excluded, portable device 58 may include one or more components of other systems and/or devices described herein, including one or more components of portable computer 30.

Figure 66:
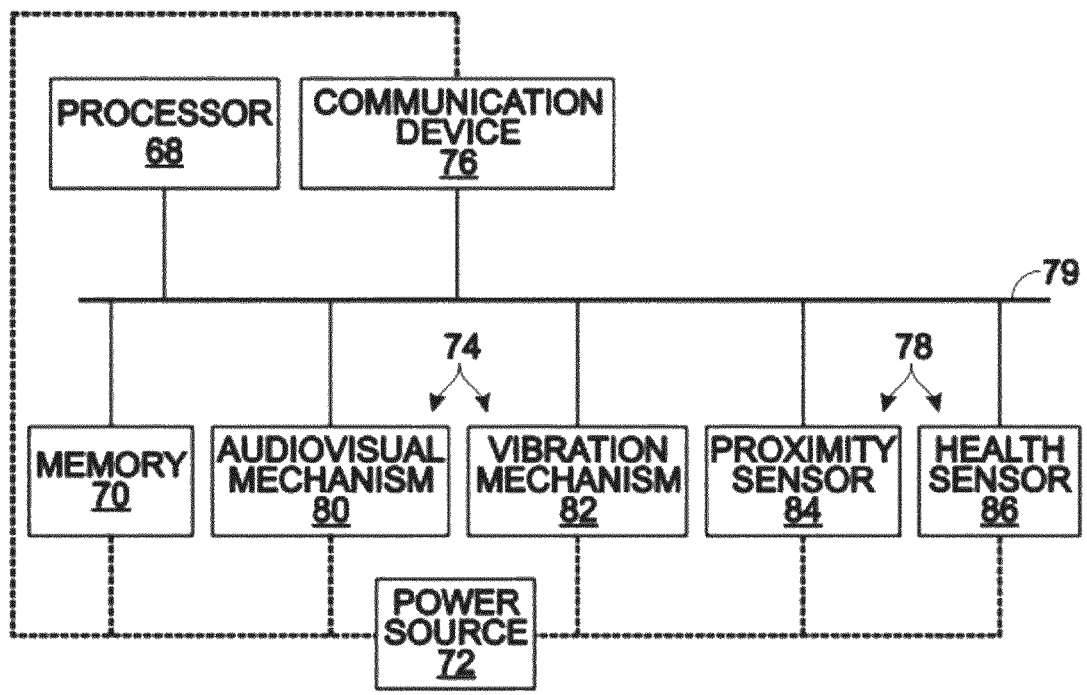
FIG. 66 shows illustrative components of the portable device of FIG. 65.

FIG. 66 shows an illustrative example of components of portable device 58. For example, portable device 58 may include a processor 68, memory 70, a power source 72, one or more output devices 74, a communication device 76, and one or more input devices 78. The components of portable device 58 may be connected by a bus 79 and/or in any suitable manner, such as one or more components being directly connected to the processor.

Processor 68 may be configured to control operation of one or more other components of the portable device. Processor 68 and memory 70 may be separate components, as shown in FIG. 64, or the memory may alternatively, or additionally, be part of processor 68.

Power source 72 may include any suitable structure configured to provide power to one or more other components of the portable device. For example, power source 72 may include one or more batteries, one or more fuel cells, one or more solar panels, one or more DC or AC connectors, etc. Power may be provided directly and/or in any suitable manner to the components.

Output devices 74 may include any suitable structure configured to provide outputs, such as audio outputs, visual outputs, vibration outputs, and/or any other suitable outputs. For example, output devices 74 may include an audiovisual output mechanism 80 configured to generate audio and/or visual outputs based on computer data received from the portable computer, processor 68, and/or one or more input devices 78. Audiovisual mechanism 80 may include light device(s) 62, speaker(s) 66, and/or other suitable structure.

Output devices 74 may additionally, or alternatively, include a vibration output mechanism 82 contained within housing 60 and configured to vibrate the housing. The vibration output mechanism may vibrate housing 60 based on computer data received from the portable computer, processor 68, and/or one or more input devices 78. Output devices 74 may alternatively, or additionally, include devices that generate any suitable output(s), such as other output devices described herein.

Communication device 76 may include any suitable structure configured to receive computer data from portable computer 30 and/or other portable devices 58. Additionally, or alternatively, communication device 76 may be configured to transmit computer data to portable computer 30 and/or other portable devices 58. In some examples, communication device 76 may be referred to as a "device communication mechanism."

Input devices 78 may include any suitable structure configured to receive input from a user, portable computer 30, and/or other portable devices 58. For example, input devices 78 may include a proximity sensor mechanism 84 configured to detect proximity of one or more other portable devices 58 and/or portable computer 30. The proximity sensor mechanism may, for example, detect when one or more other portable devices are within one or more predetermined threshold distances. Alternatively, or additionally, may detect proximity of one or more users and/or one or more other objects or devices.

Input devices 78 may additionally, or alternatively, include a health sensor mechanism 86 configured to detect one or more health characteristics of a user, such as heart rate, blood pressure, and/or other health characteristics described herein. The health sensor mechanism may, for example, detect when the detected heart rate exceeds one or more predetermined threshold rates.

Portable device 58 may additionally, or alternatively, include one or more other input devices 78, such as one or more buttons, levers, toggle switches, keyboards, pointing device (such as 3D mice, joysticks, or pointing sticks), controllers, cameras, scanners, readers, microphones, sensors, monitors, and/or any other suitable input devices described herein.

Output devices 74 may generate one or more outputs based on one or more input devices 78. For example, audiovisual mechanism 80 may generate audio and/or visual outputs based on detected proximity of one or more other portable devices 58 by proximity sensor 84, detected health characteristics of the user by health sensor 86, and/or other input from input devices 78. Additionally, vibration mechanism 82 may generate one or more vibration outputs based on detected proximity of one or more other portable devices 58 by proximity sensor 84, detected health characteristics of the user by health sensor 86, and/or other input from input devices 78.

Additionally, or alternatively, data from one or more input devices 78 may be transmitted to portable computer 30 (which may then transmit to one or more other portable devices 58 based on the received data) and/or other portable devices 58. For example, the detected proximity from proximity sensor 84 and/or detected health characteristics may be transmitted to portable computer 30 via device communication mechanism 76. The portable computer may then transmit computer data to one or more portable devices (which may include or exclude the portable device it received proximity and/or health data from) based on the detected proximity, health characteristics, and/or other input.

Portable computer 30 and portable devices 58 may be used to assist in various activities. The portable computer and portable devices may, for example, be used to assist in games such as Tag, Hide and Seek, Freeze Tag, etc. described above.

FIG. 67 shows an illustrative example of a method 100 of assisting play, such as with a portable computer 30 and a plurality of portable devices 58. Computer data may be transmitted, such as via the portable computer, to a first portable device of the plurality of portable devices, at 102. Audio and/or visual outputs may be generated, such as via an audiovisual mechanism of the first portable device, based on computer data transmitted from portable computer 30 to the first portable device, at 104. For example, the computer data from the portable computer may instruct the first portable device to generate such outputs.

Detection of when the first portable device is within a predetermined threshold distance from one or more other portable devices may be performed, such as via a proximity sensor mechanism of the first portable device, at 106. Audio and/or visual outputs may be generated, such as via an audiovisual mechanism of the first portable device, when the proximity sensor mechanism of the first portable device detects that the first portable device is within the predetermined threshold distance, at 108. The audio and/or visual outputs may be the same or different from the audio and/or visual outputs generated at 104. In some examples, the audio and/or visual outputs at 108 may simply be terminating the audio and/or visual outputs generated at 104.

Computer data may be transmitted, such as via portable computer 30, to a second portable device of the plurality of portable devices, at 110. The second portable device may be different from the first portable device. In some examples, proximity data that indicates that the first portable device is within the predetermined threshold distance(s) from one or more other portable devices may be received by the portable computer. The portable computer may then transmit the computer data at 110 based on the received proximity data.

Audio and/or visual outputs may be generated, such as via an audiovisual mechanism of the second portable device, based on the computer data transmitted from the portable computer to the second portable device, at 112. The audio and/or visual outputs may be the same or different from the audio and/or visual outputs generated at 104 and/or 108.

Method 100 may alternatively, or additionally, include one or more other steps. For example, audio and/or visual outputs may be generated, such as via the audiovisual mechanism of the first and/or second portable devices, after a predetermined time period has elapsed from when an initial audio and/or visual output was generated (such as at 104). The generation of the audio and/or visual outputs based on elapsed time may be performed instead or, or in addition to, generating audio and/or visual outputs based on detected proximity, detected health characteristics, and/or other inputs. Additionally, vibration outputs may be generated, such as via vibration output mechanism of the first and/or second portable devices, in addition to, or instead of, the audio and/or visual outputs described above.

System 10 may include a computer program product that includes a computer-readable storage medium that stores computer-readable instructions that, when executed, implement one or more steps and/or one or more methods of assisting play, such as one or more steps of method 100 and/or one or more steps of other methods described herein.

In some examples, various add-ons and/or additional functionality may be available for the system and/or for the devices. Illustrative examples of functionality that may be provided by and/or incorporated into systems, methods and devices for assisting play and/or other activities may include:
- SDK (Software Development Kit):
  - User/Kid—Create your own games
  - Creator—
  - Pro—Create and sell your own content
- Platform Licensing
- Health and/or Biometric Monitoring, such as:
  - Glucose
  - Heart Rate
  - Metabolism
  - Etc.
- Standardized chipsets for future products
  - Active Play/Needs
- Integrated chipsets, such as:
  - GPS
  - Accelerometer w/Gyro
  - Bluetooth
  - Audio
  - Data
- Cellular Network
- Mobile Content and Data Services
- OS
- Middleware
- Display tech
- Charger tech
- Light/Audio sensors
- Temperature sensors
- Vibration sensors Illustrative examples of peripherals, add-ons and accessories for systems, methods and devices for assisting play and/or other activities, such as those shown in FIG. 3, may include peripherals provided by a sponsoring entity, peripherals that may allow access to additional functionality, architecture of development platform hardware and software, an SDK ecosystem, a Kid SDK, custom games, and the like.

Illustrative examples of peripherals that may be provided by the entity sponsoring the system may include:
- Heart monitoring and/or biometric peripherals;
- Pedometers;
- GPS and compass;
- Hot/Cold lights;
- Light sensors;
- Temperature sensors;
- Speakers;
- Microphones; and
- Mobile Game Consoles.

Accessories, which a user may trade, purchase and/or purchase online to unlock features and/or allow access to additional functionality, such as features in the online environment may include Retail Objects, Game Play Prizes, or the like.

Figure 3:
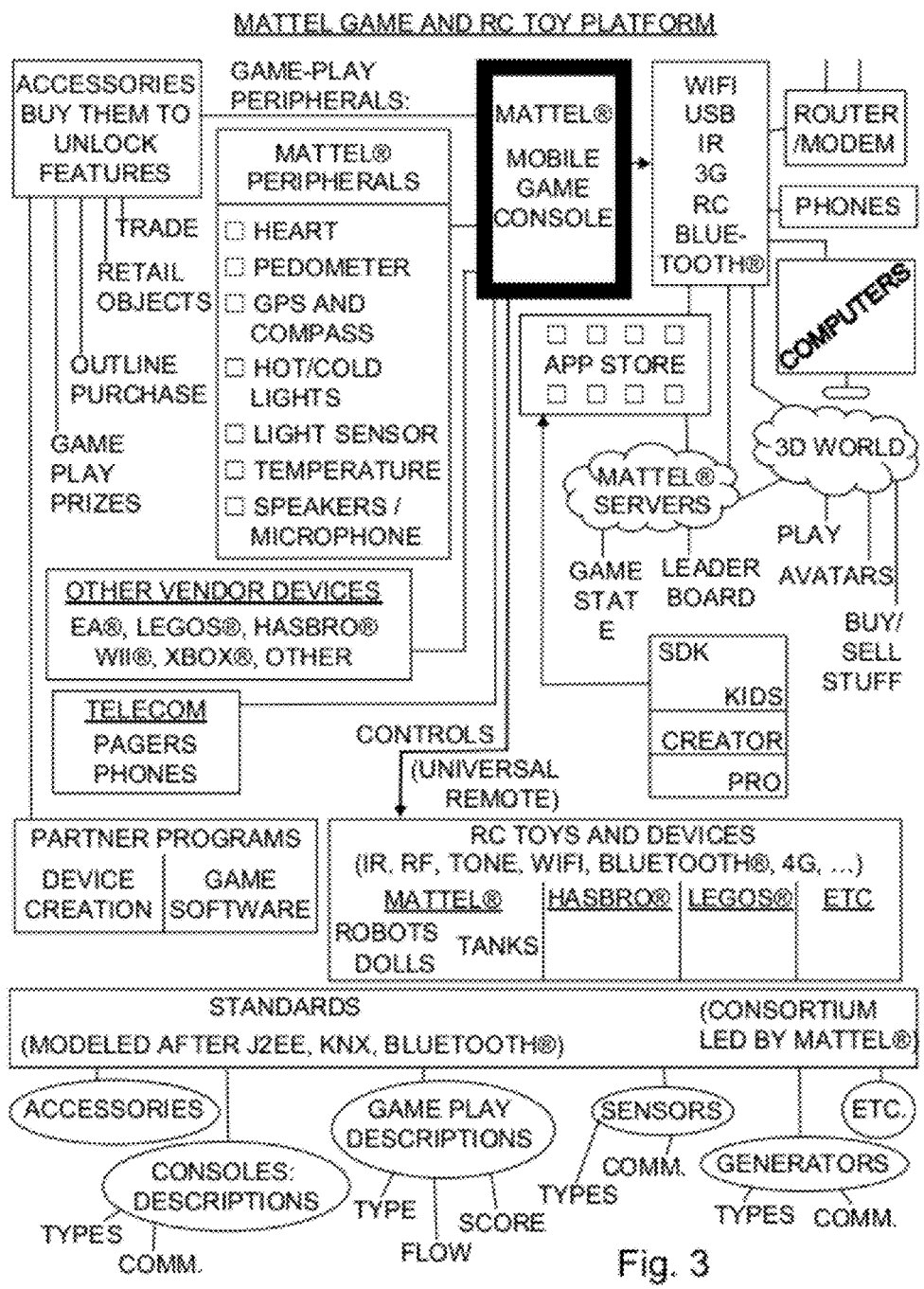
Figure 6:
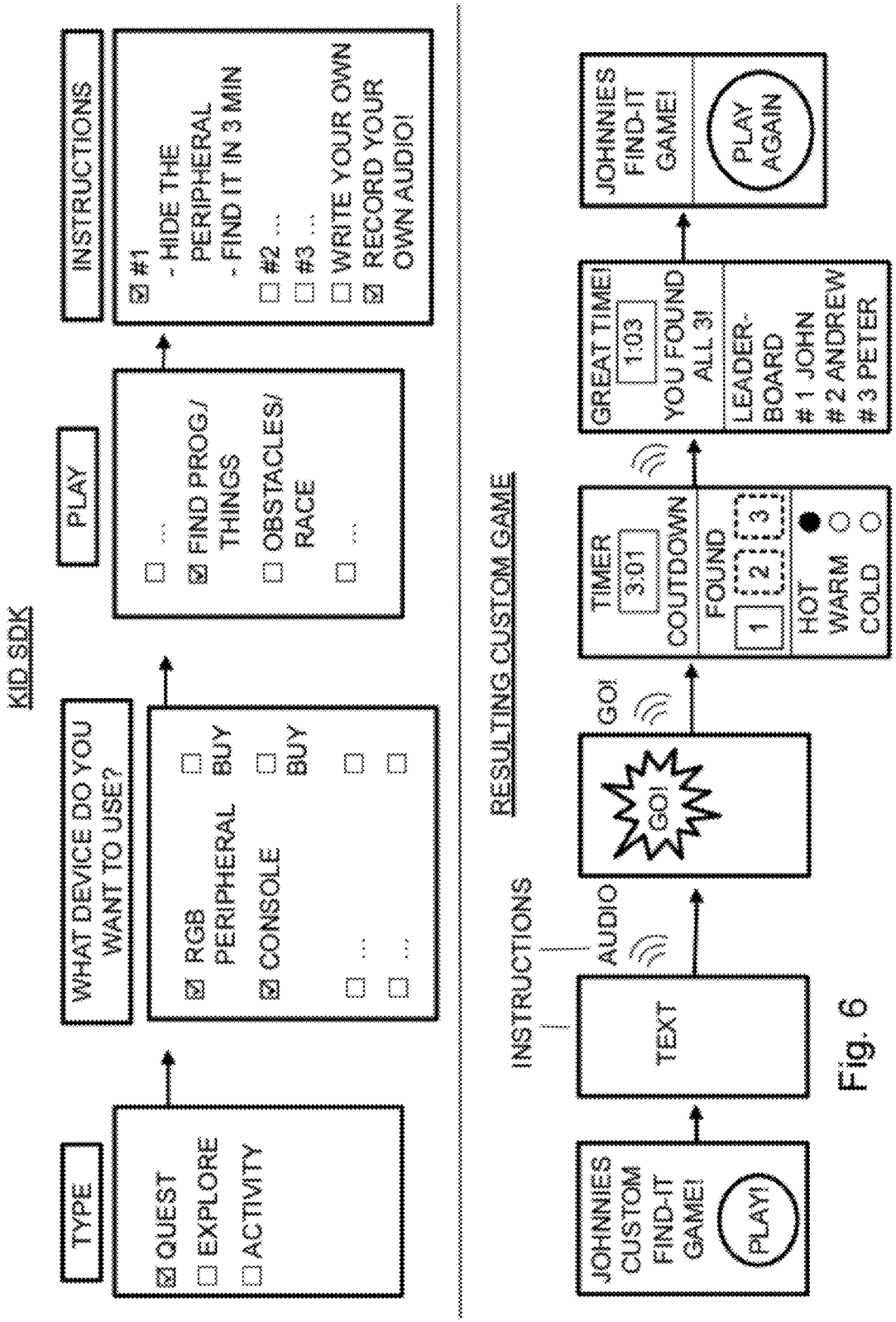
Figure 8:
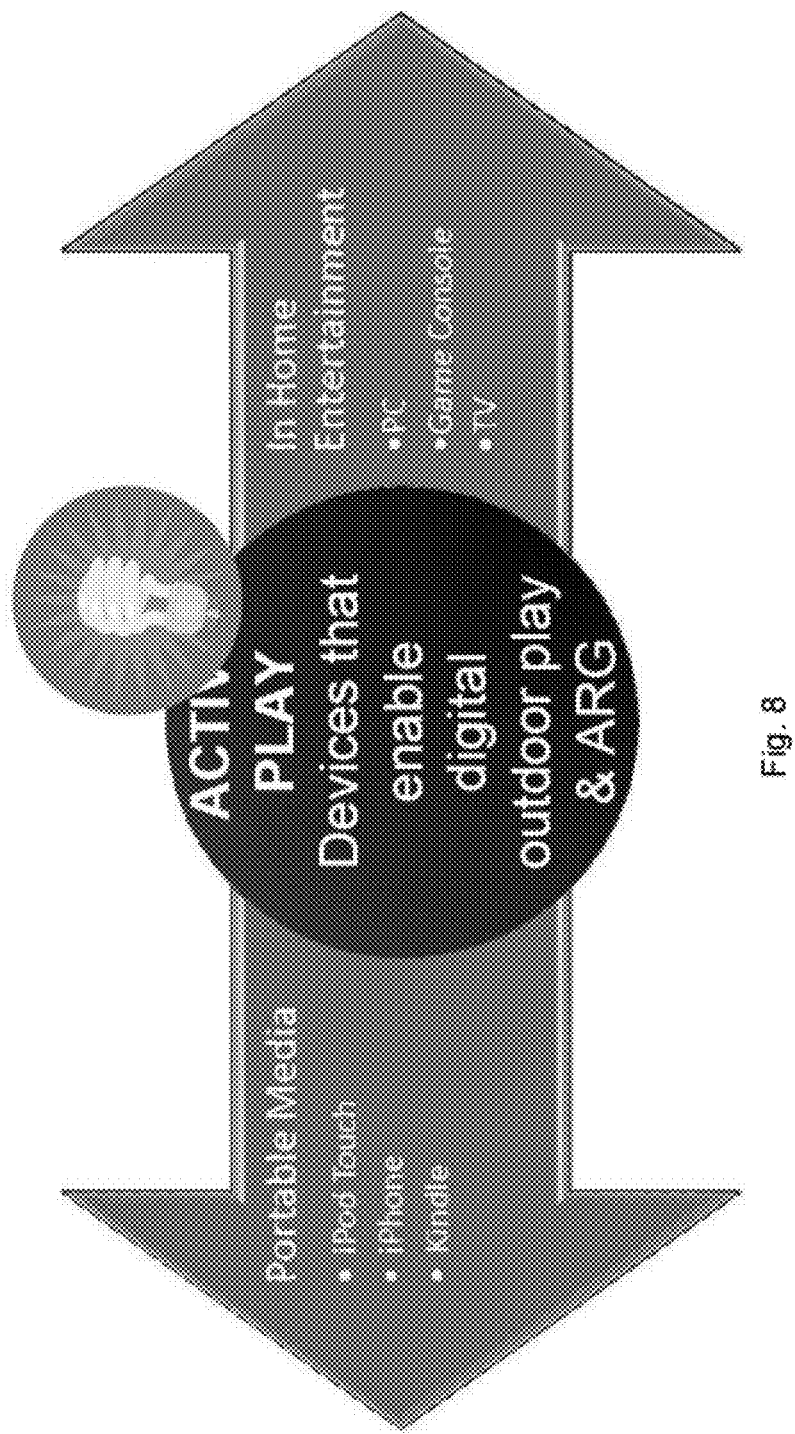
FIGS. 8 and 9 show and outline illustrative examples of systems, methods, and devices for assisting play and/or other activities.

Additional functionality of systems, methods and devices for assisting play and/or other activities, as shown in FIG. 3, may include:
- Controllers, such as where the devices may be configured as a universal remote that may be capable of controlling various devices, including those provided by the system sponsor, as well as third party devices;
- Wi-Fi, USB, IR, 3G, RC, Bluetooth, such as:
  - Router Modem;
  - Phones;
  - Router;
  - Computer;
  - App Store, which may be present on the system sponsor's servers, and may include a Game State, a Leader Board, or the like; and
  - 3D World, such as:
    - Avatars;
    - Play; and
    - Buy and Sell Stuff;
- Telecom, such as Pagers and Phones;
- Devices sold by the system sponsor;
- Third-party-vendor devices;
- Partner Programs, such as:
- Device Creation; and
- Games Software;
- SDK, such as:
- Kids—may allow kids to create their own games, as suggested in FIG. 6;
- Creator; and
- Pro; and
- RC Toys and Devices (IR, RF, Tone, Wi-Fi, Bluetooth, 4G . . . ), such as:
  - Products of the system sponsor, such as Robots and/or Dolls; and
  - Third party products.

The system and/or it various components may comply with various standards, which may be:
- Modeled after J2EE KNX, Bluetooth, and may be applicable to:
  - Accessories;
  - Consoles Descriptions; and
  - Types; and/or
- Established by a consortium led by the system sponsor, such as for:
  - Game Play Descriptions, such as Type, Flow and/or Score;
  - Sensors, such as what types; and
  - Generators, such as what types.

Figure 4:
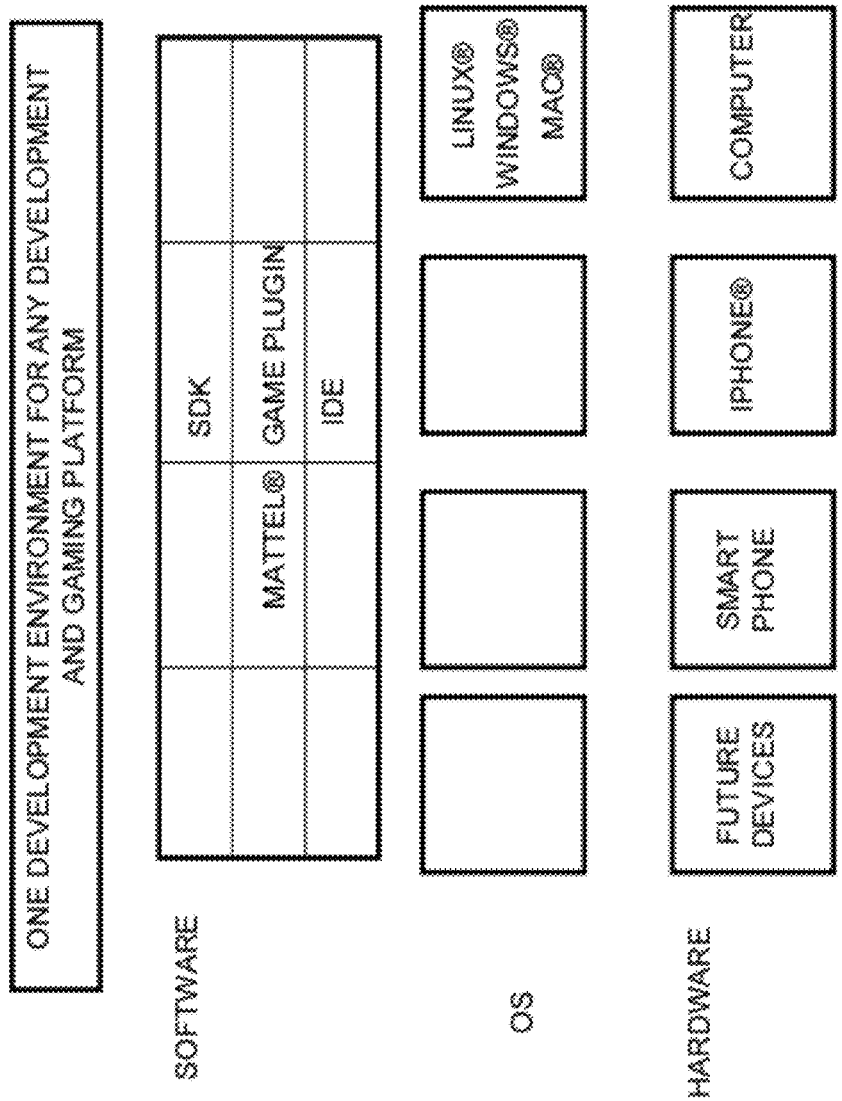

Architecture of Development Platform Hardware and Software, as shown in FIG. 4, may include one development environment for any development and gaming platform, which may be software, such as SDK, System sponsor Game Plug-in, and/or IDE (Integrated Development Environment); operating systems; and/or hardware, such as smart phones and computers.

Figure 5:
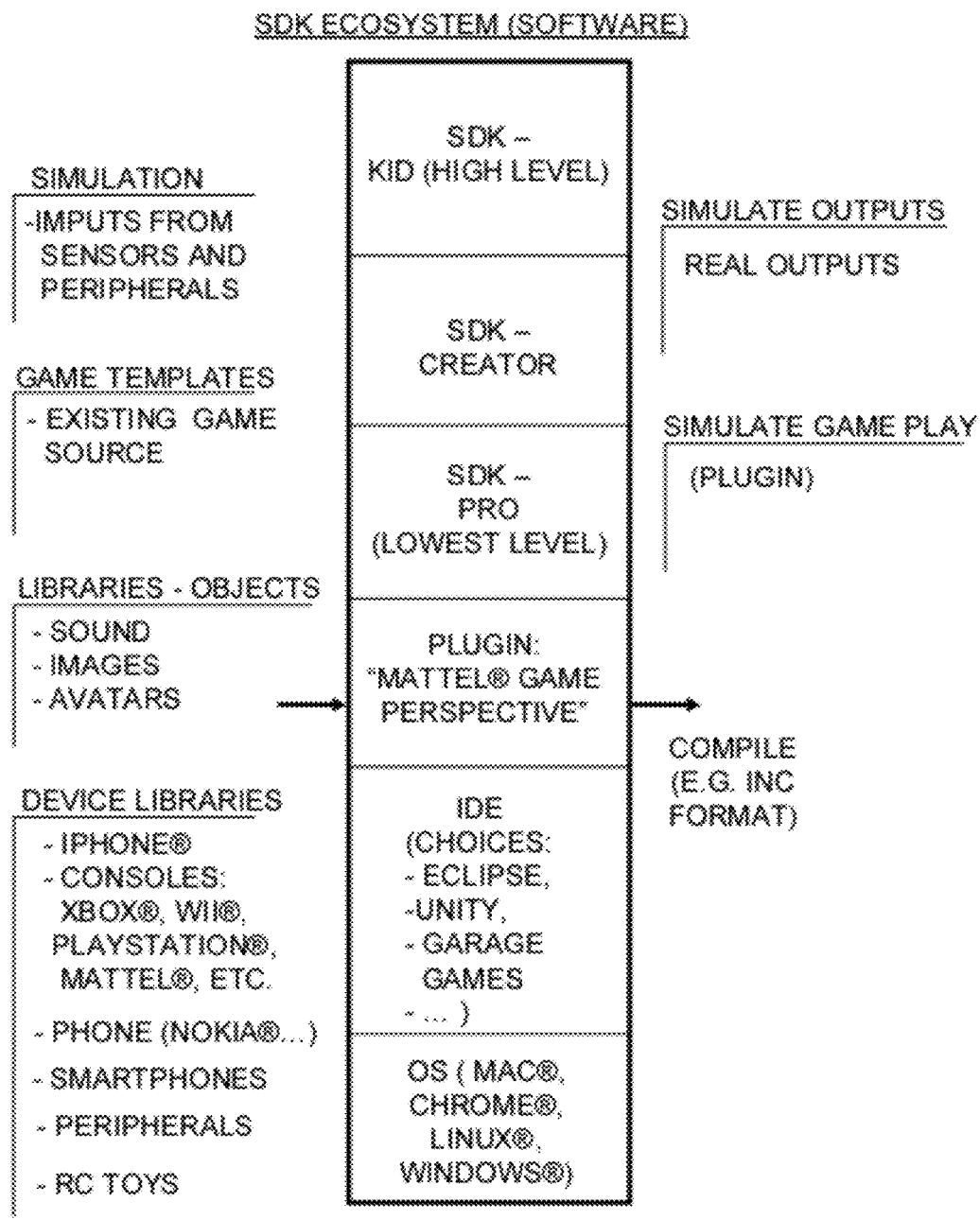

In some examples, the system may include a SDK Ecosystem (Software), as shown in FIG. 5, which may include:
Simulation:
  Inputs from sensors and peripherals
    Simulate outputs—real outputs
    Simulate game play—plug-in
  Game Templates:
  Existing Game Source
  Libraries—objects:
  Sound
  Images
  Avatars
  Device Libraries, such as for:
  Consoles
  Phones
  Smartphones
  Peripherals
  RC Toys
  SDK—Kid (high level)
  SDK—Creator
  SDK—Pro (lower level)
  Plug-in: Game Perspective
  IDE: Choices—eclipse, unity, gouge gaming, An illustrative example of a Kid SDK that may be included with and/or available for the system, is schematically illustrated in FIG. 6, and may include selecting from options such as:
  Type:
  Quest
  Explore
  Activity
  What Device do you want to use?
  RGB Peripheral—Buy
  Console—Buy
  . . . —Buy
  . . . —Buy
  Play:
  Find people/things
  Obstacles/races
  . . . .
  Instructions:
  #1
  Hide the peripheral
  Find it in 3
  #2
  #3
  Write your own
  Record your own Audio An illustrative example of a resulting custom game from a Kid SDK, such as the one illustrated in FIG. 6 and described above, is shown in FIG. 6, and may include aspects such as:
  Johnnies Custom Find-It Game!
  Play
    Instructions
  Text
  Audio
    Go!
  Go
    Timer countdown:
  Found 1, 2, 3,
  Hot, Warm Cold
    Great Time! (Shows time)
  You found all 3!
  Leader board—1. John, 2. Andrew, 3. Peter . . . .

Illustrative examples of mobile console active play hardware/device features, as shown in FIG. 7, may include:
  User experience/UI
  2 multifunction buttons
  Screen:
    Color (half of iphone size)
    Touch (not multi-touch)
  Sensors, such as
    Accelerometer (3-axis, 10-bit)
    Gyroscope/direction
    GPS
    Camera (B-girl quality), such as 0.1 to 10 megapixels
    Temperature
    Light
    Chemical or odor
  Generators, such as:
    Sound/voice/speaker (8 k)
    Vibration
  Connectivity, such as:
  Cell network (pager, mobile, 4G)
  Wi-Fi
  IR port
  USB infrared dongle
  Misc Components may include:
  Light Sensor
  Microcontroller (ARM7)
  Memory—RAM (16 MB)
  Memory—Flash (2 Gb, 250 MB)
  Battery, charging circuit, wall wart
  Housing packaging
  Content
  Online Features:
  Website with user registration
  Talks to the system sponsor's account on the back end
  Scalable (e.g. "supports 50 k simultaneous users with <1 sec delay")
  Avatar A variety of peripherals may be available for mobile game consoles, such as those suitable for use with the system. The following are illustrative examples of devices or peripherals that may be add-ons to the systems, methods and devices for assisting play and/or other activities that may enable and encourage innovative health-related play:
  Body Statistics Peripherals, such as:
    Exercise family
      Pedometer
      Play movement (accelerometer+gyroscope)
      Play movement and location (accelerometer+gyroscope+location)
    Vital Signs peripheral family, such as:
      Pulse rate (BPM) or heart rate
      Blood pressure
      Body temperature
      Weight
      BPM and Pressure
      Vital signs: Pulse rate, blood pressure, respiratory rate, weight
    Blood measurement, such as:
      Glucose or sugar
      Oxygen
      Pressure
  Location Peripherals, such as:
    "Find me" (broadcasts its location via GPS, triangulation, or other methods)
    Compass (knows where you are pointing it)

"Hot/Cold" with location and/or GPS, as well as 2-5 lights that indicate whether the player is "cold/warmer/hot/etc."

Environment, Sound, Light Peripherals Family, such as:
Temperature
Light, such as:
Brightness sensor ("am I in a closet? Outside? Under a lamp?")
Camera
Sound, such as:
Noise/Db sensor
Remote microphone
Remote speaker Mobile Game Consoles, which may include various features such as:
Wireless communications (Wi-Fi, Bluetooth, IR, cell phone network, RC)
Wired communication (USB)
Screen
Buttons
Touch screen
Speaker
Microphone
Microcontroller
Memory—RAM
Memory—Flash
Battery, charging circuit, wall wart
Housing/packaging In some examples, various Mobile "Game Console" Accessories may be used to unlock game play features, and may include Retail Objects and Online Objects.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure. Where such claims recite "a" or "a first" element or the equivalent thereof, such claims should be understood to include incorporation of one or more such elements, neither requiring nor excluding two or more such elements.

What is claimed is:

1. A system for assisting play, comprising:
a portable computer including:
a user interface configured to receive input from a user; and
a computer communication mechanism configured to transmit computer data based, at least in part, on the received user input; and
a plurality of portable devices each including:
an enclosure;
a proximity sensor mechanism within the enclosure and configured to detect proximity of one or more other portable devices of the plurality of portable devices;
a device communication mechanism configured to receive the computer data, transmit proximity data to the portable computer based on the detected proximity, and receive proximity data from the portable computer; and
an audiovisual output mechanism configured to generate at least one of an audio output and a visual output,
wherein:
the computer communication mechanism is further configured to receive first proximity data from a first portable device of the plurality of portable devices and transmit the first proximity data to a second portable device of the plurality of portable devices based, at least in part, on the received user input,
the computer communication mechanism is further configured to receive second proximity data different from the first proximity data from the second portable device, and transmit the second proximity data to the first portable device based, at least in part, on the received user input,
the device communication mechanism of the first portable device is configured to receive the second proximity data from the portable computer,
the device mechanism of the second portable device is configured to receive the first proximity data from the portable computer,
the audiovisual output mechanism of the first portable device is configured to generate at least one of a first audio output and a first visual output in response to the second proximity data received from the portable computer, and
the audiovisual output mechanism of the second portable device is configured to generate at least one of a second audio output and a second visual output in response to the first proximity data received from the portable computer.

2. The system of claim 1, wherein the first portable device further includes a vibration output mechanism contained within the enclosure and configured to vibrate the enclosure based on the second proximity data received from the portable computer.

3. The system of claim 1, wherein the first portable device further includes a health sensor mechanism configured to detect one or more health characteristics of a user, the audiovisual output mechanism being further configured to generate at least one of an audio output and a visual output based on the detected one or more health characteristics of the user.

4. The system of claim 3, wherein the health sensor mechanism is further configured to detect a heart rate of a user, and the audiovisual output mechanism is further configured to generate at least one of an audio output and a visual output when the detected heart rate exceeds a predetermined threshold rate.

5. The system of claim 1, wherein each of the plurality of portable devices includes at least one aperture sized to receive one of a strap, a chain, and a cord.

6. A method of assisting play with a portable computer and a plurality of portable devices, comprising
detecting, via a first proximity sensor mechanism of a first portable device of the plurality of portable devices, proximity of one or more other portable devices of the plurality of portable devices;
transmitting, via a device communication mechanism of the first portable device, first proximity data to the portable computer based on the detected proximity;

receiving, via a computer communication mechanism of the portable computer, the first proximity data from the first portable device;

receiving, via the computer communication mechanism of the portable computer, second proximity data from a second portable device of the plurality of portable devices;

transmitting, via the computer communication mechanism, the first proximity data to the second portable device;

transmitting, via the computer communication mechanism, the second proximity data to the first portable device;

receiving, via the device communication mechanism of the first portable device, the second proximity data from the portable computer receiving, via the device communication mechanism of the second portable device, the first proximity data from the portable computer;

generating, via an audiovisual mechanism of the first portable device, at least one of a first audio output and a first visual output in response to the second proximity data received from the portable computer; and generating, via an audiovisual mechanism of the second portable device, at least one of a second audio output and a second visual output in response to the first proximity data received from the portable computer.

7. The method of claim 6, wherein the generating, via the audiovisual mechanism of the first portable device, at least one of the second audio output and the second visual output, is after a predetermined time period that has elapsed from when the at least one of the first audio output and the first visual output was generated.

8. The method of claim 6, further comprising generating, via a vibration mechanism of the first portable device, a vibration output based on the second proximity data received from the portable computer.

9. The method of claim 6, further comprising detecting, via a health sensor mechanism of the first portable device, one or more health characteristics of a user of the first portable device.

10. A computer program product, comprising: a non-transitory computer-readable storage medium that stores computer-readable instructions that, when executed, implement a method for assisting play, the method comprising: receiving first proximity data from a first portable device indicating that the first portable device is within a predetermined threshold distance from one or more other portable devices; receiving second proximity data from a second portable device indicating that the second portable device is within a predetermined threshold distance from one or more other portable devices; transmitting the second proximity data to the first portable device instructing the first portable device to generate at least one of a first audio output and a first visual output in response to the transmitted second proximity data; and transmitting the first proximity data to the second portable device instructing the second portable device to generate at least one of a second audio output and a second visual output based on the transmitted first proximity data.

11. The computer program product of claim 10, wherein the method further comprises transmitting the second proximity data to the first portable device instructing the first portable device to generate a vibration output based on the transmitted second proximity data.

12. The computer program product of claim 10, wherein the method further comprises receiving health data that includes one or more health characteristics of a user of the first portable device.

13. The computer program product of claim 10, wherein the method further comprises transmitting the first proximity data to the second portable device instructing the second portable device to generate a vibration output based on the transmitted first proximity data.

14. The system of claim 3, wherein the device communication mechanism of the first portable device is further configured to transmit health characteristics data to the portable computer based on the detected health characteristics, and wherein the computer communication mechanism is further configured to receive the health characteristics data from the first portable device and transmit the health characteristics data to the second portable device based, at least in part, on the received user input.

15. The system of claim 14, wherein the device communication mechanism of the second portable device is configured to receive the health characteristics data from the portable computer, and the audiovisual output mechanism of the second portable device is configured to generate at least one of an audio output and a visual output based on the health characteristics data received from the portable computer.

16. The method of claim 6, further comprising:
receiving, via a device communication mechanism of the second portable device, the first proximity data from the portable computer; and
generating, via an audiovisual mechanism of the second portable device, at least one of a third audio output and a third visual output in response to the first proximity data received from the portable computer.

17. The method of claim 9, further comprising:
transmitting, via the device communication mechanism of the first portable device, health characteristics data based on the detected health characteristics to the portable computer;
receiving, via the computer communication mechanism of the portable computer, the health characteristics data from the first portable device; and
transmitting, via the computer communication mechanism of the portable computer, the health characteristics data to the second portable device.

18. The method of claim 17, further comprising:
receiving, via the device communication mechanism of the second portable device, the health characteristics data from the portable computer; and
generating, via the audiovisual mechanism of the second portable device, at least one of a fourth audio output and a fourth visual output based on the health characteristics data received from the portable computer.

* * * * *